US007849012B2

(12) United States Patent
Pinsonnault et al.

(10) Patent No.: US 7,849,012 B2
(45) Date of Patent: Dec. 7, 2010

(54) WEB-BASED METHODS AND SYSTEMS FOR EXCHANGING INFORMATION AMONG PARTNERS

(75) Inventors: Scott Michael Pinsonnault, Stamford, CT (US); Clifford Seltzer, Scarsdale, NY (US); Michael Wesley DePriest, Ridgefield, CT (US)

(73) Assignee: GE Energy Financial Services, Inc., Stamford, CT (US)

( * ) Notice: Subject to any disclaimer, the term of this patent is extended or adjusted under 35 U.S.C. 154(b) by 1556 days.

(21) Appl. No.: 10/820,425

(22) Filed: Apr. 8, 2004

(65) Prior Publication Data
US 2004/0193480 A1 Sep. 30, 2004

Related U.S. Application Data

(63) Continuation-in-part of application No. 09/588,985, filed on Jun. 7, 2000, now Pat. No. 6,741,989.

(51) Int. Cl.
*G06Q 10/00* (2006.01)
*G06Q 30/00* (2006.01)
*G06Q 40/00* (2006.01)

(52) U.S. Cl. .......................... 705/44; 705/1.1; 705/35; 705/301

(58) Field of Classification Search .................. 705/1; 707/510, 10, 9; 713/202, 201, 200
See application file for complete search history.

(56) References Cited

U.S. PATENT DOCUMENTS

| | | | |
|---|---|---|---|
| 5,410,646 A * | 4/1995 | Tondevold et al. | 715/207 |
| 5,615,109 A * | 3/1997 | Eder | 705/8 |
| 5,619,991 A | 4/1997 | Sloane | |
| 5,754,857 A | 5/1998 | Gadol | |
| 5,802,518 A | 9/1998 | Karaev et al. | |
| 5,819,271 A * | 10/1998 | Mahoney et al. | 707/9 |
| 5,864,871 A | 1/1999 | Kitain et al. | |
| 5,892,909 A * | 4/1999 | Grasso et al. | 709/201 |
| 5,926,624 A | 7/1999 | Katz et al. | |

(Continued)

OTHER PUBLICATIONS

Williams, Peggy. In the Counting House. Oil and Gas Investor. Denver: Oct. 1996. vol. 16, Is. 10; p. 34, 3 pgs.*

(Continued)

*Primary Examiner*—John G Weiss
*Assistant Examiner*—Candice D Carter
(74) *Attorney, Agent, or Firm*—Armstrong Teasdale LLP

(57) ABSTRACT

A method for exchanging information within a partnership is provided. The method uses a web-based system that includes a server coupled to a centralized database of business data relating to the partnership and at least one client system. The server has a plurality of analytical tools. The method includes providing forms stored within the server as web pages for the insertion of updated partnership business data and causing the forms to be displayed on a client system, uploading forms that include updated partnership business data to the server, downloading the web pages to authorized users requesting the updated partnership business data, accessing the plurality of analytical tools including an authorization for expenditure tool wherein the authorization for expenditure tool enables an authorized user to submit a request for a proposed expenditure within the partnership, and tracking the proposed expenditure request using the authorization for expenditure tool through an approval process within the partnership.

61 Claims, 52 Drawing Sheets

U.S. PATENT DOCUMENTS

| | | |
|---|---|---|
| 5,947,526 A | 9/1999 | Neu |
| 5,966,451 A | 10/1999 | Utsumi |
| 5,974,403 A * | 10/1999 | Takriti et al. ............... 705/412 |
| 5,987,440 A | 11/1999 | O'Neil et al. |
| 6,002,753 A | 12/1999 | Morrison et al. |
| 6,016,789 A | 1/2000 | Denz et al. |
| 6,058,368 A | 5/2000 | Aourane |
| 6,073,108 A | 6/2000 | Peterson |
| 6,298,347 B1 | 10/2001 | Wesley |
| 6,341,290 B1 * | 1/2002 | Lombardo et al. ....... 707/104.1 |
| 6,353,823 B1 | 3/2002 | Kumar |
| 6,393,410 B1 | 5/2002 | Thompson |
| 6,430,121 B1 | 8/2002 | Shiraishi et al. |
| 6,442,526 B1 * | 8/2002 | Vance et al. ................... 705/5 |
| 6,507,817 B1 | 1/2003 | Wolfe et al. |
| 6,658,460 B1 * | 12/2003 | Streetman et al. ........... 709/217 |
| 6,832,202 B1 * | 12/2004 | Schuyler et al. ................ 705/8 |
| 6,938,009 B1 * | 8/2005 | Herbst et al. .............. 705/36 R |
| 7,006,992 B1 * | 2/2006 | Packwood ................... 705/38 |
| 7,099,838 B1 * | 8/2006 | Gastineau et al. ............. 705/35 |
| 2001/0013008 A1 * | 8/2001 | Waclawski ................... 705/10 |

OTHER PUBLICATIONS

"SS&C Technologies Acquires HedgeWare, Inc., Widens Reach into Hedge Fund, Family Wealth and Investment Advisory Community", Business/Technology Editors. Business Wire. New York: Mar. 11, 1999. p. 1.*

Dommel et al. "A Coordination Architecture for Internet Groupwork", IEEE 2000, pp. 183-190.

Hamilton et al. "Online Access to NODC Information Services", OCEANS1998, pp. 637-640.

Jensen et al. "Using the Internet to Send & Receive Documents & Automate the Office", ACM 1995, pp. 77-83.

Grantham, Charles E. "Hollywood: A Business Model for the Future?", ACM 2000, pp. 8-15.

International Search Report dated Jul. 6, 2000, Application No. PCT/US01/18125 for GE Capital Services Structured Finance.

* cited by examiner

260

Welcome to GEPX
Scott
GE Super User
General Electric

Select Partner
CEI

Select Tool
- AFE System
- File Transfer
  - Download User Files — 222
  - Upload P&sp Reports
- Forecasts
- Hedging
- Input Tools
- Listings
- Models
- Policy 6.0
- Pricing
- Reports
- Log Out Time Remaining in Session: 119:52

GE Structured Finance
*Global Energy - Oil & Gas*

Websites  Help

Files to Download

| Delete | File Name | Date Posted | Posted By | File Size (Bytes) | File Type | Report Date | Comments |
|---|---|---|---|---|---|---|---|
| | Revised Final 3Q2003_FS.xls | 12/22/2003 | JWILLIAMS | 35,328 | Other | | |
| | final_3Q2003_FS.xls | 12/18/2003 | JWILLIAMS | 34,816 | Other | | |
| | FINAL_2Q2003_FS.xls | 8/15/2003 | JWILLIAMS | 32,256 | Other | | |
| | CEI_2002.pdf | 6/30/2003 | JFRY | 434,050 | Other | | |
| | FINAL_1Q2003_FS.xls | 6/10/2003 | JFRY | 32,768 | Quarterly Report | 2003 1st Qtr | |
| | FINAL_4Q2002_FS.xls | 3/11/2003 | JFRY | 33,792 | Quarterly Report | 2002 4th Qtr | |
| | AMENDED FINAL 3Q_2002_FS.xls | 11/26/2002 | JFRY | 30,720 | Other | | AMENDED 3RD QUARTER FINANCIAL STATEMENTS |
| | FINAL 3Q 2002 FS.xls | 11/15/2002 | JFRY | 30,720 | Quarterly Report | 2002 3rd Qtr | |
| | CEI_FS_2002.pdf | 8/22/2002 | JFRY | 601,064 | Other | | 2001 Audited Financial Statements |
| | FINAL 2Q 2002 FS.xls | 8/14/2002 | JFRY | 31,744 | Quarterly Report | 2002 2nd Qtr | |
| | FINANCIAL STATEMENTS 2001.xls | 6/21/2002 | JFRY | 92,160 | Other | | 2001 general partner unaudited financial statements |
| | FINAL 1Q 2002 FS.xls | 5/24/2002 | jfry | 29,696 | Other | | |
| | FINAL DEC 01 FINANCIAL STATEMENTS.xls | 2/25/2002 | JFRY | 94,720 | Quarterly Report | 2001 4th Qtr | |

Privacy Policy Terms and Conditions © 2000, 2003

WEB-BASED METHODS AND SYSTEMS FOR EXCHANGING INFORMATION AMONG PARTNERS

CROSS REFERENCE TO RELATED APPLICATIONS

This application is a continuation-in-part of U.S. patent application Ser. No. 09/588,985, filed Jun. 7, 2000, now U.S. Pat. No. 6,741,989 entitled "Web-Based Method and System for Exchanging Information Among Partners," all of which is incorporated by reference herein in its entirety.

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

This invention relates generally to a computer network-based system and more particularly to a system and method for providing information exchange to members of a partnership on a variety of issues.

For partnerships having numerous partners located in multiple places worldwide, information exchange on a timely basis for partnership related business issues is a major challenge. Most partnership information exchange is paper-driven, therefore resolving issues is sometimes difficult in such business arrangements. Another challenge simply involves the time spent in assembling, formatting and submitting the information to be exchanged. Sometimes after such a lengthy gathering process, the information compiled is already outdated. In addition, much of the manual labor involved is repetitive. As with any paper driven process, archiving is another issue to be dealt with.

Electronic information exchange has dealt with these problems to some extent, however in diverse partnerships, legacy formatting issues and differences in procedures have left much of the inefficiencies unaffected, for example, time expended manually in gathering the information and possibly converting the information into a different format. Overall, both the traditional paper methods and known electronic methods can be very frustrating and may not necessarily facilitate resolving partnership information exchange issues.

It would be desirable to facilitate partnership information exchange issues by implementing a system that allows real-time access to partnership business information, to facilitate updates to the information, while eliminating the inefficiencies of known systems.

BRIEF DESCRIPTION OF THE INVENTION

In one aspect, a method for exchanging information within a partnership is provided. The method uses a web-based system that includes a server coupled to a centralized database of business data relating to the partnership and at least one client system. The server includes a plurality of analytical tools. The method includes providing forms stored within the server as web pages for the insertion of updated partnership business data and causing the forms to be displayed on a client system, uploading forms that include updated partnership business data intended for use by other authorized users to the server wherein the updated partnership business data is stored within the database, formatting the partnership business data uploaded using web pages stored within the server, downloading the web pages to authorized users requesting the updated partnership business data, accessing the plurality of analytical tools including an authorization for expenditure tool wherein the authorization for expenditure tool enables an authorized user to submit a request for a proposed expenditure within the partnership, and tracking the proposed expenditure request using the authorization for expenditure tool through an approval process within the partnership.

In another aspect, a network based system for exchanging information within a partnership is provided. The system includes at least one client system having a browser, a database for storing business data relating to the partnership, and a server having a plurality of analytical tools. The server is configured to be coupled to the client system and the database. The server is further configured to provide forms stored within the server as input web pages for the insertion of updated partnership business data, display the input web pages on the client system, upload forms including updated partnership business data intended for use by other authorized users to said server wherein the updated partnership business data is stored within said database, format the partnership business data uploaded using output web pages stored within the server, download the output web pages to authorized users requesting the updated partnership business data, display on the client system the output web pages, access the plurality of analytical tools including an authorization for expenditure tool to enable an authorized user to submit a request for a proposed expenditure within the partnership, and track the proposed expenditure request using the authorization for expenditure tool through an approval process within the partnership.

In another aspect, a method for exchanging information within a partnership involved in oil and gas exploration is provided. The method uses a web-based system that includes a server coupled to a centralized database of business data relating to the partnership and at least one client system. The server includes a plurality of analytical tools. The method includes providing forms stored within the server as web pages for the insertion of updated partnership business data including oil and gas exploration data, uploading forms that include updated partnership business data intended for use by other authorized users to the server wherein the updated partnership business data is stored within the database, enabling an authorized user to access an information page via the at least one client system, prompting an authorized user from the information page to access at least one of the plurality of analytical tools including an authorization for expenditure tool wherein the authorization for expenditure tool enables an authorized user to submit a request for a proposed expenditure within the partnership, and tracking the proposed expenditure request using the authorization for expenditure tool through an approval process within the partnership.

In another aspect, a computer program embodied on a computer readable medium for exchanging information within a partnership is provided. The program includes at least one code segment that receives business data relating to the partnership and then maintains a database by adding, deleting and updating the business data. The at least one code segment also provides forms as web pages for the insertion of updated partnership business data and causing the forms to be displayed on a client system, downloads the web pages to authorized users requesting the updated partnership business data, accesses the plurality of analytical tools including an authorization for expenditure tool to enable an authorized user to submit a request for a proposed expenditure within the partnership, and tracks the proposed expenditure request using the authorization for expenditure tool through an approval process within the partnership.

BRIEF DESCRIPTION OF THE DRAWINGS

FIG. 6 is an example embodiment of a user interface displaying a download user files page within PECS.

FIG. 9 is an example embodiment of a user interface displaying a hedge production forecast tool page within PECS.

FIG. 17 is an example embodiment of a user interface displaying a hedge contracts tool page within PECS.

FIG. 18 is an example embodiment of a user interface displaying a hedge portfolio setup tool page within PECS.

FIG. 19 is an example embodiment of a user interface displaying a hedge production forecast tool page within PECS.

FIG. 22 is an example embodiment of a user interface displaying an AFE summary tool page within PECS.

FIG. 24 is an example embodiment of a user interface displaying an asset play tool page within PECS.

FIG. 27 is an example embodiment of a user interface displaying a business entity setup tool page within PECS.

FIG. 33 is an example embodiment of a user interface displaying a net income forecasting model page within PECS.

FIG. 38 is an example embodiment of a user interface displaying a discount rates tool page within PECS.

FIG. 49 is an example embodiment of a user interface displaying a hedge portfolio setup tool page within PECS.

DETAILED DESCRIPTION OF THE INVENTION

Figure 1:
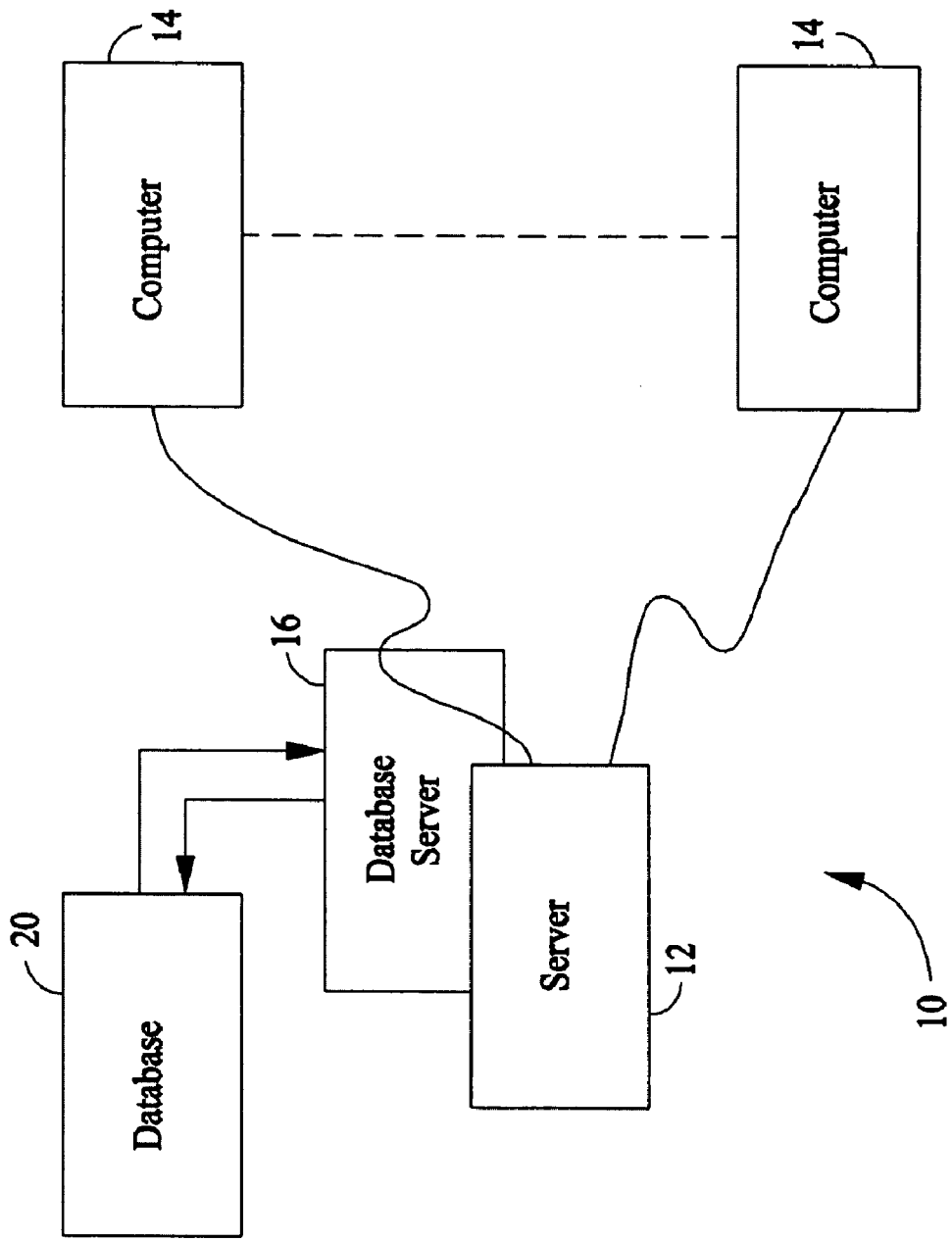
FIG. 1 is a simplified block diagram of a Partnership Exchange Coordination System (PECS) in accordance with one embodiment of the present invention.

Example embodiments of systems and processes that facilitate integrated network-based electronic reporting and workflow process management related to a Partnership Exchange Coordination System (PECS) are described below in detail. A technical effect of the systems and processes described herein include at least one of facilitating an electronic submission of information using a client system, automating extraction of information, and web-based reporting for internal and external system users. The PECS facilitates many of the required processes that are performed by both General and Limited partners on a daily, weekly, monthly or quarterly, or annual basis. The PECS allows a user to register within the system, and then collect, manage, store and disseminate partnership information among internal users and selected outside users to facilitate a more accurate and efficient processing of partnership business.

In the example embodiment, the PECS collects, tracks, displays, and disseminates near-real time partnership information. Moreover, the PECS facilitates accurate and timely reporting of performance as well as real time analysis of partnership performance. The system is designed with the goals of making compliance with the partnership agreement easier, quicker, and more efficient overall as a function of day to day operations of partnership assets. The PECS also includes an Authorization for Expenditure (AFE) System for submission and approval of CAPEX (capital expenditure) requests, analytical tools to track partnership performance, a data source for pricing information, FASB (Financial Accounting Standards Board) 133 Hedge Accounting analysis tools, and other reporting tools.

In the example embodiment, the PECS collects data from partnerships and stores the data within one common, access-restricted database. This allows analyses to be performed upon the data, and thus facilitating the management of the partnerships. Users submit data in compliance with partnership agreements. Users can also use the data to compare actual performance against forecasts and to identify unanticipated variance scenarios. The PECS also enables users to: request authorizations electronically by submitting AFEs electronically; upload performance metrics (e.g., upload data on a monthly/weekly/quarterly/annual basis); download/generate charts, reports, graphs, models, and files; create new forecasts, extrapolations, and data views; create quarterly and monthly variance reports; access important data; compare actual and forecast data; download spreadsheet models; access PDF files; and view partners' combined data.

In the example embodiment, users of the PECS may be assigned different roles including at least one of: General Partners (GPs), who use the system to upload metrics and view data; Limited Partners (LPs), who use the system to track these metrics; and Engineering Consultants, who use the system to upload and download documents, and compare actuals to forecasts. Each user type has access to different levels of information and varying sets of PECS tools. Additionally, Limited Partner users fall under two categories: Super Users, who have access to all tools except certain partnership tools; and Users, who have the same level of access as Super Users except for the User Maintenance system.

In one embodiment, the system is a computer program embodied on a computer readable medium implemented utilizing Java® and Structured Query Language (SQL) with a client user interface front-end for administration and a web interface for standard user input and reports. (Java is a registered trademark of Sun Microsystems, Inc., Palo Alto, Calif.). In an example embodiment, the system is web enabled and is run on a business-entity's intranet. In yet another embodiment, the system is fully accessed by individuals having an authorized access outside the firewall of the business-entity through the Internet. In a further example embodiment, the system is being run in a Windows® NT environment (Windows is a registered trademark of Microsoft Corporation, Redmond, Wash.). The application is flexible and designed to run in various different environments without compromising any major functionality.

The systems and processes are not limited to the specific embodiments described herein. In addition, components of each system and each process can be practiced independent and separate from other components and processes described herein. Each component and process also can be used in combination with other assembly packages and processes.

FIG. 1 is a simplified block diagram of a Partnership Exchange Coordination System (PECS) 10 including a server system 12, and a plurality of client sub-systems, also referred to as client systems 14, connected to server system 12. In one embodiment, client systems 14 are computers including a web browser, such that server system 12 is accessible to client systems 14 via the Internet. Client systems 14 are interconnected to the Internet through many interfaces including a network, such as a local area network (LAN) or a wide area network (WAN), dial-in-connections, cable modems and special high-speed ISDN lines. Client systems 14 could be any device capable of interconnecting to the Internet including a web-based phone, personal digital assistant (PDA), or other web-based connectable equipment. A database server 16 is connected to a database 20 containing information on a variety of matters including partnership data, as described below in greater detail. In one embodiment, centralized database 20 is stored on server system 12 and can be accessed by potential users at one of client systems 14 by logging onto server system 12 through one of client systems 14. In an alternative embodiment database 20 is stored remotely from server system 12 and may be non-centralized.

Figure 2:
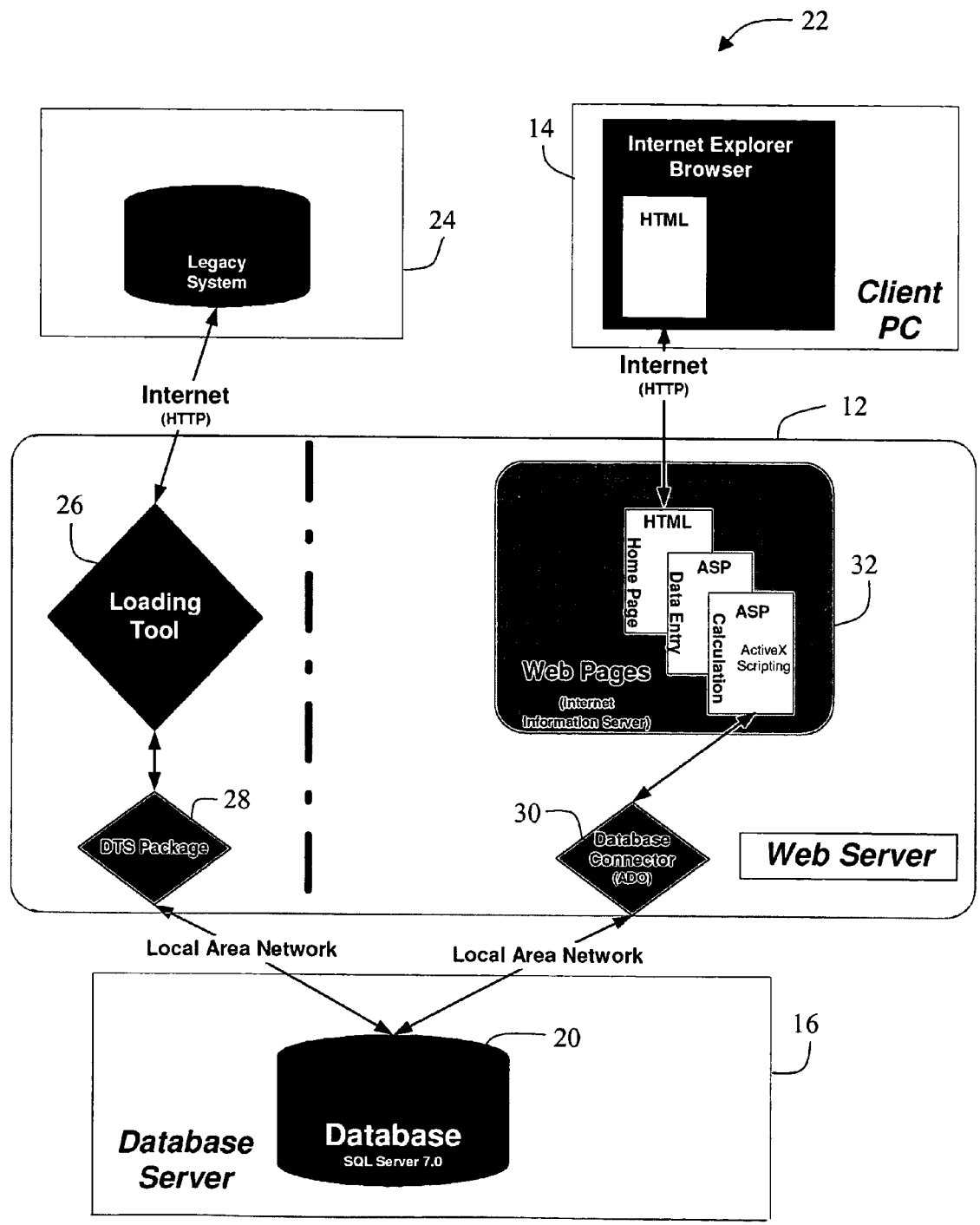
FIG. 2 is an expanded version block diagram of an example embodiment of a server architecture of a PECS.

FIG. 2 is an expanded version block diagram of an example embodiment of a server architecture of a PECS 22. Components in system 22, identical to components of system 10 (shown in FIG. 1), are identified in FIG. 2 using the same reference numerals as used in FIG. 1. System 22 includes server system 12, client systems 14, and database server 16. Database server 16 includes database 20. In one embodiment, database server 16 is separate from server system 12 and is in communication with server system 12 through a network such as a local area network (LAN). In an alternative embodiment, server system 12 includes database server 16 and database 20. System 22 also includes a legacy system 24. In the example embodiment, legacy system 24 is in communication with server system 12 and is configured to transmit monthly production and associated financial data from a Partners legacy oil and gas accounting system to server system 12. Additionally, legacy system 24 is configured to allow authorized users to supervise the loading of production and cash-flow forecasting data to server system 12 from outside providers. In the example embodiment, legacy system 24 may include a commercially available system, for example, OGAS (Oil and Gas Accounting Software), Excalibur, or Aries (Excalibur is manufactured by P2 Energy Solutions, Houston, Tex.) Legacy system 24 is in communication with server system 12 through a network including the Internet or any other wide area network (WAN) type communication.

Client systems 14 are computers including a web browser, such that server system 12 is accessible to client systems 14 via the Internet. Client systems 14 are configured to display HTML documents downloaded from server system 12 and is configured to upload information to server system 12.

Server system 12 includes a loading tool 26, a DTS (Data Transformation Services) package 28, a database connector 30 and an Internet Information Server 32. In the example embodiment, loading tool 26 is in communication with legacy system 24 and is configured to interpret and map data received from legacy system 24 into server system 12. Loading tool 26 is in communication with DTS package 28, which is in communication with database server 16 such that data received from legacy system 24 may be stored within database 20. DTS package 28 is in communication with database server 16 through a network including a local area network (LAN). A DTS package is a set of related objects (connections, tasks, and workflows) that can be used to access, transform and manipulate data from a wide range of sources including text files and relational databases.

In the example embodiment, database connector 30 connects database 20 with Internet Information Server 32 through a network including a local area network (LAN). Database connector 30 is a SQL database tool that utilizes ADO (ActiveX Database Objects) to communicate with database 20. Internet Information Server 32 includes a plurality of web pages including at least one of a home page, a data entry page, and a calculation page. These web pages may include HTML (Hyper Text Markup Language) web pages, and ASP (Active Server Page) web pages.

In the example embodiment, database server 16 includes database 20. Database server 16 may include, for example, a SQL (Structured Query Language) Server 7.0 system.

Figure 3:
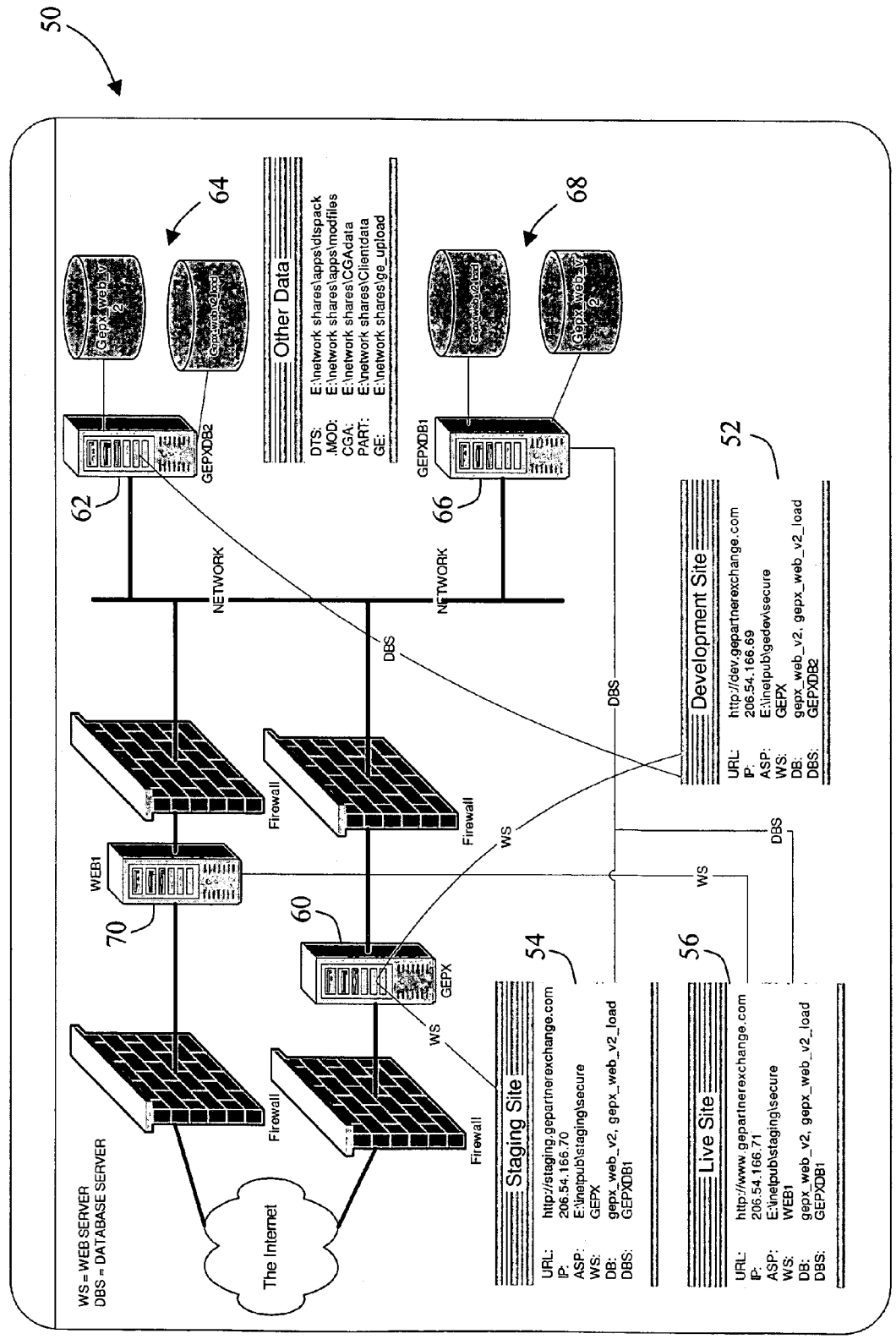
FIG. 3 is an additional expanded version block diagram of an example embodiment of a server architecture of a PECS.

FIG. 3 is an additional expanded version block diagram of an example embodiment of a server architecture of a PECS 50. System 50 includes a development site 52, a staging site 54, and a live site 56. In the example embodiment, development site 52 enables developers to develop new tools, new web pages, and new functionality for PECS 50 before being deployed to live site 56. Access to development site 52 is limited to authorized developers. Before being deployed to live site 56, these new tools, new web pages, and new functionality are deployed to staging site 54 for quality and control testing, and for pre-deployment analysis. Access to staging site 54 is limited to users authorized for quality and control testing and pre-deployment analysis. Once the testing and analysis are completed at staging site 54, the new tools, new web pages, and new functionality may be deployed to live site 56 for use by all users within PECS 50.

In the example embodiment, development site 52 includes web server 60, database server 62, and databases 64. Staging site 54 includes web server 60, database server 66, and databases 68. Live site 56 includes web server 70, database server 66, and databases 68. In other words, staging site 54 and live site 56 share a common database but not a common web server. The components included within PECS 50 are interconnected using a network system and firewalls. The network system includes a local area network (LAN) or intranet.

Figure 4:
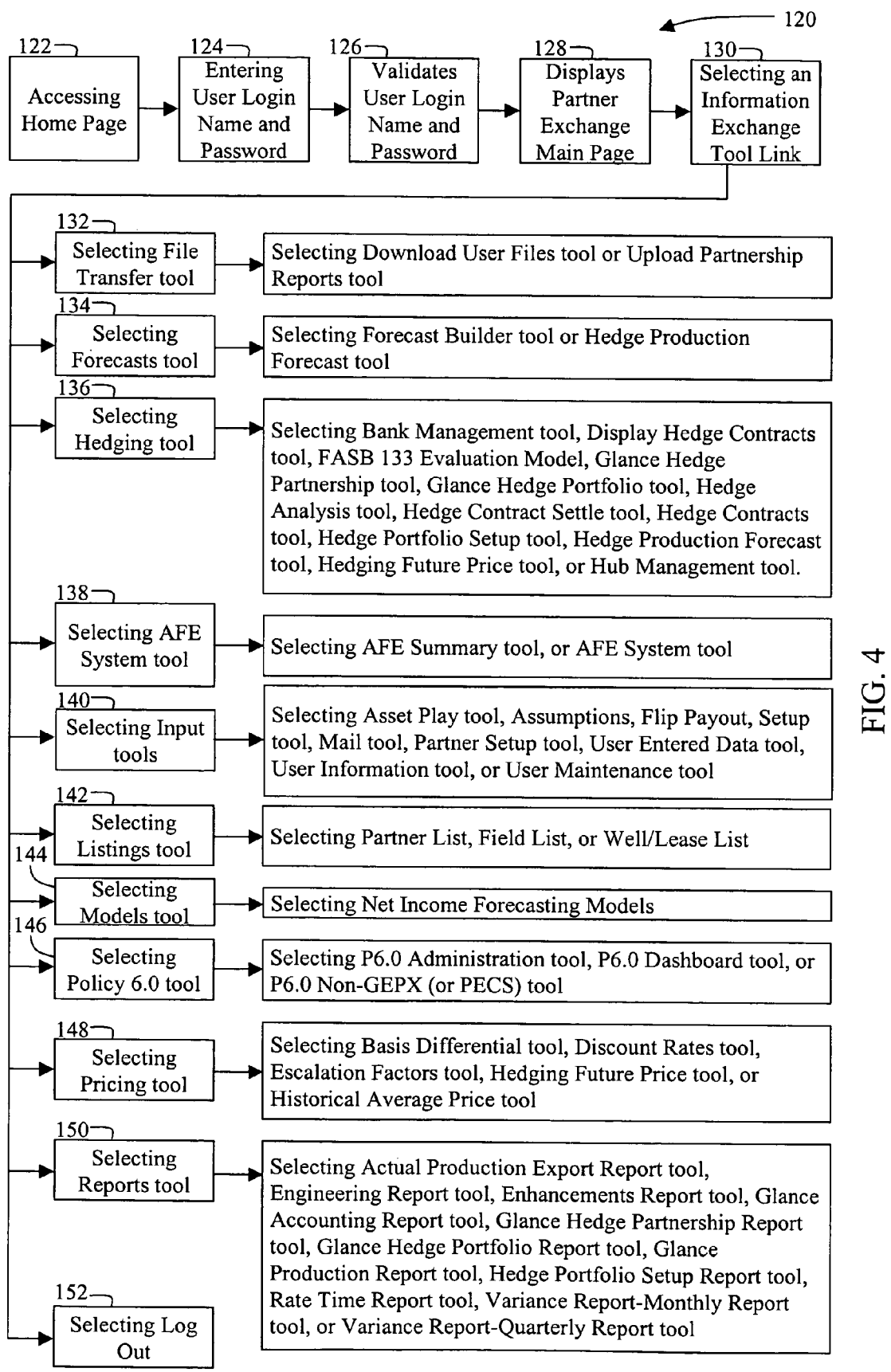
FIG. 4 is a flowchart of the processes employed by PECS to facilitate use.

FIG. 4 is a flowchart 120 illustrating example processes utilized by PECS 10 (shown in FIG. 1). The technical effect of PECS 10 is achieved by a user first accessing 122 a home page which gives an overview of the website and the tools available. The home page also requests that the user login. A directory of registered users is maintained as part of database 16 (shown in FIG. 1) and if a user wishes to become a registered user, he or she must contact a site manager, who will confirm that the person should have access to the site before issuing a login name and password. As registered users login 124, an option is available for changing their password or the user is flagged 126 if they have entered an invalid password. After a successful login, a partner exchange main page is displayed 128. The main page displays all available partners, a date each of the partners last uploaded data to database 16, and each partner's most recent accounting period. Available on all pages of the website is a link which takes a user to a contact page and a second link which takes a user to a website feedback page.

From the partner exchange main page, a registered user may select 130 from a variety of information exchange tools, denoted as links on the main page. In the example embodiment, the information exchange tools include at least one of an authorization for expenditure (AFE) system tool, a file transfer tool, a forecasts tool, a hedging tool, input tools, a listings tool, a models tool, a policy 6.0 tool, a pricing tool, a reports tool, and a log out.

By selecting 132 the file transfer tool, a user is then prompted to select from a download user files tool and an upload partnership reports tool.

By selecting 134 the forecasts tool, a user is then prompted to select from a forecast builder tool and a hedge production forecast tool.

By selecting 136 the hedging tool, a user is then prompted to select at least one of a bank management tool, a display hedge contracts tool, a FASB (Financial Accounting Standards Board) 133 evaluation model, a glance hedge partnership tool, a glance hedge portfolio tool, a hedge analysis tool, a hedge contract settle tool, a hedge contracts tool, a hedge portfolio setup tool, a hedge production forecast tool, a hedging future price tool, and a hub management tool.

By selecting 138 the AFE system tool, a user is then prompted to select from an AFE summary tool and an AFE system tool.

By selecting 140 the input tools, a user is then prompted to select from at least one of an asset play tool, assumptions, a flip payout, setup tool, a mail tool, a partner setup tool, a user entered data tool, a user information tool, and a user maintenance tool.

By selecting 142 the listings tool, a user is then prompted to select from at least one of a partner list, a field list, and a well/lease list.

By selecting 144 the models tool, a user is then prompted to select a net income forecasting model.

By selecting 146 the policy 6.0 tool, a user is then prompted to select from a P6.0 administration tool, a P6.0 dashboard tool, and a P6.0 Non-PECS (also GEPX) tool.

By selecting 148 the pricing tool, a user is then prompted to select from a basis differential tool, a discount rates tool, an escalation factors tool, a hedging future price tool, and a historical average price tool.

By selecting 150 the reports tool, a user is then prompted to select from at least one of an actual production export report tool, an engineering report tool, an enhancements report tool, a glance accounting report tool, a glance hedge partnership report tool, a glance hedge portfolio report tool, a glance production report tool, a hedge portfolio set-up report tool, a rate time report tool, a variance report-monthly report tool, and a variance report-quarterly report tool.

By selecting 152 the log out function, the user is then logged out of the PECS system.

Figure 5:
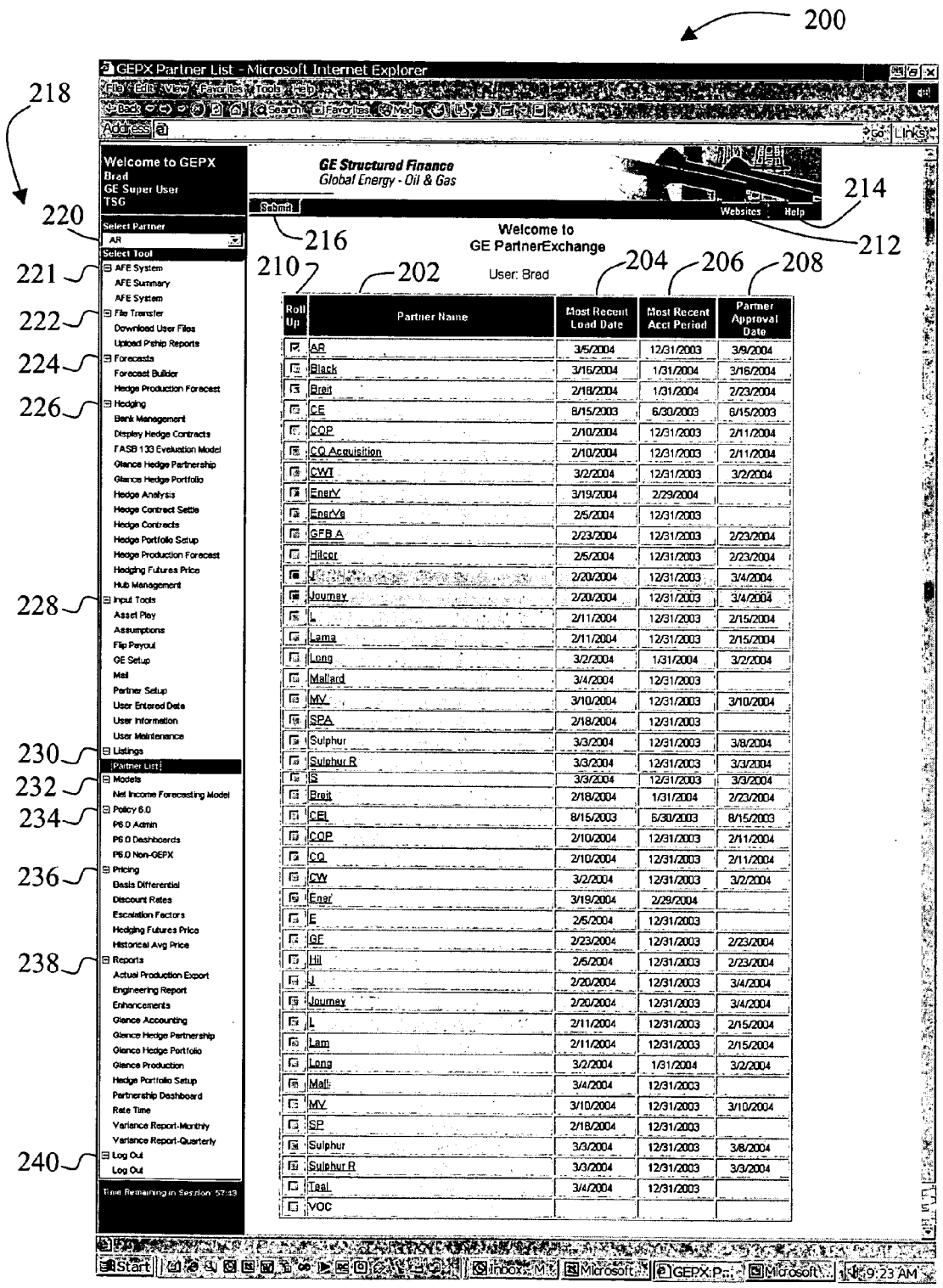
FIG. 5 is an example embodiment of a user interface displaying a home page within PECS.

FIG. 5 is an example embodiment of a user interface 200 displaying a home page within PECS 10 (shown in FIG. 1). User interface 200 includes formatted information from database 16 (shown in FIG. 1) including partner names 202 which can act as a link to an information page (described in FIG. 5 below), a most recent load date 204 showing a date when each partner last uploaded data to database 16, a most recent accounting period 206 showing a date for each partner's most recent accounting period, a partner approval date 208 showing when a partner's approval of the monthly data was submitted, and a roll up check-box 210 shown next to each partner.

User interface 200 also includes a websites button 212, a help button 214, a submit button 216, and a navigation section 218. Navigation section 218 includes select partner pull-down list 220, and a plurality of tools including at least one of authorization for expenditure (AFE) system 221, file transfer 222, forecasts 224, hedging 226, input tools 228, listings 230, models 232, policy 6.0 234, pricing 236, reports 238, and log out 240.

In the example embodiment, user interface 200 enables users to select the name of a partner from a list to view data specific to that partner. The roll up feature enables a user to select all of the partners at once and perform actions on the group as a whole. In the example embodiment, select partner pull-down list 220 lists all of the partnerships that a particular user is allowed to see as well as enabling the user to "roll up" multiple partnerships for aggregate analysis.

Submit button 216 enables a user to execute the user selections. In the example embodiment, not all operations require the user to select submit button 216. However, in most cases, a user will make a series of selections from various drop down boxes, and then choose specific options, and then initiate execution by selecting submit button 216.

In the example embodiment, a user may click on any of the partner names 202 and "drill down" and view corresponding oil/gas fields that are included in that particular partner's oil/gas field list. A user can then further drill down on any of the fields or sub-entities displayed in the field list to drill down to the individual lease or well list that belongs to the specific partnerships.

A user may utilize the "roll up" function when applying any of the tools or procedures to a sum of all of the selected partnerships, as if the composite was one total partner. The roll up function may be used when glancing at accounting, production, rate time, and variance reports.

In the example embodiment, navigation section 218 includes a plurality of reporting, viewing, and modification tools available within PECS 10. Some of the tools work with the roll up function, and some of the tools work individually on selected partners. Additionally, some of the tools work only on an entire portfolio. These tools are discussed in greater detail herein below.

I. File Transfer Tools

File transfer tools 222 (shown in FIG. 5) include a download user files tool and an upload partnership reports tool.

FIG. 6 is an example embodiment of a user interface 260 displaying a download user files page within PECS 10 (shown in FIG. 1). User interface 260 shows a table of files to download. The table includes a delete column, a file name column, a date posted column, a posted by column, a file size column, a file type column, a report date column, and a comments column.

The download user files tool enables a user to access and download Microsoft® Powerpoint presentations, Microsoft® Excel spreadsheets, Microsoft® Word documents, Adobe® PDFs (Portable Document Format), or any other file types that have been uploaded to the repository. (Microsoft is a registered trademark of Microsoft Corporation, Redmond, Wash.; and Adobe is a trademark of Adobe Systems Incorporated, San Jose, Calif.). PECS 10 automatically launches the correct application on the user's computer to open the particular file type. Once a file has been downloaded, it can be viewed, saved, or printed.

In the example embodiment, once the download user files tool has been initiated, a matrix appears that is populated with names of available documents. The user selects the document to download by clicking on the file name. PECS 10 launches the application that is associated with the file being downloaded. The document is then opened in a new window. When a user is finished with the document, the user may close the document and return to PECS 10, or the user may continue working with the downloaded file and PECS 10 simultaneously.

Figure 7:
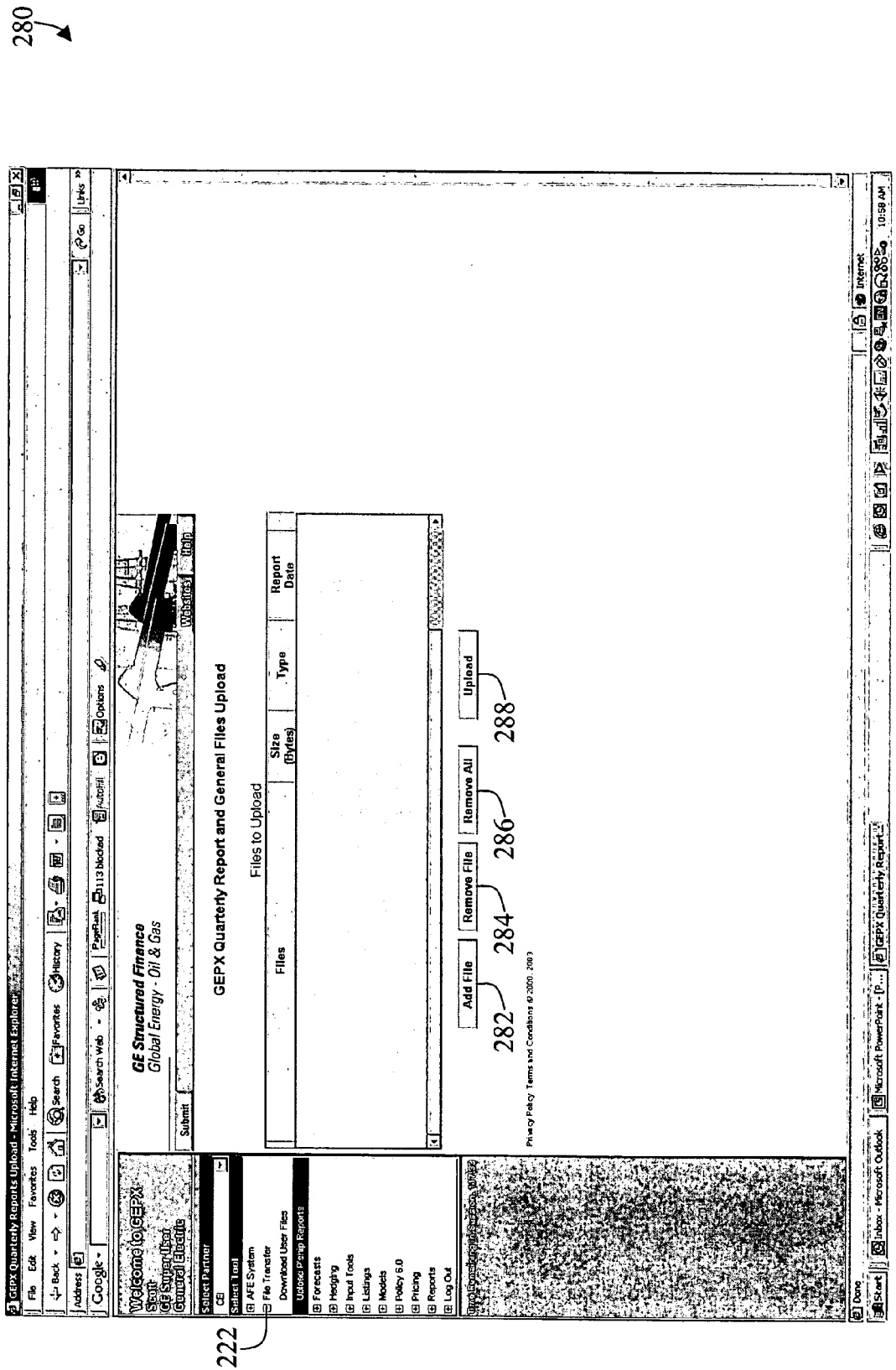
FIG. 7 is an example embodiment of a user interface displaying an upload partnership reports page within PECS.

FIG. 7 is an example embodiment of a user interface 280 displaying an upload partnership reports page within PECS 10 (shown in FIG. 1). User interface 280 shows a table that includes a files column, a size column, a type column, and a report date column. User interface 280 also includes an add file button 282, a remove file button 284, a remove all button 286, and an upload button 288.

The upload partnership reports tool facilitates the process of making production data available to system users. The upload partnership reports tool enables a user to upload Adobe® PDF files, Microsoft® Powerpoint presentations, Microsoft® Excel spreadsheets, Microsoft® Word documents, or any other files that a user would like to upload to the PECS 10 repository. A user uploads files by selecting the upload partnership reports tool, and then selecting upload button 288 so that a general files upload page is displayed. The user then selects the files to be uploaded from the user's computer system. Once the user has selected "yes" from a confirmation dialogue, the user will see the upload sequence followed by a successful upload message from the server.

II. Forecasting Tools

Forecasting tools 224 (shown in FIG. 5) include a forecast builder tool and a hedge production forecast tool.

Figure 8:
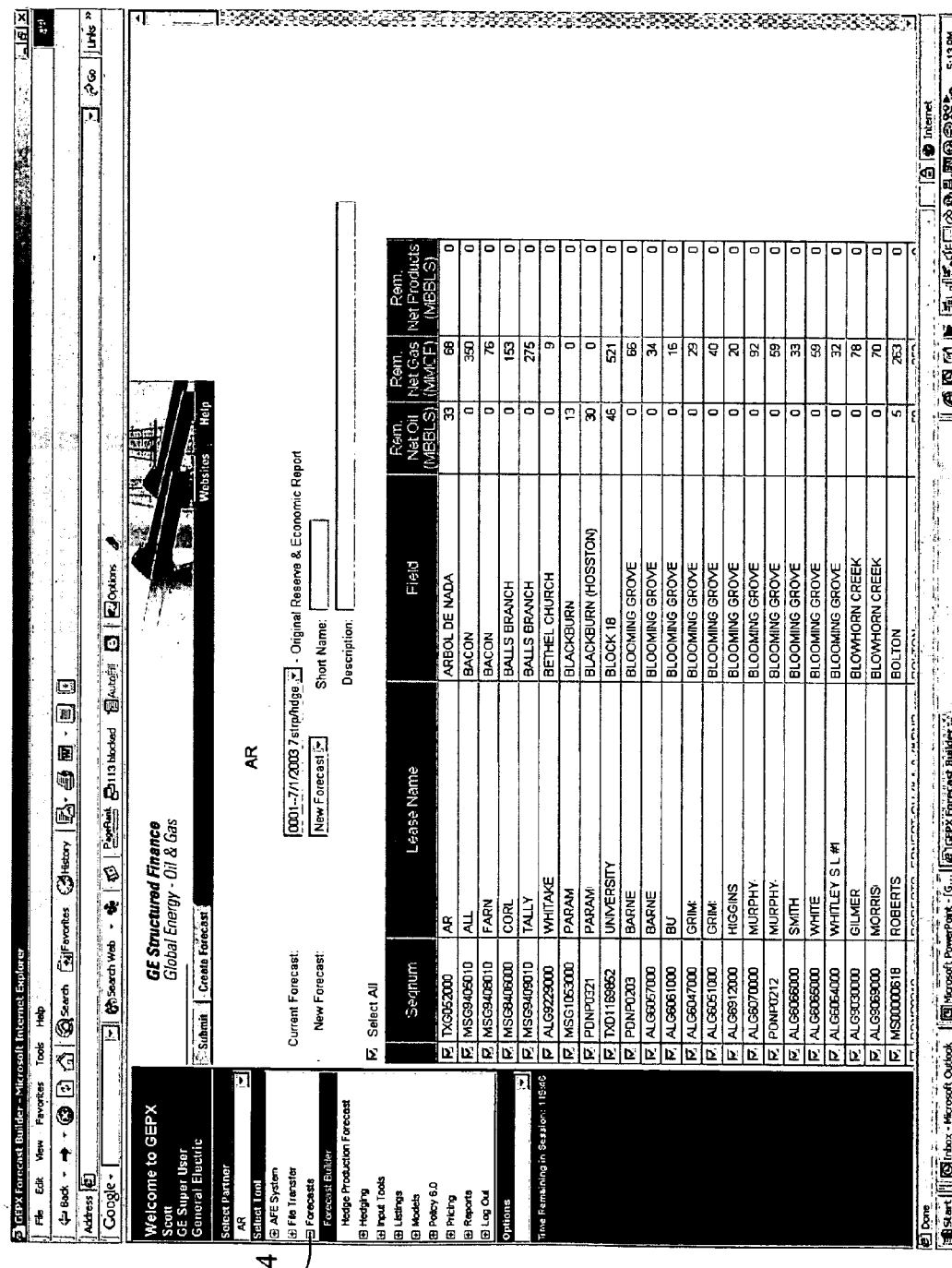
FIG. 8 is an example embodiment of a user interface displaying a forecast builder tool page within PECS.

FIG. 8 is an example embodiment of a user interface 300 displaying a forecast builder tool page within PECS 10 (shown in FIG. 1). User interface 300 includes a current forecast pull-down list, a new forecast pull-down list, a short name data field, and a description data field. The forecast builder page also includes a table having a seqnum column, a lease name column, a field column, a Rem. Net Oil (MBBLS) column, a Rem. Net Gas (MMCF) column, and a Rem. Net Products (MBBLS) column.

The forecast builder tool page displays current forecasts that are available for a given partnership. PECS 10 also enables a user to create new customized forecasts from this page. The partnership name shows the label that denotes the name of the partnership. The current forecast pull-down list enables a user to select a previously defined forecast from a list of available forecasts. The new forecast pull-down list enables a user to create a new forecast based on selected wells and desired ratios. The short name data field enables a user to enter a short name to reference the forecast. The description data field enables a user to enter a long description of the forecast. The seqnum is a sequence number for a lease or well. The field describes the gas/oil field name containing the well at issue. The Rem. Net Oil (MBBLS) displays barrels of oil remaining (in thousands) according to the current forecast. Rem. Net Gas (MMCF) displays cubic feet of gas remaining (in millions) according to the current forecast. Rem. Net Products (MBBLS) displays the net products remaining (in thousands) according to the current forecast.

Figure 9:
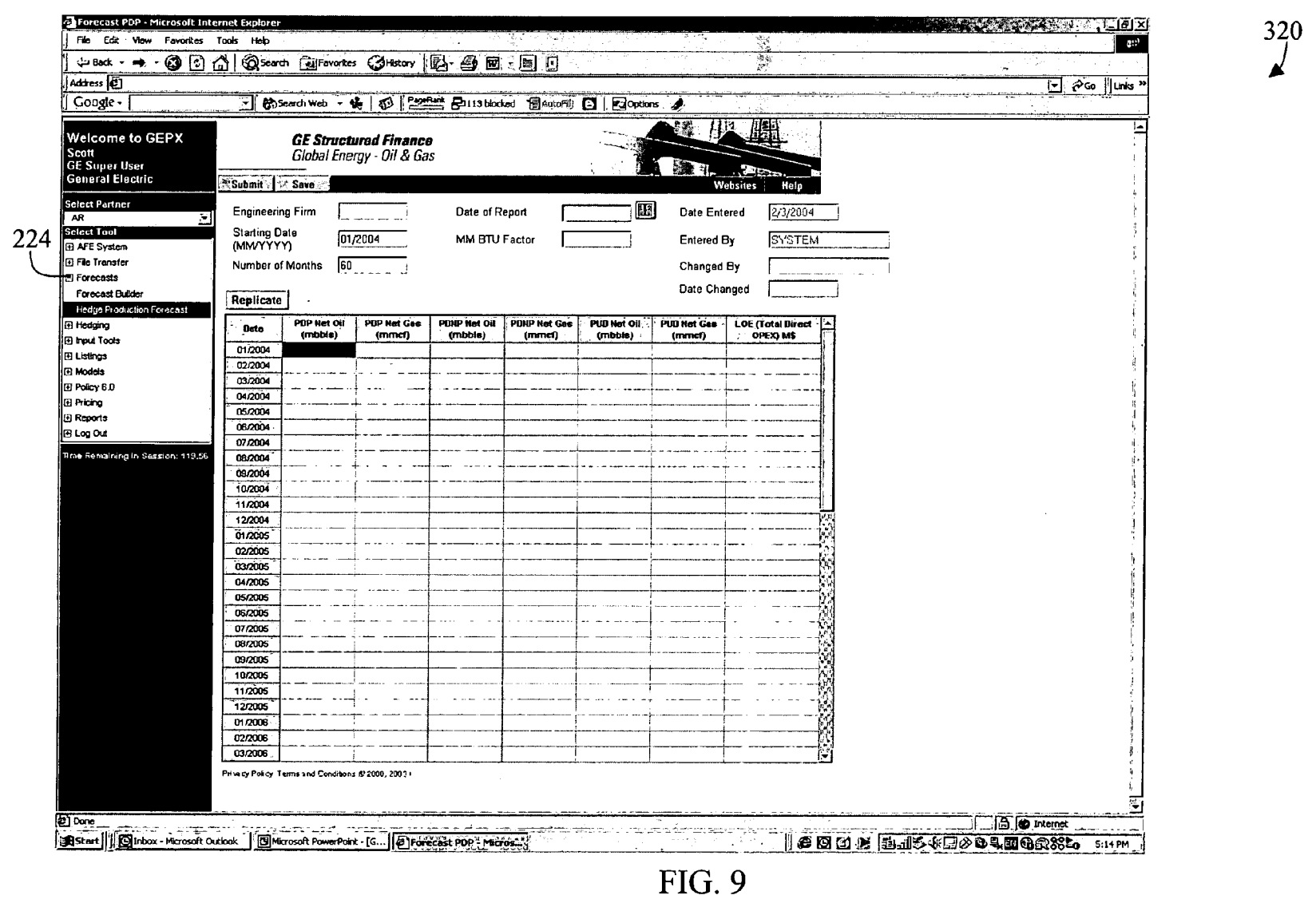

FIG. 9 is an example embodiment of a user interface 320 displaying a hedge production forecast tool page within PECS 10 (shown in FIG. 1). User interface 320 includes an engineering firm data field, a starting date data field, a number of months data field, a date of report data field, a MM BTU Factor data field, a date entered data field, an entered by data field, a changed by data field, and a date changed data field. The hedge production forecast page also includes a table showing a date column, a PDP Net Oil (mbbls) column, a PDP Net Gas (mmcf) column, a PDNP Net Oil (mbbls) column, a PDNP Net Gas (mmcf) column, a PUD Net Oil (mbbls) column, a PUD Net Gas (mmcf) column, and a LOE (Total Direct OPEX) column.

The hedge production forecast tool allows a user to create customized forecasts to be used with the various hedging tools included within PECS 10. The values that are entered become the basis for mathematical extrapolations performed throughout the other tools included within PECS 10.

III. Hedging Tools

PECS 10 (shown in FIG. 1) includes hedging tools. These hedging tools include a plurality of tools including at least one of: a bank management tool, a display hedge contracts tool, a FASB (Financial Accounting Standards Board) 133 evaluation model, a glance hedge partnership tool, a glance hedge portfolio tool, a hedge analysis tool, a hedge contract settle tool, a hedge contracts tool, a hedge portfolio setup tool, a hedge production forecast tool, a hedging future price tool, and a hub management tool.

Figure 10:
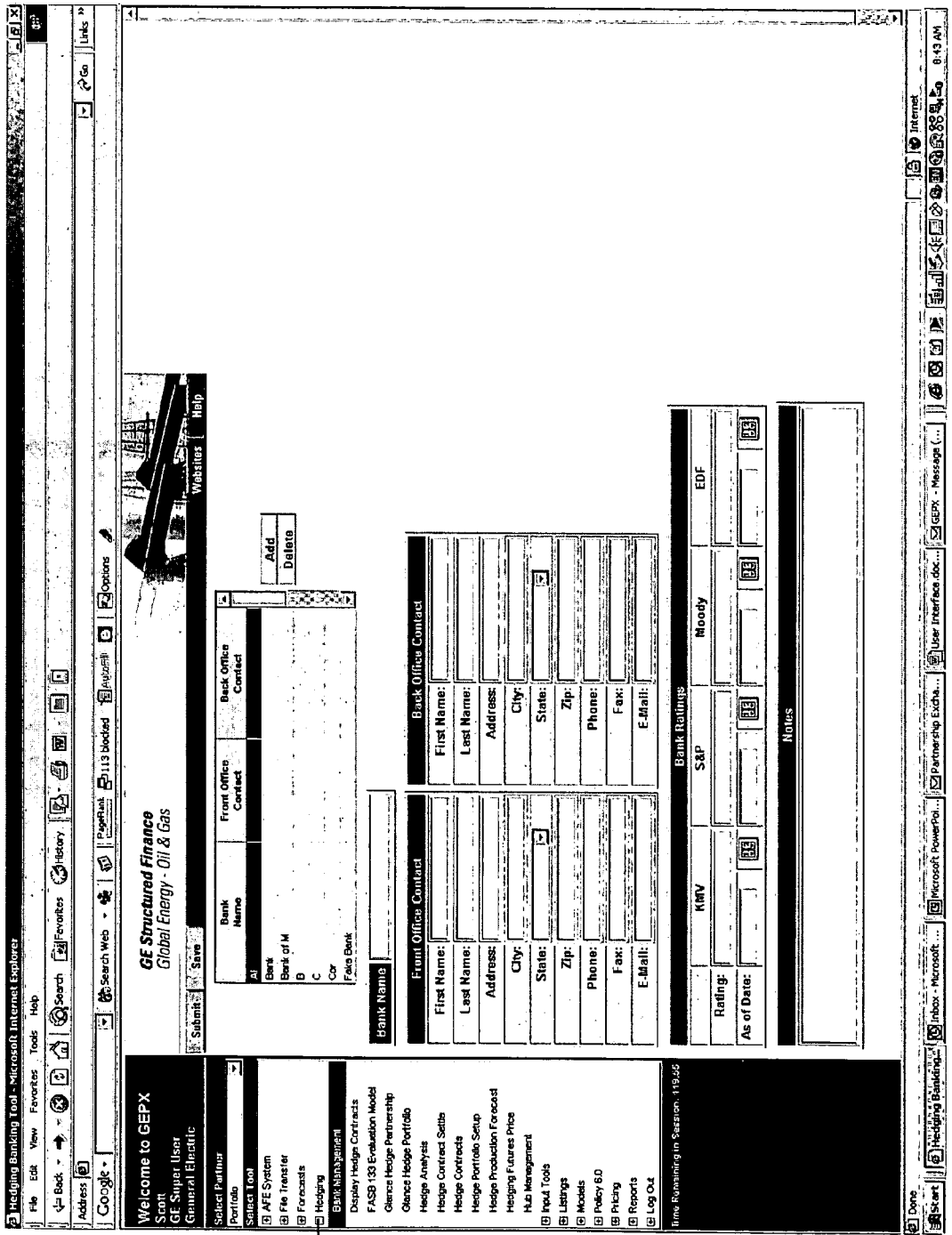
FIG. 10 is an example embodiment of a user interface displaying a bank management tool page within PECS.

FIG. 10 is an example embodiment of a user interface 330 displaying a bank management tool page within PECS 10 (shown in FIG. 1). User interface 330 includes a table showing a bank name column, a front office contact column, and a back office contact column. The bank management page also includes a bank name entry table, a front office contact entry table, a back office contact entry table, a bank ratings entry table, and a notes section.

To add a new bank to the database, a user selects an add button. This clears out the data fields of the tables shown on the bank management page, and enables the user to enter data pertaining to the new bank. A user is also enabled to delete an existing bank from the database. The user does so by selecting an existing bank by bank name from the table shown on the bank management page, and selecting a delete button.

Figure 11:
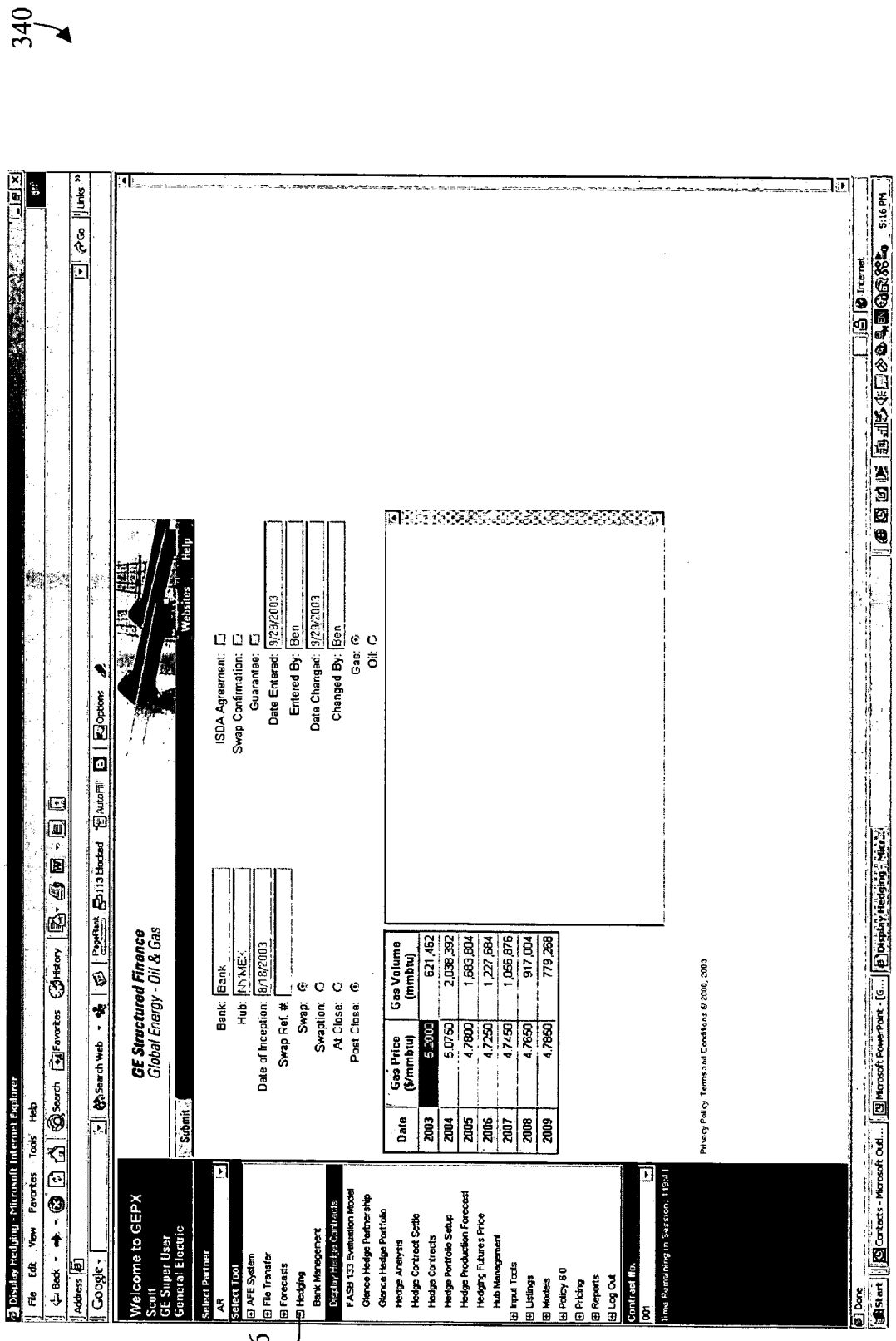
FIG. 11 is an example embodiment of a user interface displaying a display hedge contracts tool page within PECS.

FIG. 11 is an example embodiment of a user interface 340 displaying a display hedge contracts tool page within PECS 10 (shown in FIG. 1). User interface 340 includes a bank data field, a hub data field, a date of inception data field, a swap reference number data field, a swap radio button, a swaption radio button, an at close radio button, and a post close radio button. The bank data field includes the name of the bank that is carrying the contract. The hub data field contains the hub that was the basis of the contract. The date of inception data field contains the date that the contract began. User interface 340 also displays an ISDA agreement check box, a swap confirmation check box, a guarantee check box, a date entered data field, an entered by data field, a date changed data field, a changed by data field, a gas radio button, and an oil radio button.

The display hedge contracts tool enables a user to view and modify data pertaining to all of the contracts that have been created with banks and partnerships. A list of available hedging contracts to view can be found in the options menu. The available hedging contracts are sorted in the list numerically, based on contract number. To view a different hedging contract, a user selects a different contract from the option list and selects a submit button.

Figure 12:
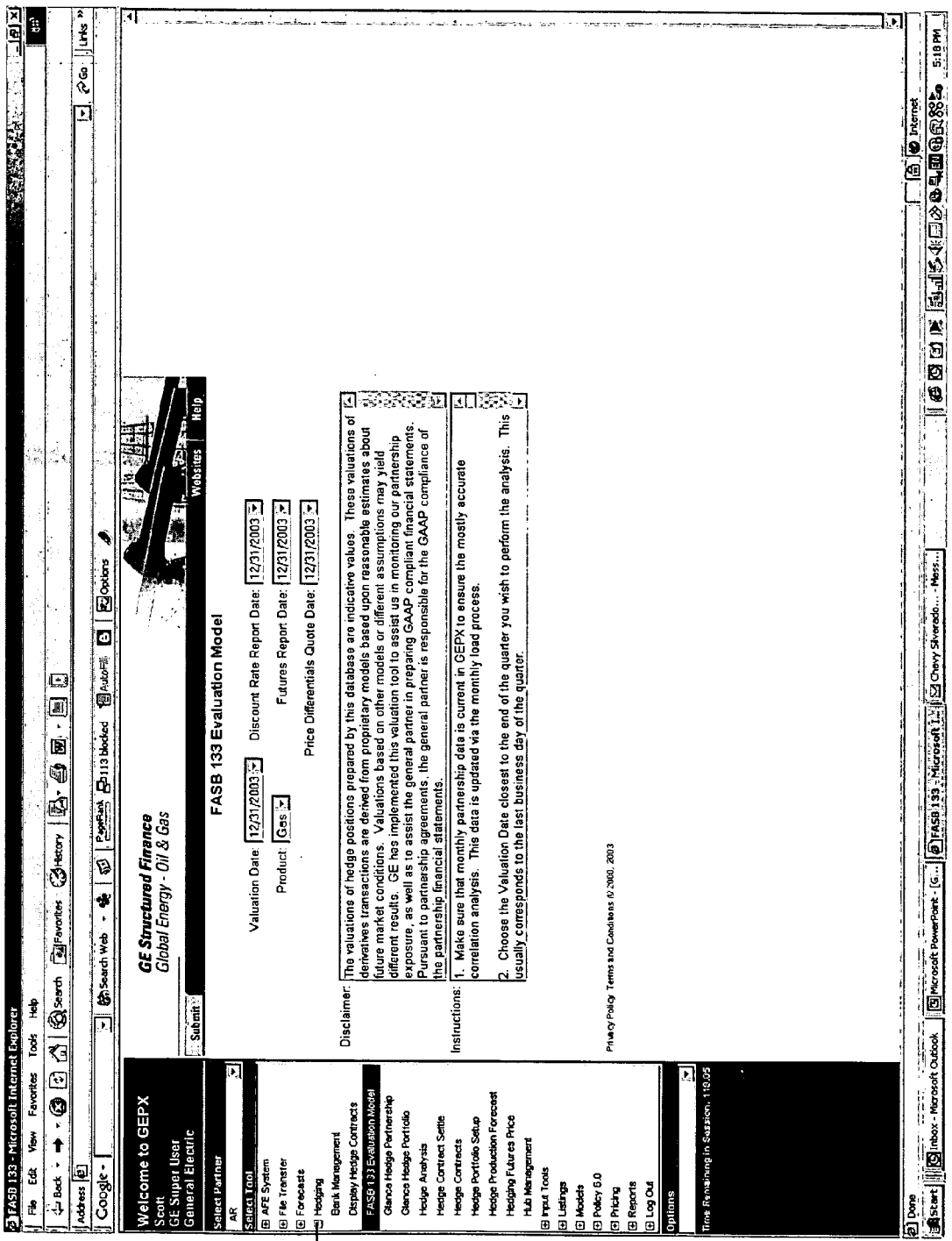
FIG. 12 is an example embodiment of a user interface displaying a FASB (Financial Accounting Standards Board) 133 evaluation model page within PECS.

FIG. 12 is an example embodiment of a user interface 360 displaying a FASB (Financial Accounting Standards Board) 133 Evaluation Model page within PECS 10 (shown in FIG. 1). User interface 360 includes a valuation date pull-down field, a product pull-down field, a discount rate report date pull-down field, a futures report date pull-down field, a price differentials quote date pull-down field, a disclaimer data box, and an instructions data box.

FASB 133 Evaluation Model applies SFAS No. 133. The Financial Accounting Standards Board (FASB) issued SFAS No. 133 "accounting for derivative instruments in hedging activities." SFAS No. 133 establishes accounting and reporting standards requiring that every derivative instrument (including certain derivative instruments embedded in other contracts) be recorded in a balance sheet as either an asset or liability measured at its fair value. SFAS No. 133 requires that changes in the derivative's fair value be recognized currently in earnings unless specific hedge accounting criteria are met. Special accounting for qualifying hedges allows a derivative's gains and losses to offset related results on the hedged item in the income statement, and requires that a company formally document, designate and assess the effectiveness of transactions that receive hedge accounting.

In the example embodiment, user interface 360 advises the user to: (1) make sure that the monthly partnership data is current within PECS 10 to insure the most accurate correlation analysis; (2) choose the Evaluation Date closest to the end of the quarter, which usually corresponds to the last business day of the quarter; (3) choose a product; (4) choose a discount rate report date closest to the end of the quarters, which usually corresponds to the last business day of the quarter and this is a discount rate curve quoted by a major A (or better) rated bank; (5) choose the futures report date closest to the end of the quarter, which usually corresponds to the last business day of the quarter and this is a product futures curve quoted by a major A (or better) rated bank; (6) when choosing natural gas evaluation, select the price differential quote date closest to the end of the quarter, this is a quote of the differential between local gas hubs and WTI NYMEX and is quoted by a major A (or better) rated bank; and (7) on the options drop-down box select generate spreadsheet.

Figure 13:
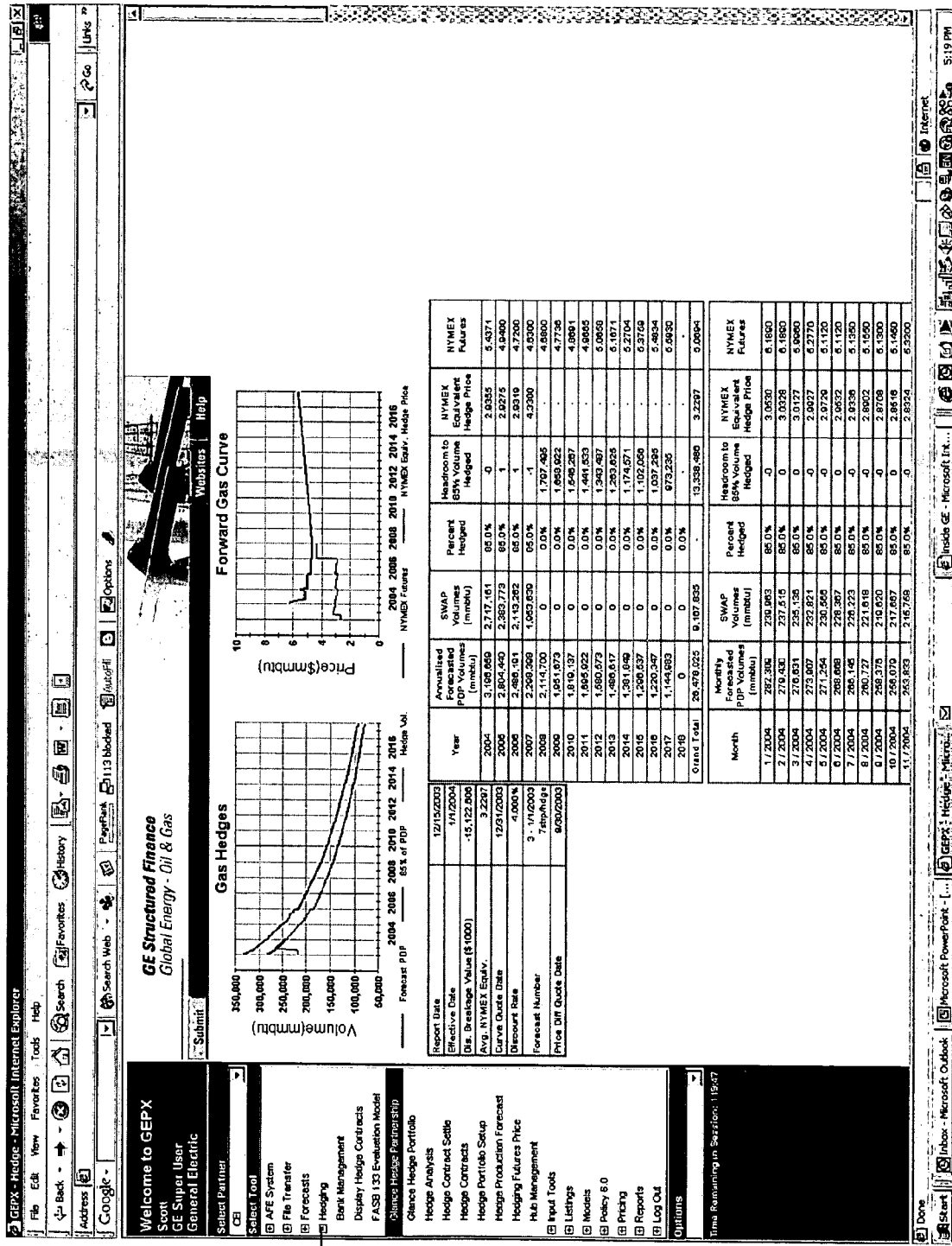
FIG. 13 is an example embodiment of a user interface displaying a glance hedge partnership tool page within PECS.

FIG. 13 is an example embodiment of a user interface 380 displaying a glance hedge partnership tool page within PECS 10 (shown in FIG. 1). The glance hedge partnership tool provides the user with detailed information about a particular partnership's hedge position in one location including hedge breakage gains or losses for both oil and gas as well as amount and percentage hedged for the life of the partnership.

User interface 380 includes gas hedges data grids, and forward gas curve data grids. These data grids can be manipulated by using the tools in the options list of PECS 10. In the example embodiment, available options for the glance hedge partnership tool include at least one of a futures curve date pull-down list, a price differential quote date pull-down list, a report date data field, a discount percent data field, and a forecast pull-down list. The futures curve date pull-down list enables a user to adjust the marked-to-market data by selecting a different date from the drop-down list. The date is used in determining the NYMEX price for oil and gas in the future. The date should be as close to the price differential quote date as possible. The price differential quote date pull-down list enables a user to select a different price differentials quote date from the drop-down list. The date is used to value swaps that are based on non-NYMEX gas. The date should ideally be the same as the futures curve date or at least as close as possible. The report date data field enables a user to select a report date from a drop-down list. Users may also use a built in calendar function to populate the date field. The report date should be the same as the fixture curve date and the price differential quote date, or as close as possible. The discount percent data field enables a user to specify a discount percentage value in the data field. This value is used when determining the hedge breakage gain or loss. The forecast pull-down list enables a user to select a different engineering forecast from the lists of available forecasts to use in valuing and displaying the hedge position.

A generate spreadsheet option enables a user to generate a Microsoft® Excel spreadsheet displaying glance hedge partnership information. A product option enables a user to toggle between product data. The product choices include gas or oil.

Figure 14:
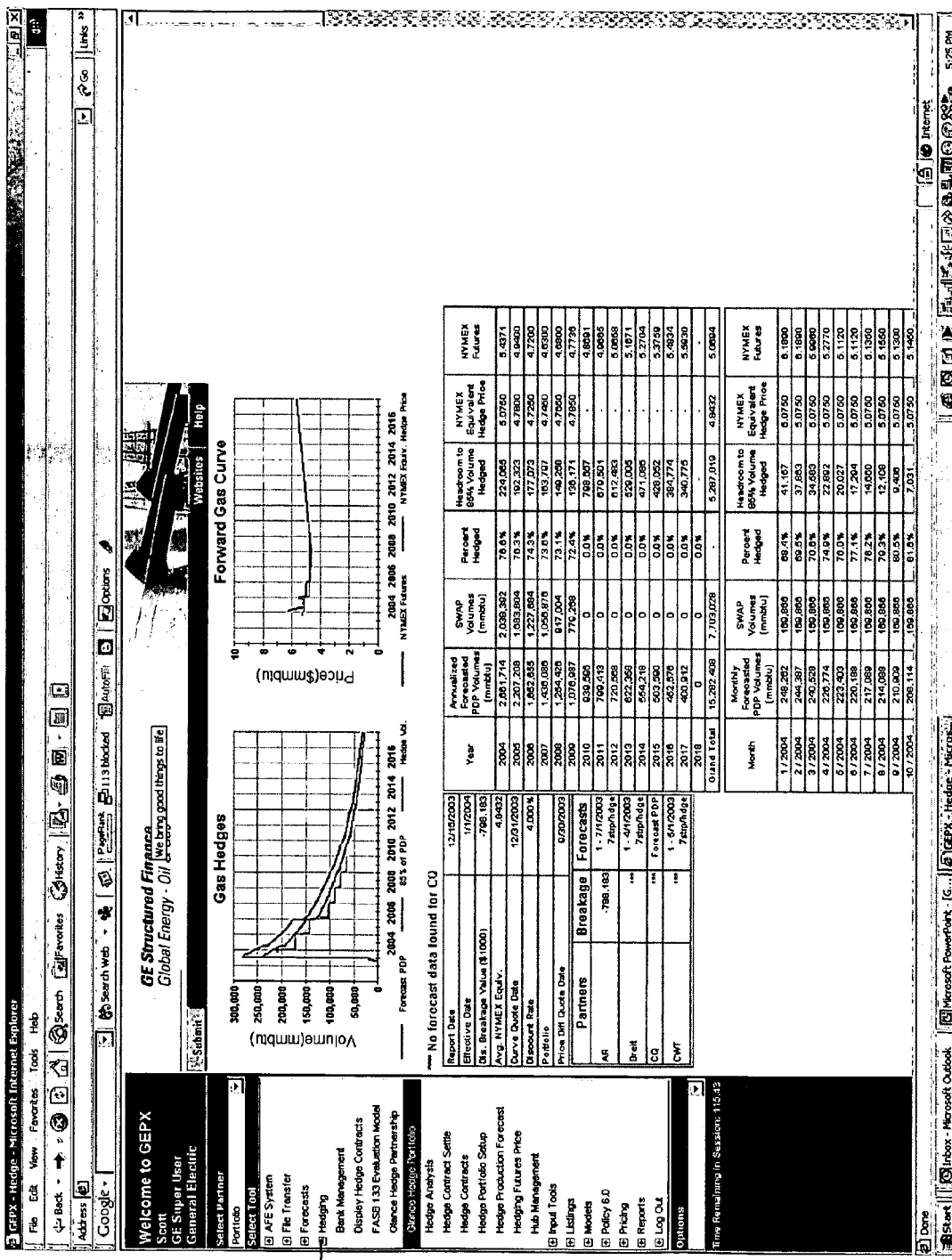
FIG. 14 is an example embodiment of a user interface displaying a glance hedge portfolio tool page within PECS.

FIG. 14 is an example embodiment of a user interface 400 displaying a glance hedge portfolio tool page within PECS 10 (shown in FIG. 1). The glance hedge portfolio tool page offers data similar to that found on the glance hedge partnership page (shown in FIG. 13). However, the data found on the glance hedge portfolio tool page is a summation of the aggregate data from all existing partnerships. The glance hedge portfolio page is designed to allow users to maintain hedging contracts with immediate on screen results. In the example embodiment, user interface 400 includes at least one of a gas hedges data grid, and a forward gas curve data grid. These data grids can be manipulated by using the tools in the options list.

In the example embodiment, options that are available on the glance hedge portfolio tool page include at least one of a generate spreadsheet option, and a product option. The generate spreadsheet option allows a user to generate a Microsoft® Excel spreadsheet including glance hedge portfolio data. The product option enables a user to toggle between product data including gas or oil.

Figure 15:
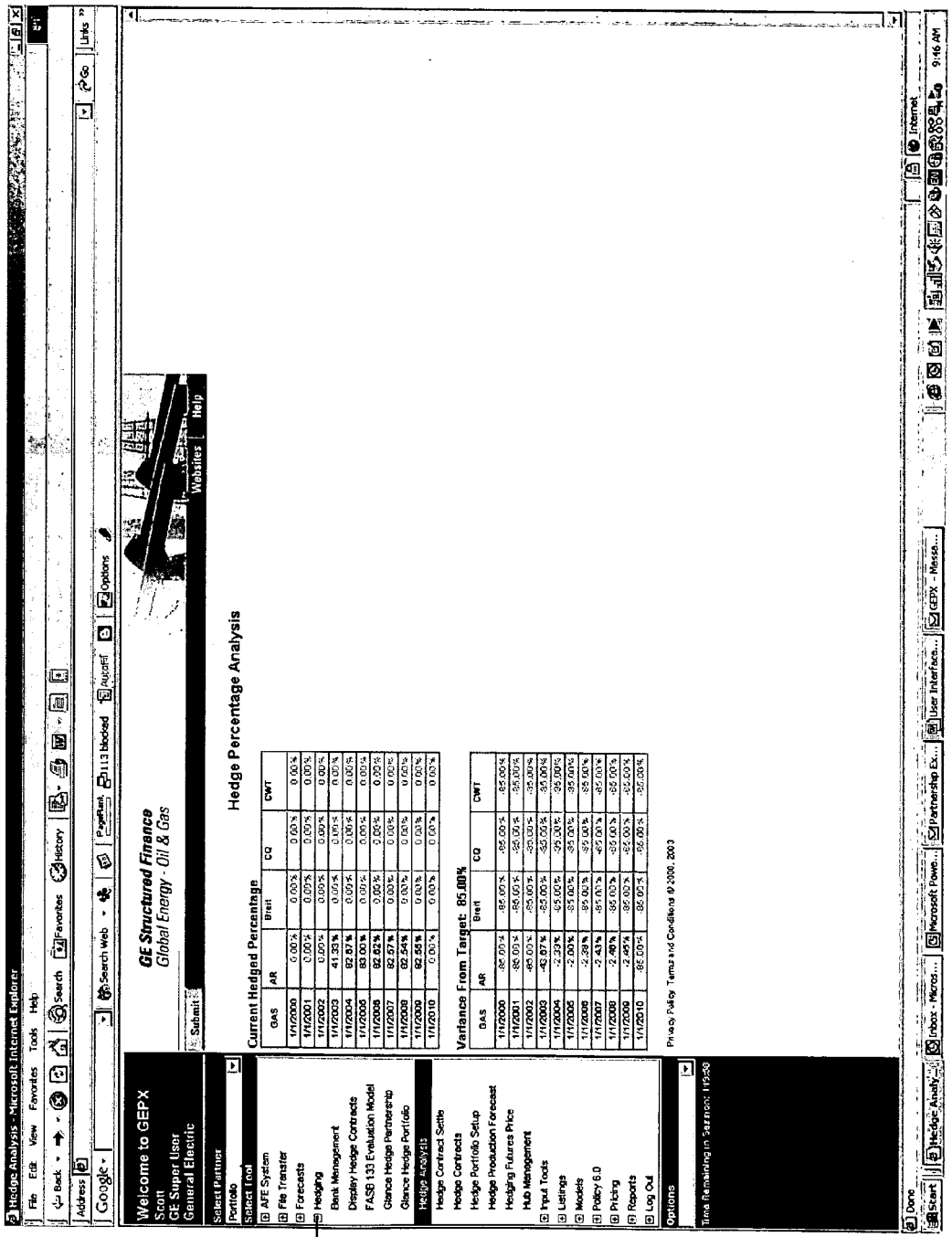
FIG. 15 is an example embodiment of a user interface displaying a hedge analysis tool page within PECS.

FIG. 15 is an example embodiment of a user interface 420 displaying a hedge analysis tool page within PECS 10 (shown in FIG. 1). The hedge analysis tool enables users to make a clear and concise analysis of hedge data. The current hedged percentage is presented on user interface 420 in the form of a data grid. The variance from target is also presented on user interface 420 via a data grid. Users have the ability to modify the criteria used for analysis by selecting items from the options menu. In the example embodiment, the default data view, when initiating the hedge analysis tool, includes two grids that display summary data for every partnership. Users can generate new grids based on product (oil and gas), target, and years. Additionally, users can generate an Excel® spreadsheet of the data.

In the example embodiment, user interface 420 includes at least a current hedged percentage grid, and a variance from target grid. Each partnership is represented across the top label area of the grid. By scrolling horizontally, a user can view hedged percentage and variance data for each partnership within the portfolio. The hedge analysis tool includes a plurality of options which allow users to manipulate the views based on user specified parameters. The options include at least one of product, target, years, and generate spreadsheet. The product (e.g., oil or gas) enables a user to view a new grid based on the selected product. The target enables a user to view a new grid based on a new target percentage. Entering a value in the target value data field will cause the resulting variance table to be based on the new percentage. The years data field enables a user to view a new grid based on the new range of years. The generate spreadsheet option enables a user to generate a Microsoft® Excel spreadsheet that can be saved, printed or viewed. The spreadsheet will match the parameters that have been determined by the user.

Figure 16:
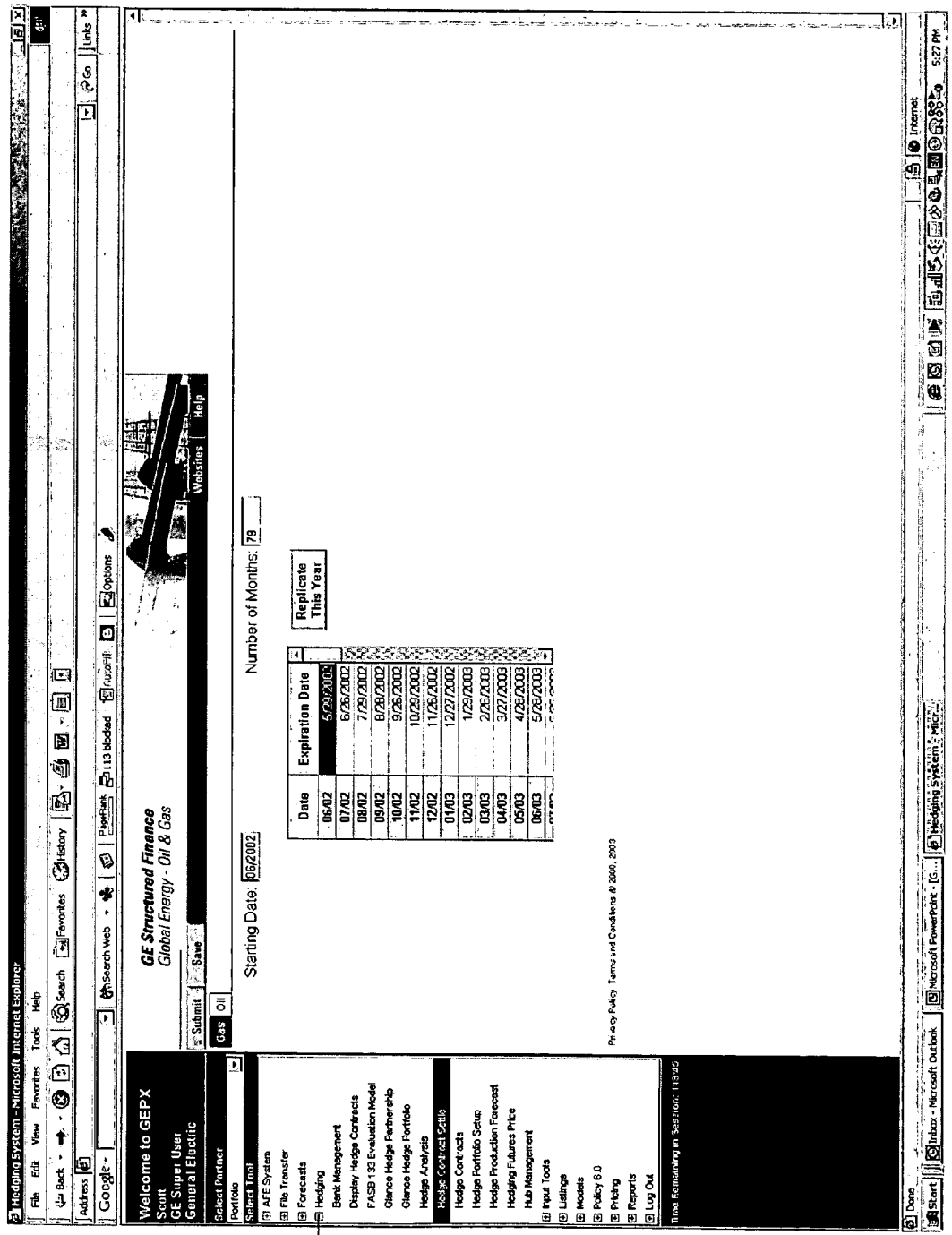
FIG. 16 is an example embodiment of a user interface displaying a hedge contract settle tool page within PECS.

FIG. 16 is an example embodiment of a user interface 440 displaying a hedge contract settle tool page within PECS 10 (shown in FIG. 1). The hedge contract settle tool enables a user to generate a data grid that is based on a starting date and a specified number of months. The hedge contracts settle tool also enables a user to view existing hedge contract information as well as enter new hedge contract information to the database. In the example embodiment, user interface 440 includes at least a starting date data field, a number of months data field, a gas tab, an oil tab, and a data grid.

Figure 17:
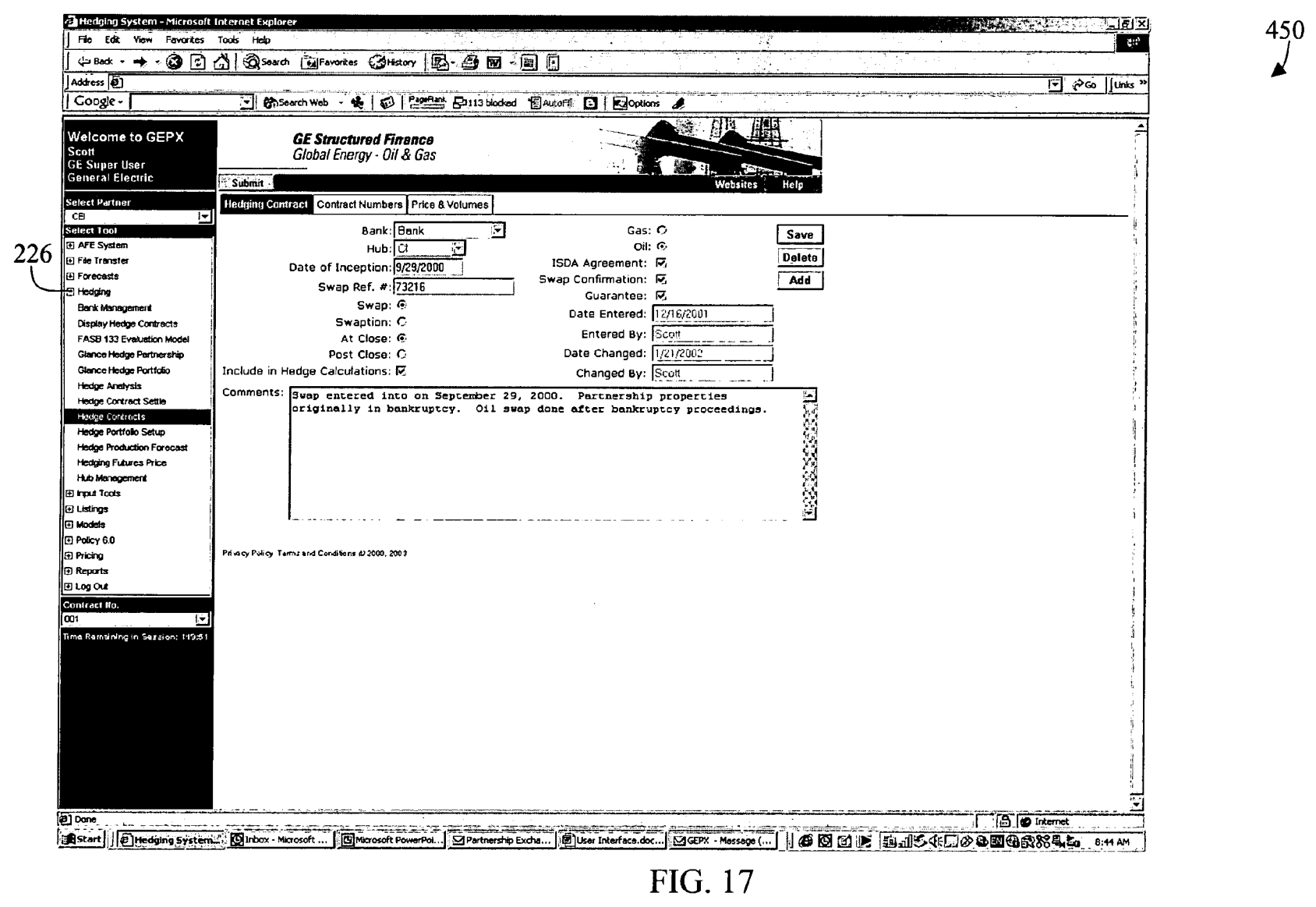

FIG. 17 is an example embodiment of a user interface 450 displaying a hedge contracts tool page within PECS 10 (shown in FIG. 1). The hedge contracts tool enables a user to view different hedge contracts by using an available contract number pull-down list to select a particular hedging contract from the list. In the example embodiment, user interface 450 includes a hedging contract tab, a contract numbers tab, and a price & volumes tab. The hedge contracts page also includes a bank pull-down list, a hub data field, a date of inception data field, a swap ref. # data field, a swap radio button, a swaption radio button, a at close radio button, a post close radio button, an include in hedge calculations checkbox, a gas radio button, an oil radio button, an ISDA agreement checkbox, a swap confirmation checkbox, a guarantee checkbox, a date entered data field, an entered by data field, a date changed data field, a change by data field, and a comments section.

To add a new hedging contract to the database, a user selects an add button. This clears out a form, and enables the user to enter data pertaining to the new hedge contract. A date entered data field as well as an entered by data field are automatically populated by the system based on the user's information. The hub data field is also automatically populated by the system to the value of the previous records hub. However, the user can change the name of the hub when adding a new hedge contract. After selecting the add button, the user then: enters the name of the bank that is carrying the contract; selects the hub that was the basis of the pricing information for this contract from a pull-down list; enters a date of inception, enters a swap ref. #; selects mutually inclusive radio buttons; selects a product either gas or oil; selects any of the three available check boxes denoting ISDA agreement, swap confirmation and guarantee; enters any comments or notes into the available text area; and selects the save button to commit this new hedge contract to the system database. Once the record has been saved to the database, the system automatically assigns a new sequential number to the hedge contract. The newly created hedge contract will appear in the contract number pull-down box.

A user is also enabled to delete an existing hedging contract from the database. The user does so by selecting an existing hedging contract from the contract number pull-down list, and selecting a delete button.

Figure 18:
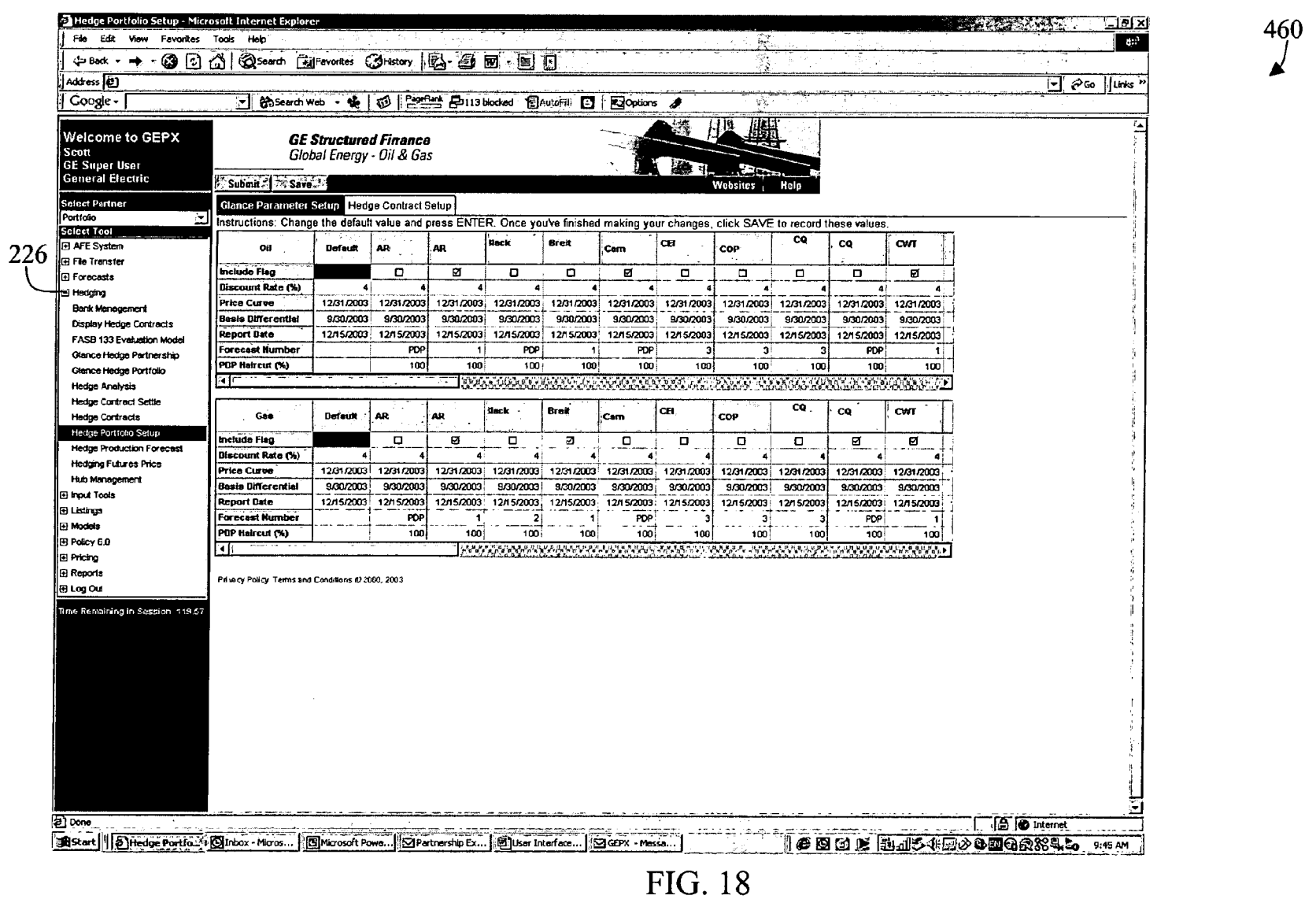

FIG. 18 is an example embodiment of a user interface 460 displaying a hedge portfolio setup tool page within PECS 10 (shown in FIG. 1). The hedge portfolio setup tool enables a user to enter values into a grid, and then select save to commit the changes to the database. The hedge portfolio setup tool is where the default values for PECS 10 hedging calculations are entered.

In the example embodiment, user interface 460 includes a glance parameter setup chart, and a hedge contract setup chart. The glance parameter setup chart includes a flag, a discount rate percentage, a price curve, a basis differential, a report date, a forecast number, and a PDP haircut percentage. This information is included for each partnership included in the portfolio and for both the oil and gas product. The hedge contract setup chart includes a partner name, a bank, a product, and a date range.

Figure 19:
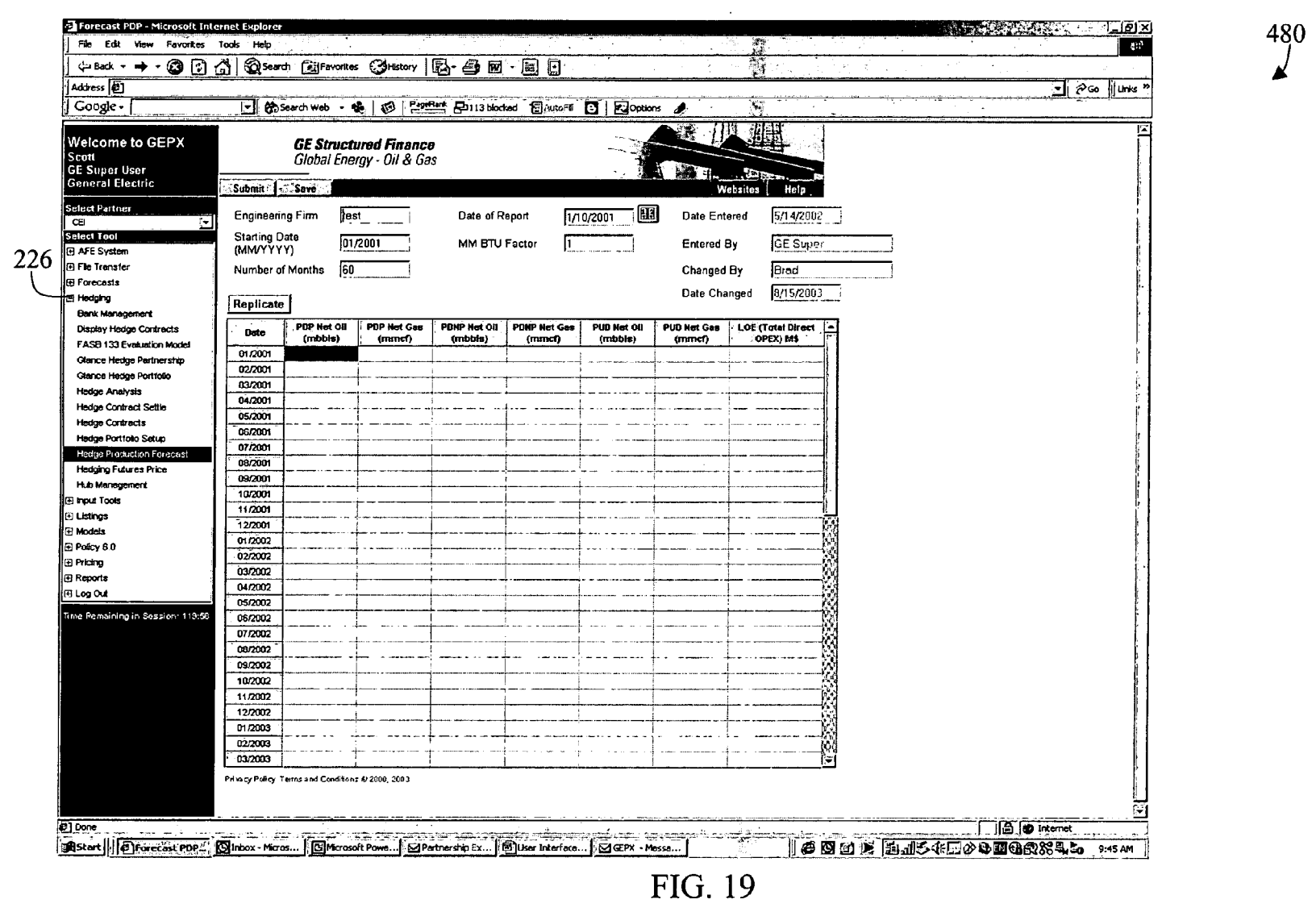

FIG. 19 is an example embodiment of a user interface 480 displaying a hedge production forecast tool page within PECS 10 (shown in FIG. 1). The hedge production forecast tool enables a user to create customize forecast to be used with the various hedging tools included within PECS 10. The values that are entered become the basis for mathematical extrapolations performed throughout the other tools included in PECS 10.

In the example embodiment, user interface 480 includes an engineering firm data field, a starting date data field, a number of months data field, a date of report data field, an MM BTU factor data field, a date entered data field, an entered by data field, a changed by data field, a date changed data field, a replicate button, and a table that includes a date column, a PDP Net Oil (mbbls) column, a PDP Net Gas (mmcf) column, a PDNP Net Oil (mbbls) column, a PDNP Net Gas (mmcf) column, a PUD Net Oil (mbbls) column, a PUD Net Gas (mmcf) column, and a LOE (Total Direct OPEX) column.

Figure 20:
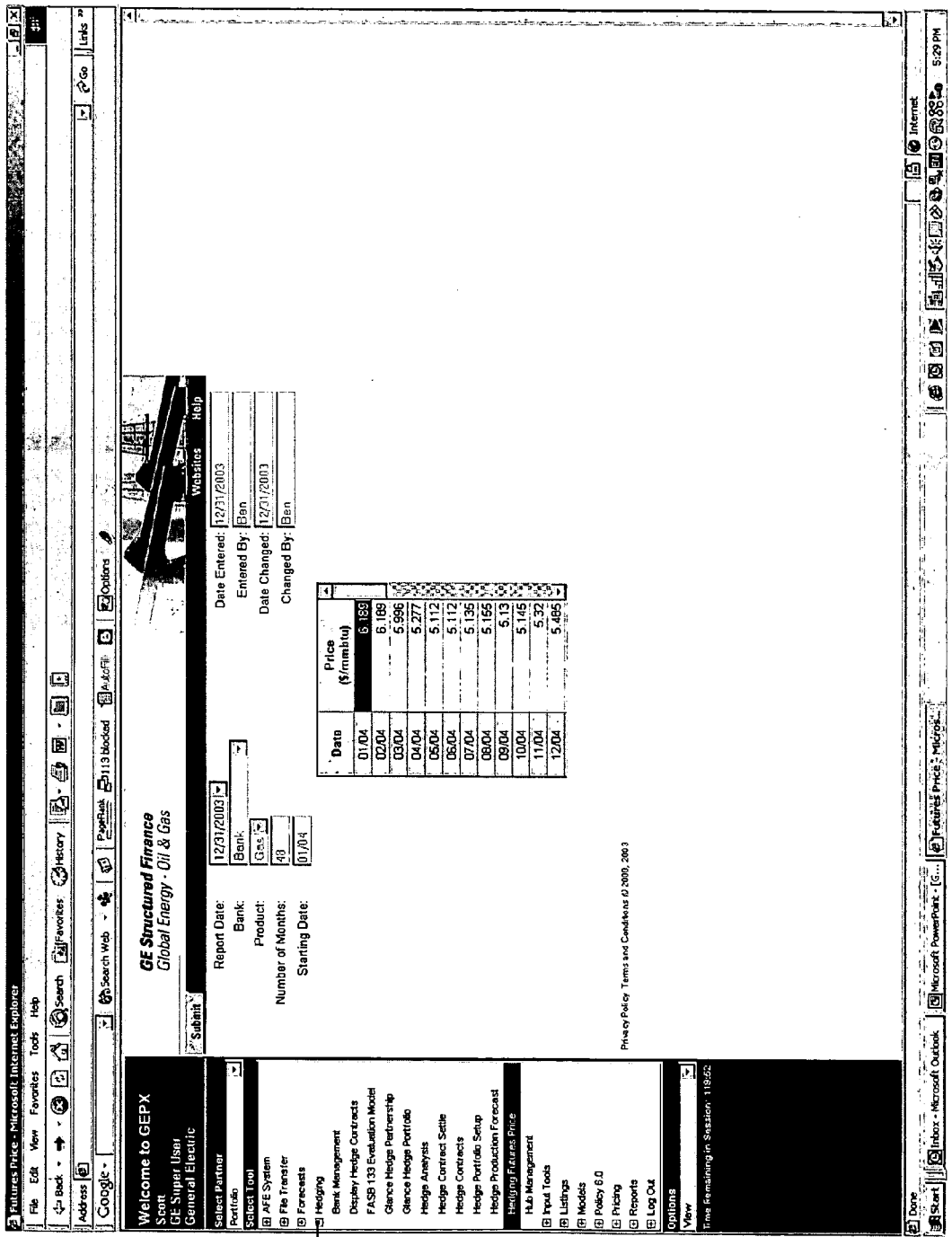
FIG. 20 is an example embodiment of a user interface displaying a hedging futures price tool page within PECS.

FIG. 20 is an example embodiment of a user interface 500 displaying a hedging futures price tool page within PECS 10 (shown in FIG. 1). The hedging futures price tool is designed to store daily quotes for oil and gas futures contracts. A quote must be obtained from a creditworthy bank and is usually done so daily by the underwriting team. The daily quotes are located on the underwriting drive. PECS 10 is designed with maximum flexibility so that it can accommodate quotes on an annual or month basis. However, the data is stored and entered in monthly buckets.

In the example embodiment, user interface 500 includes a report date pull-down list, a bank data field, a product pull-down list, a number of months data field, a starting date data field, a date entered data field, an entered by data field, a date changed data field, a changed by data field, and a chart showing a date column, and a price column.

While in a view mode, a user may select a different report date and the system will generate a new data grid on the fly. Similarly, a user can toggle between oil and gas in the product pull-down list to view the database on product category. In the example embodiment, when a user initiates the hedging futures price tool, the view mode is the default. To view a report from a different date, a user utilizes the report date pull-down list to select a different date or uses the product pull-down list to toggle between oil and gas.

When a user modifies an existing hedging futures price report, some of the data fields change from "grayed out" to an editable state. In addition, a replicate button as well; as a save button will be displayed. The modify optional allows a user to change pricing, modify the number of months displayed, the starting date, and the bank. Selecting the save button commits the changes to the database.

When the user selects "New" from the options menu, the system reveals a new instance of the hedging futures price report. The New mode clears the current record and allows a user to enter a fresh quote. The user enters the new information in the data fields provided. When the user has completed entering the data, the user selects the save button to commit the changes to the database. The replicate button will automatically populate the remainder of a given year with the value entered in the price column. To use replication, a user must enter a price in the price data field for a given year, select replicate, and the system will place the cursor at the beginning of the next year after running replicate. The system will not, however, populate prior blank fields in a given year.

Figure 21:
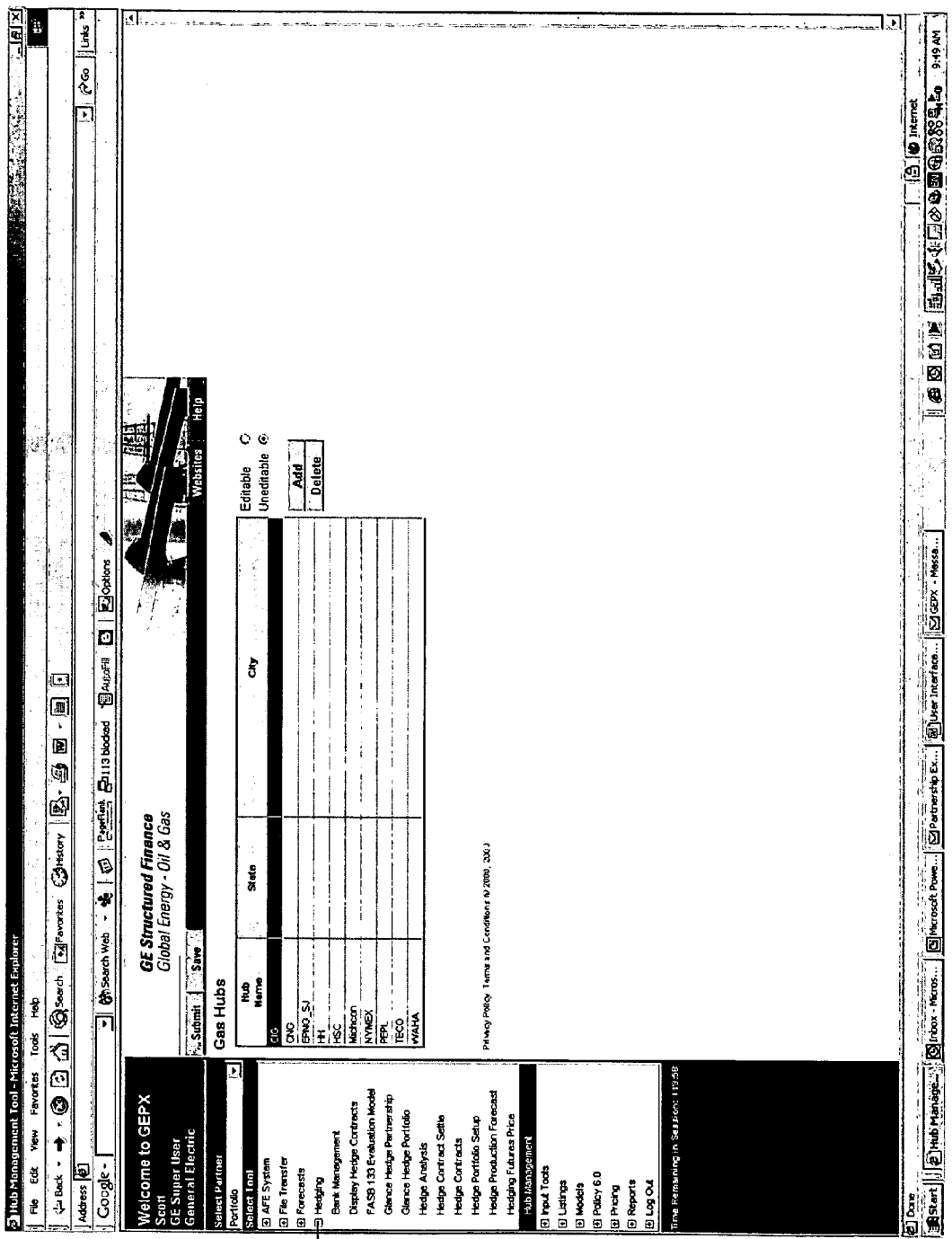
FIG. 21 is an example embodiment of a user interface displaying a hub management tool page within PECS.

FIG. 21 is an example embodiment of a user interface 510 displaying a hub management tool page within PECS 10 (shown in FIG. 1). User interface 510 includes a table showing a hub name column, a state column, and a city column. The hub management page also includes editable/uneditable selection radio buttons, an add button, and a delete button.

IV. Authorization for Expenditure (AFE) System

PECS 10 (shown in FIG. 1) includes an Authorization for Expenditure (AFE) System. The AFE System includes an AFE summary tool, and an AFE system tool.

The AFE tools facilitate submission of capital expense requests. Capital expense items, in the form of AFEs (authorization for expenditure), are a vital aspect of value enhancement for many oil and gas fields. An AFE is an industry standard process by which one entity communicates a request for approval of capital to another entity. PECS 10 uses the AFE as the process by which the operator of a partnership communicates AFE items to general and limited partners. In many cases, the General partners and operator are the same or similar entity.

Figure 22:
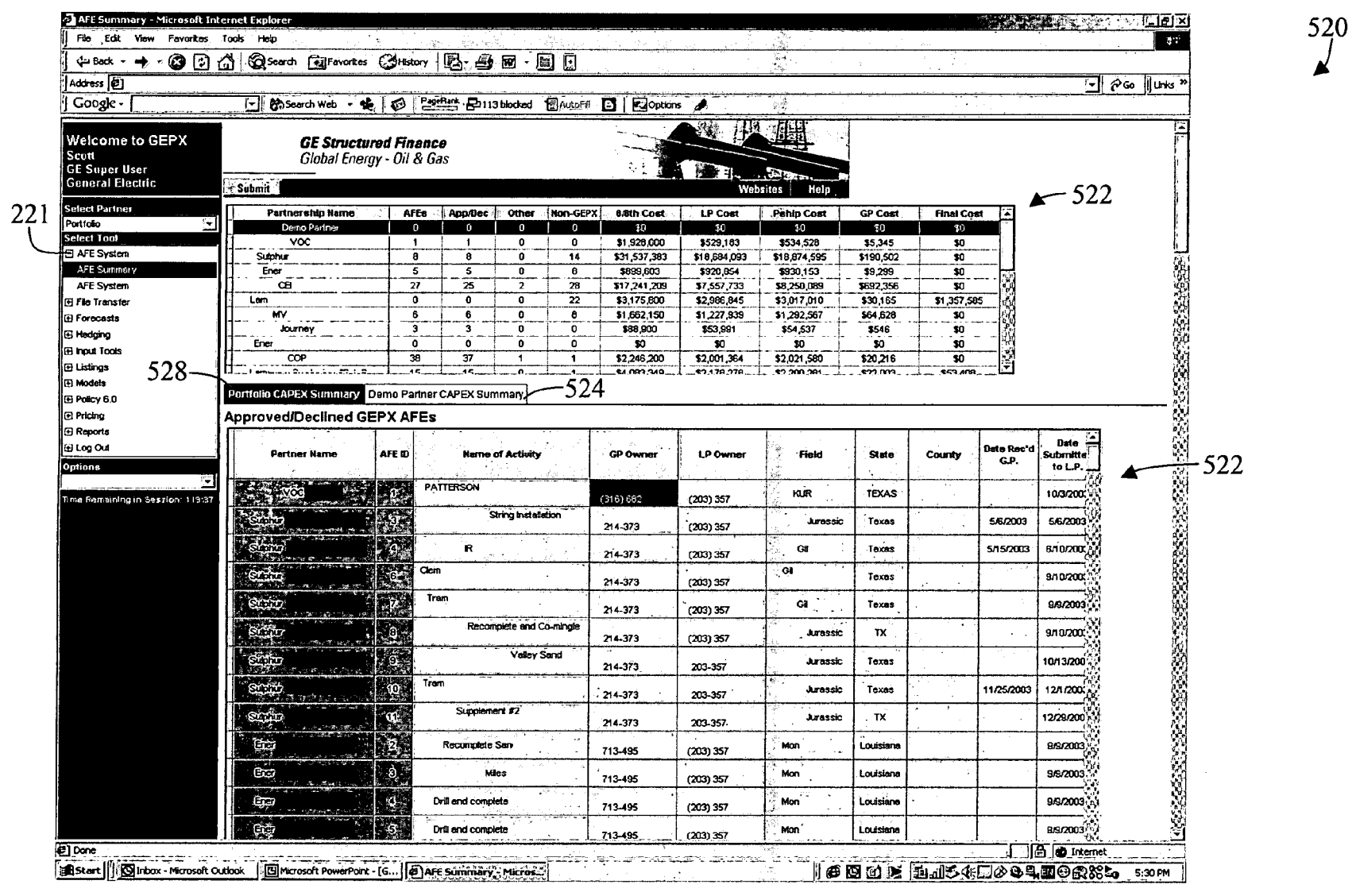

FIG. 22 is an example embodiment of a user interface 520 displaying an AFE summary tool page within PECS 10 (shown in FIG. 1). User interface 520 includes an ActiveX data grid 522 that lists each of the partnerships. Users can click on any part of a row in this grid to make the selected partnership become the focus of a second tab 524 on an ActiveX grid 526 found on the bottom half of the user interface. A portfolio CAPEX summary tab 528 lists all AFEs submitted by all partnerships. To view AFEs submitted by only a selected partnership, users must first select the appropriate partnership name from ActiveX data grid 522 at the top of the page, and then select the partner name-CAPEX summary tab 524. The result is a list of AFEs submitted by only the selected partner.

Figure 23:
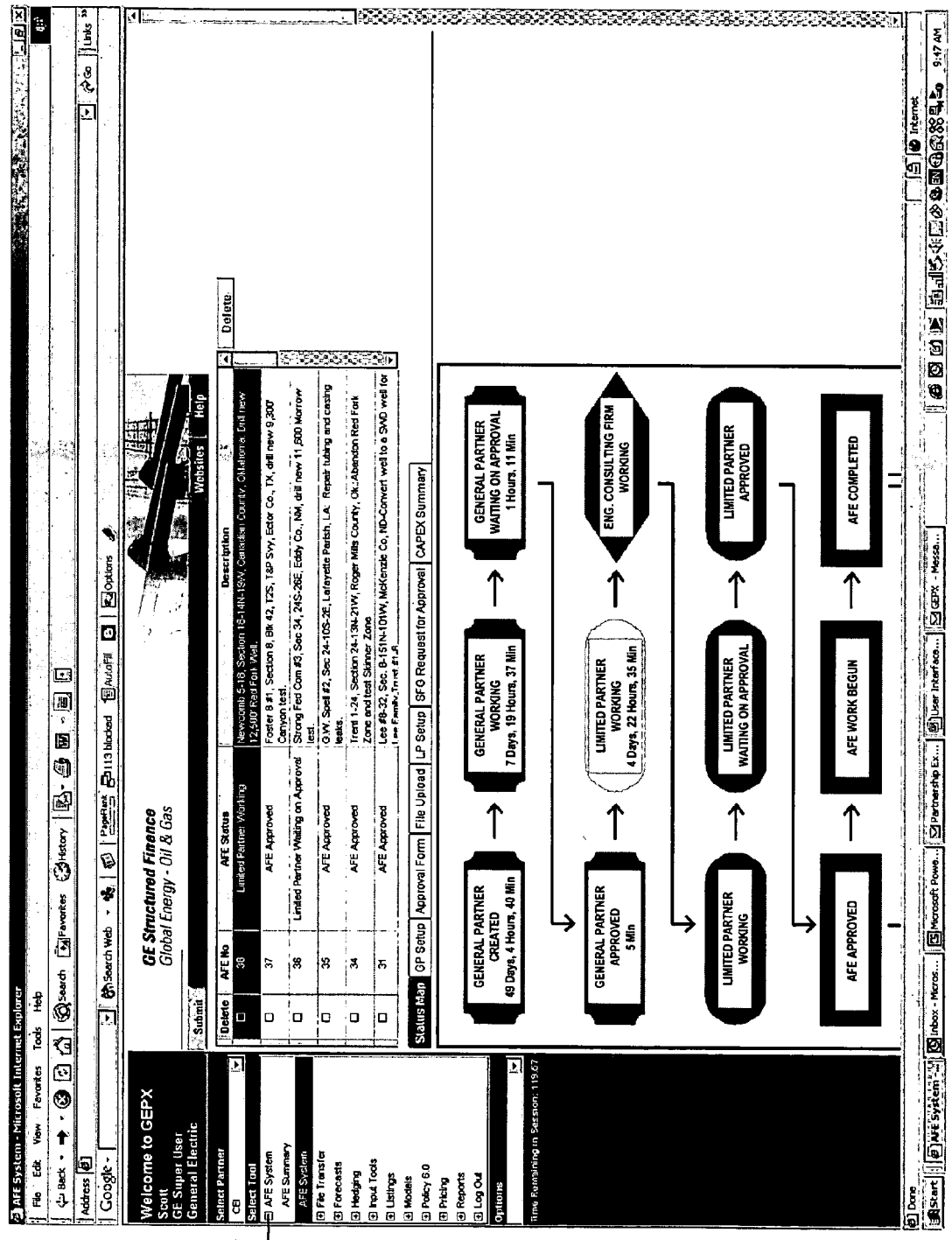
FIG. 23 is an example embodiment of a user interface displaying an AFE system tool page within PECS.

FIG. 23 is an example embodiment of a user interface 540 displaying an AFE system tool page within PECS 10 (shown in FIG. 1). The AFE system tool facilitates the submission of AFEs with respect to the process defined within a partnership structure. More specifically, the AFE system tool facilitates at least one of: a creation of a suitable AFE packet by a general partner including a clear and concise presentation of all information that will assist a limited partner in making a quick and timely decision; an inclusion of text and graphic image files relevant to the AFE; a General Partner approval process; a submission of the AFE to a limited partner; a limited partner review of technical and economic data; an engineering consultant review of technical and economic data; a generation of appropriate internal approval forms; a limited partner approval process; and subsequent tracking of technical and economic performance metrics.

In the example embodiment, the AFE system tool also includes: a status map that graphically illustrates the AFE's current step in the process, including timestamps indicating the amount of time spent at each step; an ability to create and use going forward an AFE owner and teams; dynamic communication tools that allow AFE owners, teams and approvers to communicate; inclusion of an engineering auditing consultant to opine on specific, high-risk opportunities; and an ability to track performance of AFEs not originally created using the AFE system.

User interface 540 also includes a plurality of tabs that enable a user to navigate the AFE system tool. The tabs include at least one of a status map tab, a general partner setup tab, an approval form tab, a file upload tab, a limited partner setup tab, an SFG request for approval tab, and a CAPEX summary tab. The AFE system tool is designed as a multi-tab tool. Each tab closely corresponds to a step in the AFE submission and approval process. The first time a user navigates to the AFE system, and no AFEs have been generated prior in the system, the default page is the CAPEX summary. The CAPEX summary is where both Limited Partners (LP) and General Partners (GP) users will continuously track and update the status of all AFEs pertaining to a particular partnership included within PECS 10.

An ActiveX grid at the top of each tab (with the exception of the CAPEX summary tab) shows all AFEs in the order in which they were created. To update the information on a particular tab for an AFE listed in the grid, the user clicks anywhere on the row of the desired AFE. The browser will automatically refresh and display the new information. When changing tabs, the information on the new tab is from the AFE that was last viewed. The grid defaults to the ten most recently created AFEs. For a GP, an AFE delete check box is available to the user who created the AFE ("GP AFE owner") up until the AFE has been sent to the LP for approval. After which, the AFE is available to be deleted by the LP owner. The AFE number is the representation of the numeric order in which the specific AFE was created in the system database. An AFE status is the AFE's current step in the approval process. A description is the name assigned to the AFE by the GP AFE owner. Additional options for the AFE selection grid are available from an options drop-down box on the main menu on the left-hand side of the screen. Additional options and functionality include: an ability to collapse the entire grid; an ability to expand the grid to view a maximum of ten (10) AFEs or more with the scroll bar; an ability to filter AFEs based on approval status or key words/terms in the descriptor; and an ability to show all after a filter has been run.

The AFE system tool includes a status map tab. The status map tab is designed to allow all interested parties of the GP, LP and the engineering consulting firm to monitor the progress of a particular AFE through the system. The tab is dynamically updated by PECS 10 to reflect the past and current steps in the AFE's approval process. The timeliness in responding to capital requests is critical to quality and the value of enhancing activities of the GP. The AFE system tool is designed around the goals of a quick approval process and the ability to track and measure the performance of the capital items. The system is also designed to process items such as the purchase and sale of assets. The status map tool included within the AFE system tool uses colors and symbols to depict the status of the AFE. The colors in the color legend are used within symbols that are used to represent the process flow of the life cycle of an AFE. The flow map arrangement is meant to replicate the process by which an AFE is generated, submitted, reviewed, discussed, approved and tracked.

The AFE system tool includes a GP setup tab. The GP setup tab is where the AFE owner, AFE staff and AFE approvers define and complete the tasks associated with creating the AFE. The AFE number and description appear at the top of the active part of the GP setup tab. The AFE owner defaults to whichever user created the AFE. The AFE owner has the responsibility to: choose a staff to work on the AFE; choose approvers who will sign off on the work completed; insure that all data is clearly defined and presented in the approval form and that all relevant files are attached in the file upload tab; and send the AFE to a Limited Partner. To add AFE staff members, an AFE owner selects an add staff member button, selects the task and task owner from the drop-down boxes, types comments and instructions to that particular AFE task owner in a comments and instruction box, and repeats this process for as many AFE task owners as there are required to complete the AFE generation process. After completing the final step, the AFE owner clicks a save all button under the AFE owner section. This saves the information. A send to AFE staff button will initiate e-mails to the users defined in the AFE staff area. Adding approvers in a similar matter is done under the approver section.

The AFE staff and the AFE owner populate the approval form and the file upload feature. The approval form contains many data fields, some automatically populated, that relate to the specific technical and economic merits of the AFE. The Approval Form includes the most commonly asked questions regarding an AFE's technical and economic merits. Completion of most or all of the fields in this section will expedite evaluation of the AFE. As such, the AFE owner and staff have full access to the approval form and the File Upload tool. Once the user's tasks have been completed, a complete check box is clicked. The user may also add additional comments and instructions to that box in addition to the original one by the AFE owner. Once the complete check box has been checked and the save all button clicked, the additional comments and the new status will be communicated back to the AFE owner via e-mail. If the AFE owner is unsatisfied with the work on the AFE, the owner can elect to send the AFE back to a particular AFE staff member with comments. This is accomplished by a show/send message button available only to the AFE owner. When the message is sent via the send message button, the respective AFE staff member is unchecked as complete and should satisfy the AFE owner's comments and recheck complete.

The AFE system tool, by default, positions the AFE owner as the first approver. Once the AFE staff have satisfactorily completed the construction of the AFE and the AFE owner has identified approvers, the AFE owner must check the approve box and click the approve button in the approvals area. At any point, if an approver declines the AFE, an e-mail is sent to the AFE owner and all prior approvals are unwound. If an AFE is declined, the declining approver should include comments as to why the AFE was declined. These comments are incorporated into the e-mail to the AFE owner. The AFE owner should then send the AFE back to the AFE staff or make the appropriate modifications.

An e-mail is sent to the AFE owner as soon as all approvals have been granted. To send the AFE to the LP, the AFE owner must click the send to LP button located under the AFE owner area. The AFE will not be viewable in any form to the LP until that button is activated. The AFE is not visible to the LP during the AFE generation phase. This is also the last opportunity for the AFE owner to delete the AFE without permission from the LP.

An e-mail will be sent to all approvers, both LP and GP, and the LP and the GP AFE owners once the LP has completed the approval process. The GP may track the progress of the AFE through the LP approval process by viewing the Status Map tab. After which it will be the GP's responsibility to complete the CAPEX summary on a monthly basis in compliance with the partnership agreement.

The AFE system tool also includes an Approval Form tab. The approval form tab delineates the most commonly asked questions for internal approval. With respect to a particular AFE, not all fields will need to be populated, but where the information is pertinent or germane to the AFE, it should be included. In the example embodiment, the AFE approval form is broken down into at least a basic information section, a general information section, a partnership interest section, an additional partnership interest section, an operatorship section, an engineering report section, a general partner outside interest section, a general information section, an economics section, an explanation of risked and unrisked economics section, an additional details of AFE activity section, an estimated AFE activity results and performance section, a comments and other information section, and an approvals section.

In the example embodiment, the basic information section includes information relating to the partnership, timing, and general comments. The general information section begins to define specific information relating to the AFE opportunity. The general information includes at least one of an AFE number, an activity type, an expenditure type, a well or entity name, a lease name, a field name, a county name, a state name, a description, and a total capital investment required.

In the example embodiment, the partnership interest section defines the allocation of AFE costs, partnership entity working, and net revenue interests. This information must be completed for accurate review of the opportunity. Some fields are automatically calculated. The partnership interest section includes a chart displaying an AFE in hours, net revenue interest percentage, and a net working interest percentage for the LP share, GP share and partnership share.

In the example embodiment, the additional partnership interest section defines the allocation of potential additional AFE costs that result from non-consenting working interest owners. This information must be completed for accurate review of the opportunity. If this section is not completed, an additional working interest is allocated to the partnership, and then another AFE must be submitted. The additional partnership interest section indicates whether there are potential additional NRI and NWI due to non-consenting parties, and whether the additional potential NWI and NRI have been included in the economics. The additional partnership interest also includes a dollar exposure, a net revenue interest percentage, and a net working interest percentage for an LP share, a GP share, a partnership share, and a total potential.

In the example embodiment, the operatorship section is designed for summary information regarding the entity operating the AFE activity. The operatorship section indicates whether the AFE is to be operated by the General partner and indicates the operators name.

In the example embodiment, the engineering report section forms the foundation by which a business entity makes a decision subsequent to close. The activity is described in the engineering report such that the cycle time for the approval process can oftentimes be shortened. The general partner outside interest section defines additional operation parameters. It addresses additional general partner working interests outside the partnership, operational experience in the area, independent reserve auditing, reserve categorization, and non-consent penalties. The general information section supplies more general information about the Limited partner and the General partner.

In the example embodiment, the economics section is critical to the general partner and limited partner approval process. Not all AFE procedures require economics to be constructed. However, most opportunities qualify to have a discounted cash flow analysis constructed. These analyses facilitate a quick analysis of the economic benefits of a particular opportunity. The economic analysis should be build using commonly accepted guidelines such as quantify the incremental reserve/economic benefit of the opportunity, use of defined risk factors and pricing guidelines, integration of portfolio post-drill performance analysis of past AFEs, current pricing, and appropriate treatment of sunk costs versus current costs.

In the example embodiment, the explanation of risked and unrisked economics section is designed to communicate quantitative and qualitative information relative to the construction of the economics of the opportunity. It is here where a user indicates any methodologies or risk factors that contributed to the construction of the economics.

In the example embodiment, the additional details of AFE activity section includes a text box designed to communicate information regarding the procedures of the opportunity (i.e., how the operation will be completed, AFE construction techniques, and any mechanical/field facility issues). The estimated AFE activity results and performance section includes a text box designed to communicate the expected results of the opportunity. This information should include estimated ultimate recoveries, initial production rate, and general economic benefit information. The comments and other information section includes a text box designed to communicate any additional information.

In the example embodiment, the approvals section includes an area that is automatically populated by the system with the information of the AFE owner from the general partner and the vice president of the limited partner. The general partner information is populated when the AFE is sent to the limited partner and the limited partner information is populated when the final approver has indicated so.

The AFE system tool also includes a file upload tab. The file upload tool enables AFE staff to upload files into PECS 10 for all users involved in the AFE review process to view. These users would include general partner users with access to that specific partnership, limited partner users with access to that specific partnership, and engineering consultant staff with access to that specific partnership. In the example embodiment, to initiate the file upload process, a user clicks on an add file button. A common windows browser appears allowing the user to navigate to the appropriate directory on their person computer. The user then clicks on the files to be uploaded and then an open button on the browse window. If multiple files are to be uploaded, which can be accomplished if the files are in the same directory, then a user clicks on the first file, and then holds the control key (Ctrl) down while selecting subsequent files. The file name, size, task owner, and task are automatically populated. The comment box is available for any additional comments pertaining to that file.

To remove a file from the list before uploading, highlight the row by clicking in any of the grid cells in that row and clicking a remove file button. To remove all the files, click on the remove all button. The user may then start the file upload process all over again. To activate the process to upload the files into PECS 10, the user clicks on an upload button. Internet Explorer will then copy the files to the system server. Once the files have been successfully uploaded, they can be viewed in the file manager. Comments can be added and saved here by typing in the comments box of the appropriate file and clicking the save button. Additionally, the user that uploaded the file may delete the file by checking the delete box associated with the file and clicking the delete button. The file is then erased from the database. Files may not be deleted after the AFE has been sent to the Limited Partner for approval.

The AFE system tool also includes an LP Setup tab. The LP setup tab is where the AFE owner, AFE staff, and AFE approvers define and complete the tasks associated with reading and approving the AFE. It is the LP AFE owner's responsibility to choose a staff to work on the AFE, including an engineering consulting representative, if appropriate; choose the appropriate approvers who sign off on the AFE; and insure that all data is clearly defined and presented in the request for approval.

In the example embodiment, to add AFE staff members, a user clicks on an add staff member button, selects the task and task owner from a drop-down box, and types comments and instructions to that particular AFE task owner in the comments and instruction box. The user repeats this process for as many AFE task owners as are required to complete the AFE generation process. If an engineering consulting representative is selected as an AFE staff member, when the AFE is sent to the staff, an e-mail will be generated and sent to the engineering consulting representative outside of the business entity. That staff member will then be directed to the AFE via an engineering review tab. In the example embodiment, not every AFE is reviewed by an outside engineering consulting representative. After completing this step, the user clicks on the save all button under the AFE owner. This saves the information. The send to AFE staff button will initiate e-mails to the users defined in the AFE staff area. In the example embodiment, approvers are also added in a similar manner under the approvals section.

The AFE staff and the AFE owner review the approval form data and populate and insure the accuracy of the data on the request for approval tab. The tab was designed specifically after and to include the content for a typical oil and gas internal SFG Request For Approval ("RFA"). The Request For Approval form contains some fields that are automatically populated from other tabs in the AFE system and other tools in PECS 10.

In the example embodiment, users with limited partner and engineering consultant representative status have access to all tabs in the AFE system except the GP setup tab. The GP setup tab is confidential to the users with general partner access to that particular partnership to insure confidentiality in constructing the AFE.

Once specific tasks have been completed, the user should click the complete check box next to the comments and instructions box. The user may also add additional comments and instructions to that box in addition to the original one by the AFE owner. Once the complete check box has been checked, the user will click on a save all button. The additional comments and the new status will be communicated back to the AFE owner via e-mail. If the AFE owner is unsatisfied with the work on the AFE, the owner can elect to "send the AFE" back to a particular AFE staff member with comments.

In the example embodiment, the AFE system, by default, positions the AFE owner as the first approver. Once the AFE staff have satisfactorily completed the construction of the AFE and the AFE owner has identified approvers, the AFE owner must check the approve box and click an approve button in the approvals section. The AFE owner may then add comments to the comment box for the other approvers to view. The AFE owner's comments along with both the PECS and AFE URLs are incorporated into an e-mail that is sent to the next approver on the approval list. The list is hierarchical and as each member on the approval list signals so and adds comments, those along with all prior comments are incorporated into an e-mail and sent to the next approver. When the AFE reaches the last approver, all comments from prior approvers are incorporated into the e-mail notification that an AFE is waiting to be approved. It is incumbent on the LP AFE owner to determine the level of approval needed for a specific AFE.

At any point, an approver declines the AFE, an e-mail is sent to the AFE owner and all prior approvals are unwound. If an AFE is declined, the declining approver should include comments as to why the AFE was declined. These comments are incorporated into the e-mail to the AFE owner. The AFE owner should then send the AFE back to the AFE staff or make the appropriate modifications.

An e-mail is sent to both the LP and GP AFE owners as soon as all the LP approvals have been granted. The status is updated on the AFE selection grid at the top of the page and the AFE is moved from the AFE's in progress to the approved/declined AFEs on the CAPEX summary tab.

The AFE system tool also includes an Engineering Review tab (not shown). The engineering review tab is only visible to the engineers accessing the AFE system. The engineering consulting reviewer evaluates high risk opportunities or opportunities that fall outside the normal realm of operating. AFEs that qualify for engineering consulting review include, but are not limited to, high risk, not reviewed in prior engineering reports, large projects, significant time has expired since last engineered, operated by entity other than general partner, and overall partnership performance below expectations. The engineering consultant representative is assigned by the limited partner AFE owner.

Once the review has been completed, the user clicks a complete check box next to a comments and instructions box. The user may also add comments and instructions to that box. Once the complete check box has been checked, the user clicks a save all button. The additional comments and the new status will be communicated back to the AFE owner via e-mail.

The AFE system tool also includes a SFG Request for Approval tab. The SFG Request for Approval tab includes the content of a typical oil and gas internal SFG Request for Approval. The Request for Approval form contains some data fields that are automatically populated from other tabs in the AFE system and other tools in PECS 10. Completion of most or all of the fields in this section will expedite approval of the AFE.

The SFG Request for Approval tool includes a date data field, an exposures section, a well name data field, a lease name data field, a field name data field, a county name data field, a state name data field, an expenditure type pull-down list, an activity type pull-down list, a request data field, a background data field, a description data field, a partnership interest section, an economics data field, an analysis section, a risk analysis data field, a recommendation data field, and an approvals section.

The AFE system tool also includes a CAPEX Summary tab. The CAPEX Summary tab summarizes AFE information for all AFEs from a particular partnership. The CAPEX summary tab includes approved/declined AFEs, other AFEs in process, and non PECS AFEs. The non-PECS AFEs are AFEs that were generated and approved manually and entered into the system to be tracked.

The CAPEX summary tab populates information automatically in as many cells as possible based on the information entered into the approval form as well as personal information from the user maintenance tools. Cells that are grayed out are automatically populated and cannot be manually overridden. The non-PECS AFE grid contains primarily all manually entered cells. The other PECS AFEs in process grid does not contain any manually entered cells. Manually entered cells for these AFEs will appear after the AFE has been approved and moved to the approved/declined AFEs grid. The CAPEX summary is exportable into Microsoft® Excel spreadsheet format by using a generate spreadsheet function in the options menu on the main menu. Each of the categories described will appear as a separate worksheet.

V. Input Tools

PECS 10 (shown in FIG. 1) includes input tools. These input tools include a plurality of tools including at least one of: an asset play tool, assumptions, a flip payout, setup tool, a mail tool, a partner setup tool, a user entered data tool, a user information tool, and a user maintenance tool.

Figure 24:
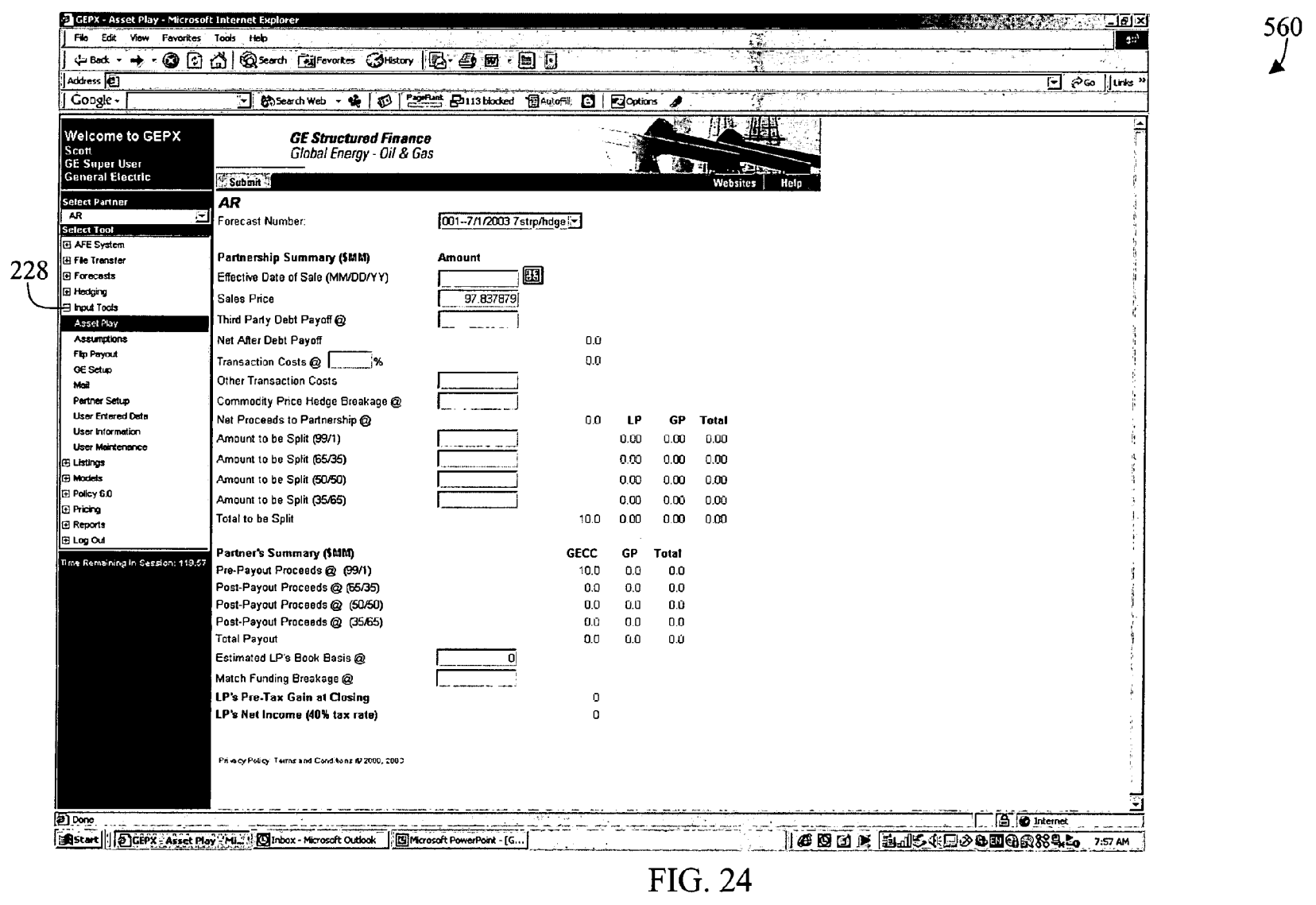

FIG. 24 is an example embodiment of a user interface 560 displaying an asset play tool page within PECS 10 (shown in FIG. 1). The asset play tool determines the potential gain/loss from a sale of a given asset based upon a forecast selected by the user. In the example embodiment, user interface 560 includes a forecast number pull-down field, a partnership summary section, and a partner's summary section.

The partnership summary section includes an effective date of sale data field, a sales price data field, a third-party debt payoff data field, a transaction cost percentage data field, other transaction costs data field, a commodity price hedge breakage data field, and a plurality of data fields relating to an amount to be split. The partners summary section includes pre-payout proceeds information, post-payout proceeds information, an estimated LPs book basis data field, and a match funding breakage data field.

Figure 25:
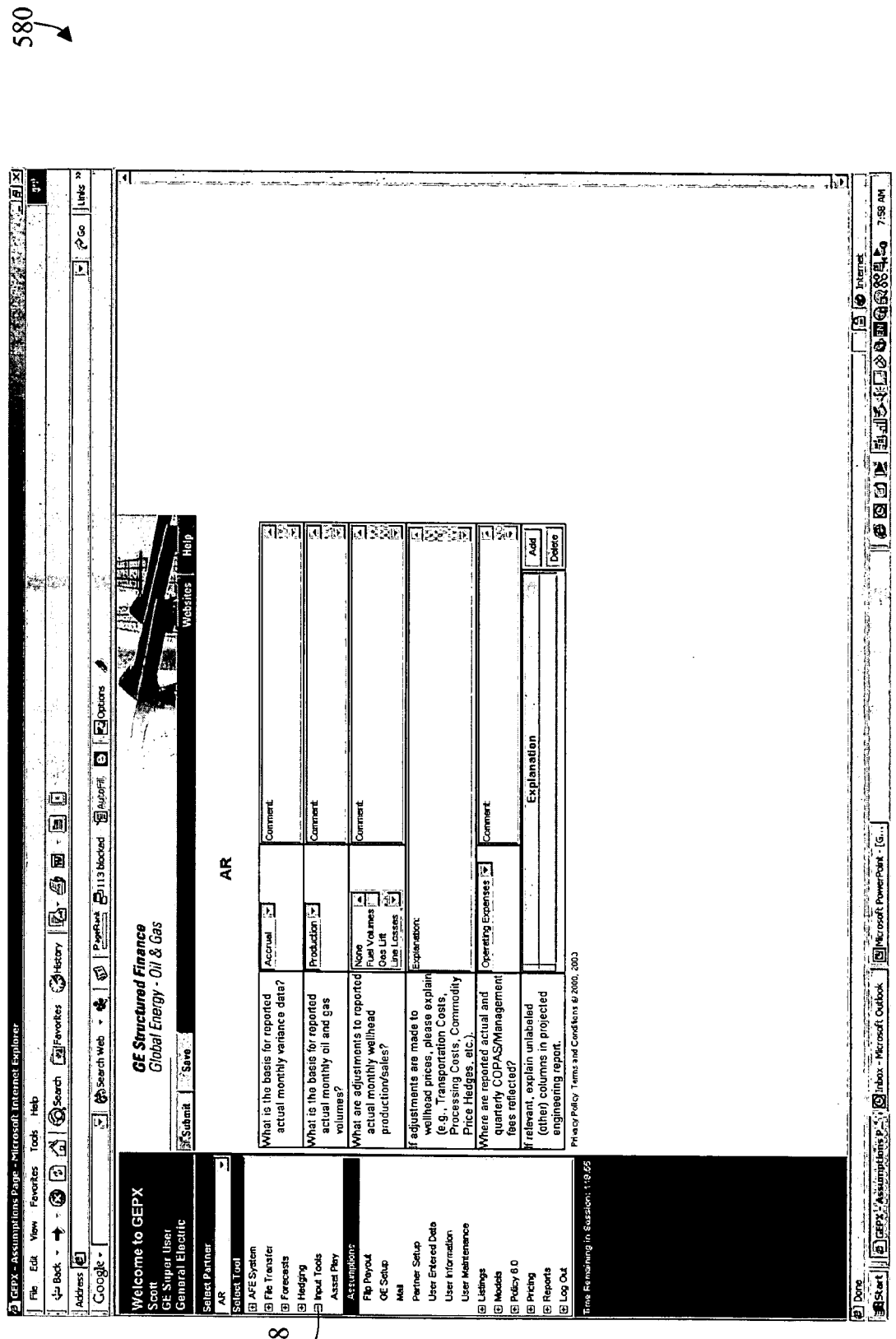
FIG. 25 is an example embodiment of a user interface displaying an assumptions tool page within PECS.

FIG. 25 is an example embodiment of a user interface 580 displaying an assumptions tool page within PECS 10 (shown in FIG. 1). The assumptions tool is part of the model system included within PECS 10. The data found in the assumptions tool is the basis of many other tools. Users can input assumptions metrics as well as answer select questions. This tool is available to all users of PECS 10.

In the example embodiment, the assumptions include at least one of (1) what is the basis for reported actual monthly variance data (e.g., accrual, cash, production, or other); (2) what is the basis for reported actual monthly oil and gas volumes (e.g., production or sales); (3) what are the adjustments to reported actual monthly wellhead production/sales (e.g., none, fuel volumes, gas lift, line losses, shrinkage, other); (4) if adjustments are made to wellhead prices, please explain (e.g., transportation costs, processing costs, commodity price hedges, etc.); (5) where are reported actual and quarterly COPAS/Management fees reflected (e.g., operating expenses, G&A expenses, revenue net out, other); and (6) if relevant, explain unlabeled columns in projected engineering report.

Figure 26:
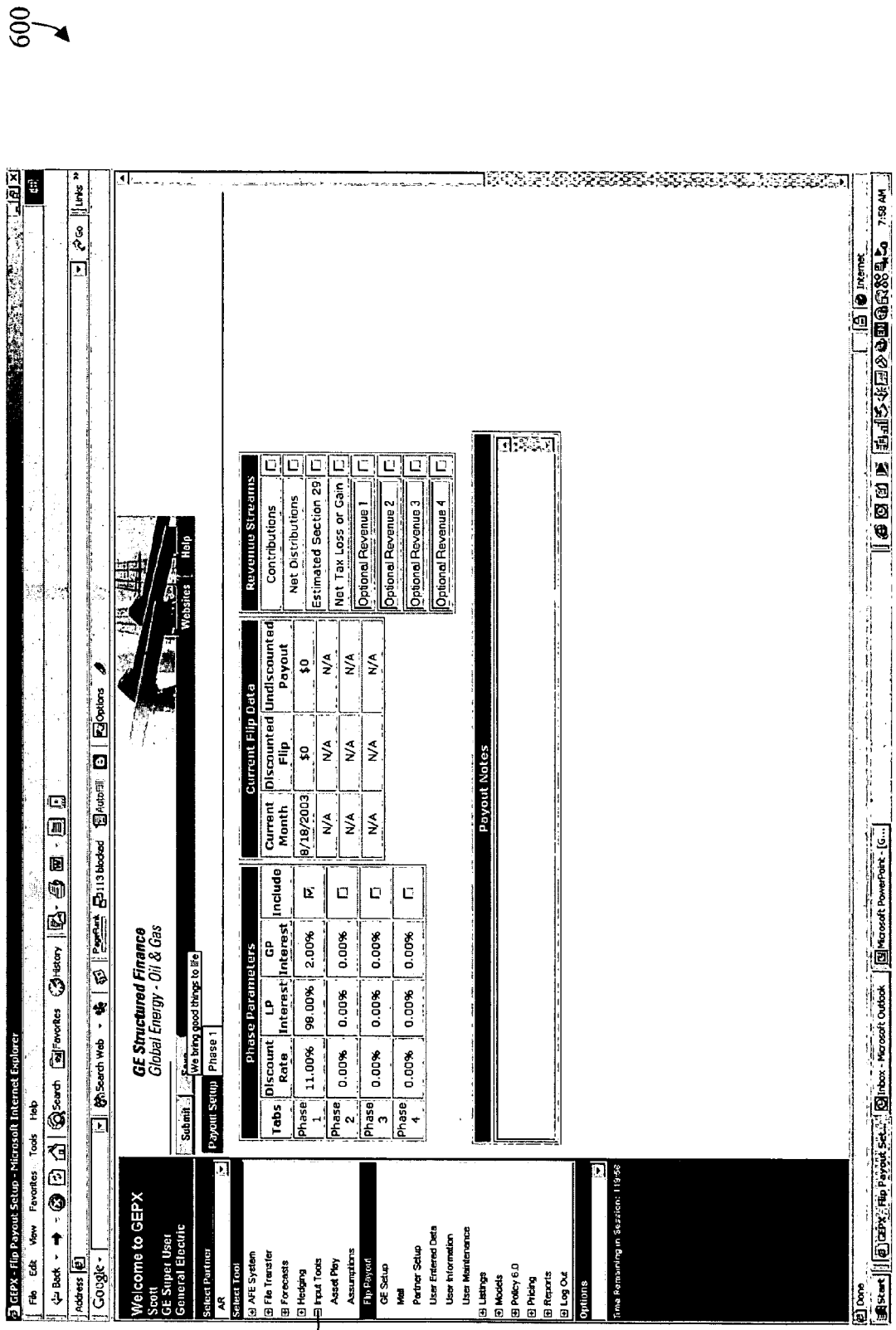
FIG. 26 is an example embodiment of a user interface displaying a flip payout tool page within PECS.

FIG. 26 is an example embodiment of a user interface 600 displaying a flip payout tool page within PECS 10 (shown in FIG. 1). The flip payout tool generates a summary of the flip payouts for all general partners. In the example embodiment, user interface 600 enables a user to enter into the database all the relevant data that shows when the contractual relationship will change based on the payout of the cost associated with the investment. There are no manual entries on user interface 600. All figures are derived from other partners individual flip calculations. However, PECS 10 enables the user to specify the criteria or parameters that should be used for generation of the flip payout pages summary spreadsheet. Based on the selections made by the user prior to the generation of the summary sheets, PECS 10 can generate customized versions of the data.

In the example embodiment, user interface 600 includes a payout set-up tab and a phase 1 tab. The payout set-up tab opens by default and exposes the parameters that can be specified by the users. The selection of criteria that the user makes on this page determines what columns of data will appear on the summary spreadsheets that the system creates. For example, users can place a check mark in an include column to specify how many phases should appear on the flip payout summary page. Selection of multiple phases results in creation of up to four distinct spreadsheets accessed by four phase tabs. By including all four phases, the phase 2, 3 and 4 tabs appear in addition to the default phase 1 tab. The resulting summaries can be viewed by selecting the phase 1, phase 2, phase 3, or phase 4 tabs.

Figure 27:
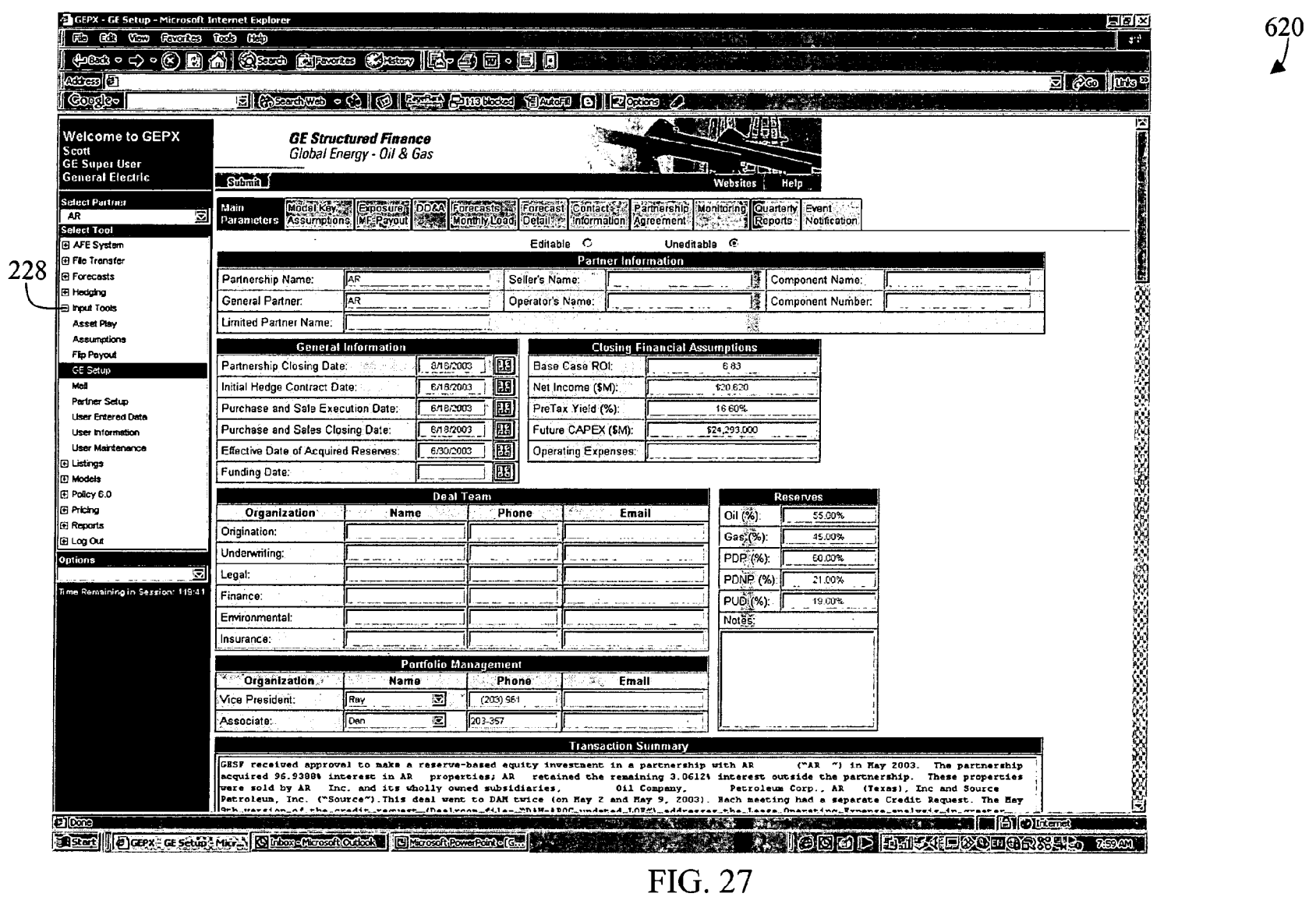

FIG. 27 is an example embodiment of a user interface 620 displaying a business entity setup tool page within PECS 10 (shown in FIG. 1). The business entity setup tool enables a user to input data about partnerships relating to the business entity. Most of the functionality of the system is based on the accuracy and timeliness of the data entry into the business entity setup page.

In the example embodiment, user interface 620 includes at least one of a main parameters tab, a model key assumptions tab, an exposure MF-payout, a DD&A tab, a forecasts monthly load tab, a forecast detail tab, a contact information tab, a partnership agreement tab, a monitoring tab, a quarterly reports tab, and an event notification tab.

The Main Parameters tab includes a plurality of data tables including at least one of a partner information table, a general information table, a closing financial assumptions table, a deal team table, a portfolio management table, a reserves table, and a transaction summary text area. Users can view partner information in the partner information table. Users can enter partner information into the data fields included in the partner information table. Users can view general information in the general information table. Users can also enter general information into the data fields. Users can view closing financial assumptions information in the closing financial assumptions table. Users can edit this information by using the data fields including at least one of base case ROI, net income, pre-tax yield percentage, future CAPEX, and operating expenses.

Users can view deal team information in the deal team table. Users can edit the deal team information by using the data fields including origination, underwriting, legal, finance, environmental, and insurance. Users can view information about the portfolio managers in the portfolio management table. Users can edit this information by inputting information into the data fields including a vice president data field, and an associate data field. Users can view information about reserves in the reserves table. Users can edit this information by inputting information into the data fields including oil (%); gas (%); PDP (%); PDNP (%), PUD (%); and notes. Users can view transaction summary information in the transaction summary text area. Users can also edit this information.

The model key assumptions tab includes a plurality of data tables including a partnership structure data table, a pricing assumptions data table, a tax and escalation rates data table, a purchase assumptions data table, and a risk factor assumptions data table.

PECS 10 also includes a mail tool. The mail tool enables a user to correspond with other users via e-mail. In the example embodiment, the mail tool does not create an e-mail account. Rather, it is a service that sends e-mail messages without using an e-mail account while making it appear that an existing e-mail account is being used. PECS 10 uses pre-existing e-mail account information to populate the From field and sends the message to the recipients that are specified in the To, CC, and BCC fields. To read messages that have been sent through PECS 10 from other users, the recipient will need to log onto their own e-mail account and retrieve their messages.

Figure 28:
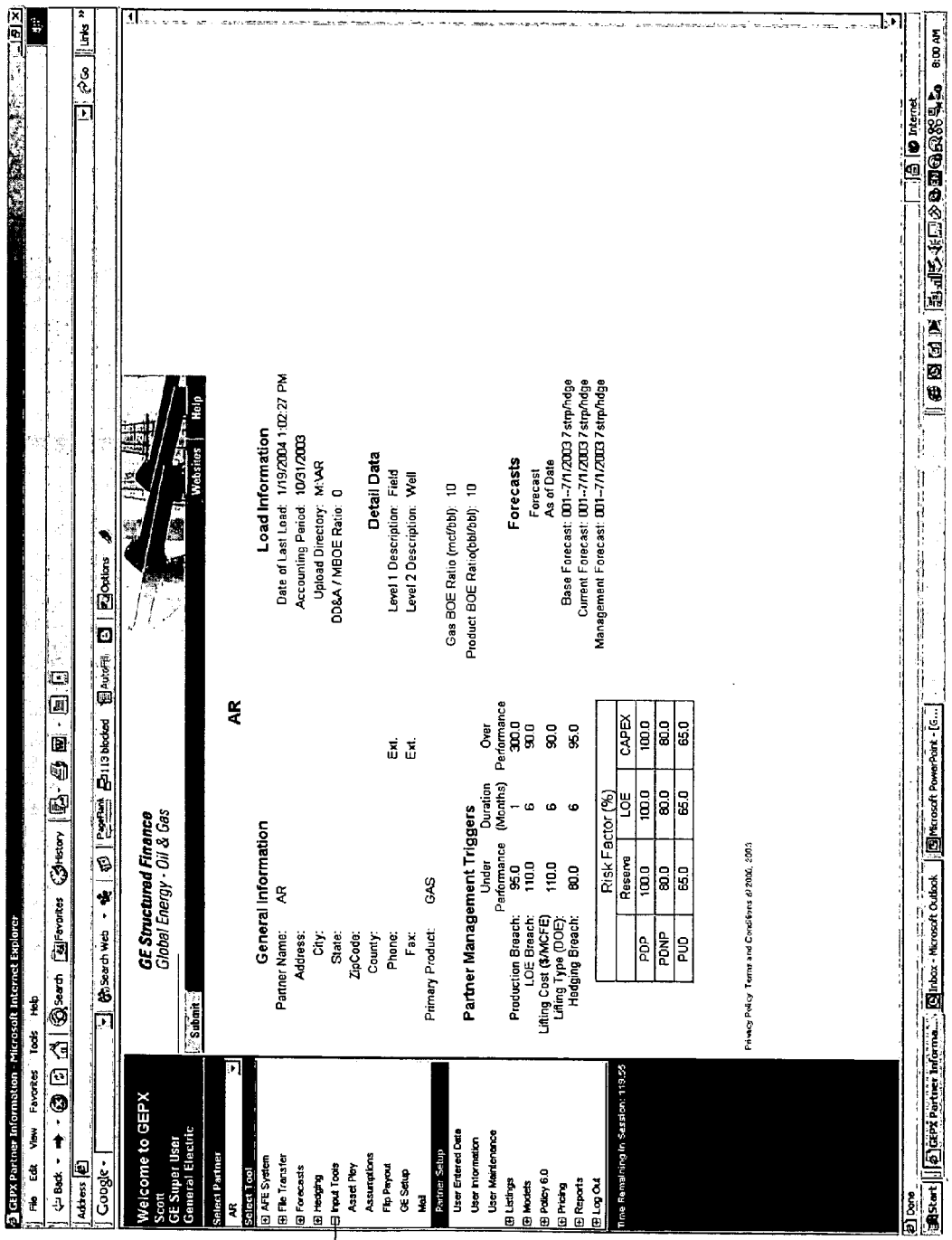
FIG. 28 is an example embodiment of a user interface displaying a partner setup tool page within PECS.

FIG. 28 is an example embodiment of a user interface 640 displaying a partner setup tool page within PECS 10 (shown in FIG. 1). General partners view and update much of their company information on the partner setup page. The page appears editable to the business entity partner users with the correct user access level. It appears uneditable to other users. In the example embodiment, user interface 640 includes a plurality of sections including a general information section, a partner management triggers section, a load information section, a detail data section, and a forecasts section.

The general information section includes general information about the partnership. This section enables a users with proper access to enter or modify general partnership information. The section includes at least a partner name, address information, telephone and fax information, and a primary product.

The partner management triggers section enables the system to initiate contact with a partner based on parameters set by the partner. This enables the partner to be notified by e-mail when certain conditions are not met by the properties, such as exceeding expense parameters, falling short in production, or not meeting hedging quotas. Partner management triggers include production breach, LOE breach, lifting cost, lifting type, and hedging breach. A variance percentage is also shown, which is good method to allow for a range of variance in a production or expense value. This percentage indicates the level at which the trigger will execute. A duration number represents the length of time the production or expense will have to exceed the trigger before causing the system to report the deficiency automatically. The production breach is a combination of variance percentage and duration that causes a production breach condition to exist. The LOE breach is a combination of variance percentage and duration that causes a LOE breach condition to exist. The hedging breach is a combination of variance percentage and duration that causes a hedging condition to exist. Risk factors enable a partner to risk their production, costs and expenses based on the reserve category, PDP ("proved developed producing"), PDNP ("proved developed not producing"), and PUD ("proved undeveloped").

The forecast section enables a partner to select default forecasts for PECS 10. In addition, users can specify which forecast should be the basis of other PECS tools.

Figure 29:
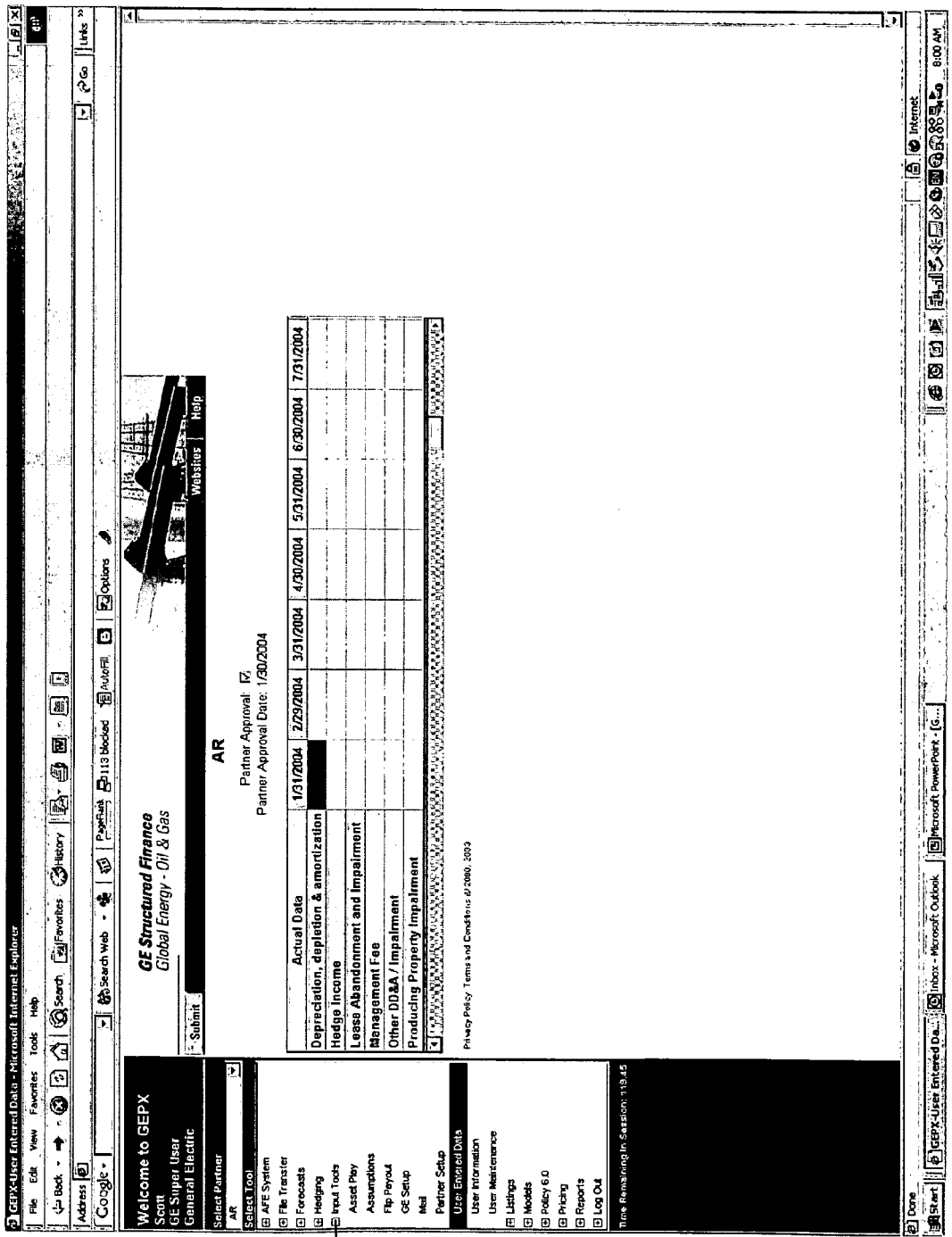
FIG. 29 is an example embodiment of a user interface displaying a user entered data tool page within PECS.

FIG. 29 is an example embodiment of a user interface 660 displaying a user entered data tool page within PECS 10 (shown in FIG. 1). The user entered data tool is designed to complement the automatic load features of monthly reporting and the annual audited engineering report. In the example embodiment, when a partnership is set up within PECS 10, custom fields are defined based on the output capacity of the general partners accounting system. Two different types of manual report data are defined at the setup including actual and forecast data. In some cases, all of the actuals may be submitted to PECS 10 via the automated monthly load. If this is the case, then monthly maintenance of user entered data is not necessary. If some data fields of actuals are defined as manual input, then the appropriate representative of the general partner must update the system each time the automatic feed is updated.

All forecast data fields that are not part of the annual audited engineering report are defined as manual input fields. These include fees and additional expenses indigenous to the partnership structure and not normally forecasted in audited engineering reports, and operating expenses not normally found on the audited engineering reports like non-recurring work over expenses.

User interface 660 includes an actual data section and a forecast data section. The information included in both sections include at least depreciation, depletion and amortization (DD&A); hedge income; lease abandonment and impairment; management fee; other DD&A/impairment; and producing property impairment.

PECS 10 also includes a User Information tool. The User Information tool enables a user to modify personal information entered into PECS 10.

Figure 30:
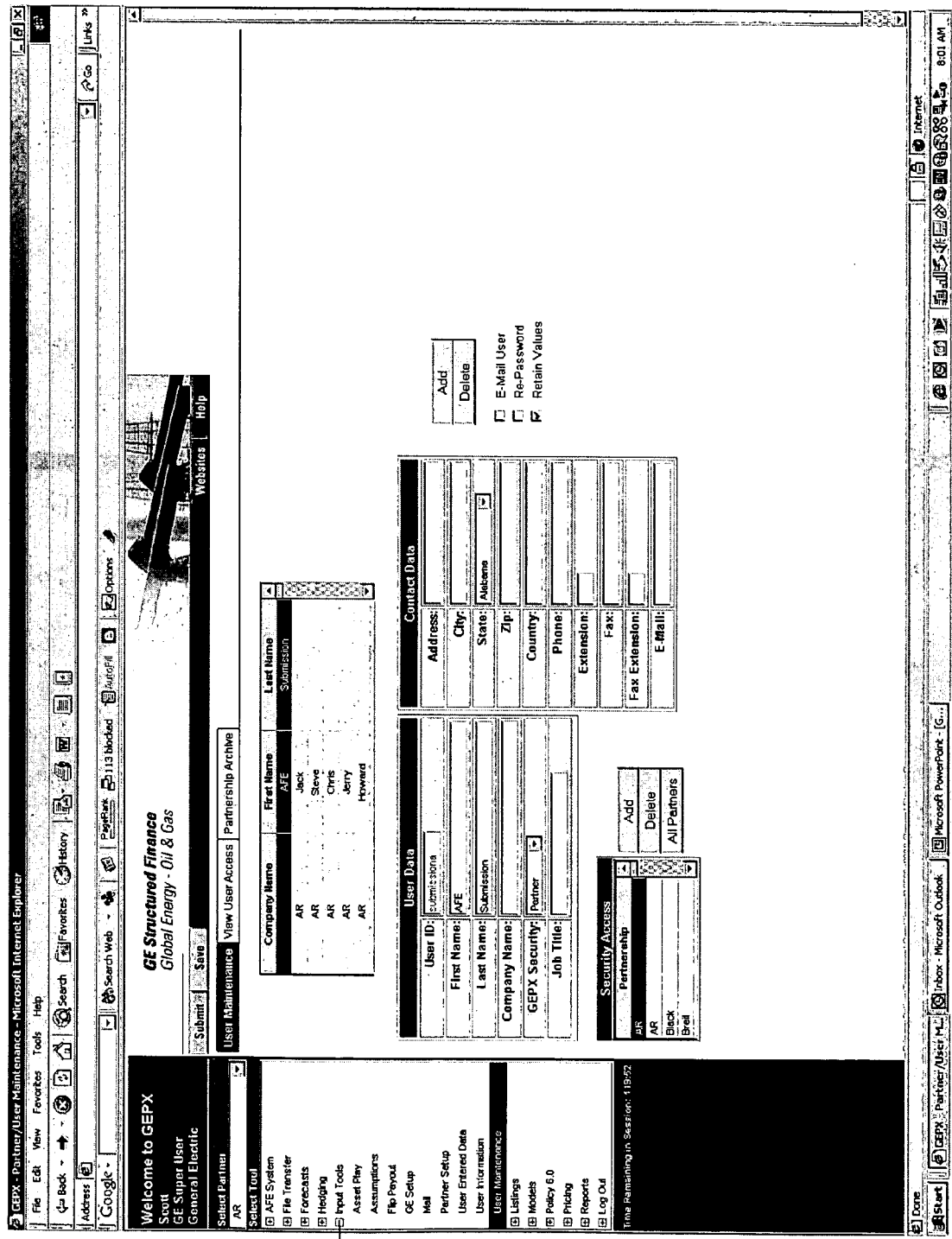
FIG. 30 is an example embodiment of a user interface displaying a user maintenance tool page within PECS.

FIG. 30 is an example embodiment of a user interface 680 displaying a user maintenance tool page within PECS 10 (shown in FIG. 1). The user maintenance tool is used by super users within PECS 10 for system administration purposes. The user maintenance tool enables these super users to perform user maintenance, archive partnership data, and view user access.

In the example embodiment, user interface 680 includes a primary selection grid, and complimentary data boxes that display data relating to the selected user. Some of the available functions on user interface 680 include adding a new system user, deleting a user, changing or updating personal information, controlling access levels, specifying available partnerships, and resetting password information.

In the example embodiment, a partnership archive tab displays a page with a list of available partners. By placing a check mark in the box in the archive column and selecting a submit button, the data of the selected partnership is archived. The archive function removes the partnership from the menu system in PECS 10. The data can be unarchived by unchecking the check box and selecting save. Data should be archived whenever partnerships are terminated. A view user access tab includes three access methodologies. A user can determine user information by drilling down based on company affiliation, partnership name, and users name.

VI. Listing Tools

PECS 10 (shown in FIG. 1) includes listing tools. The listing tools include a plurality of tools including at least one of: a partner list, a field list, and a well/lease list.

Figure 31:
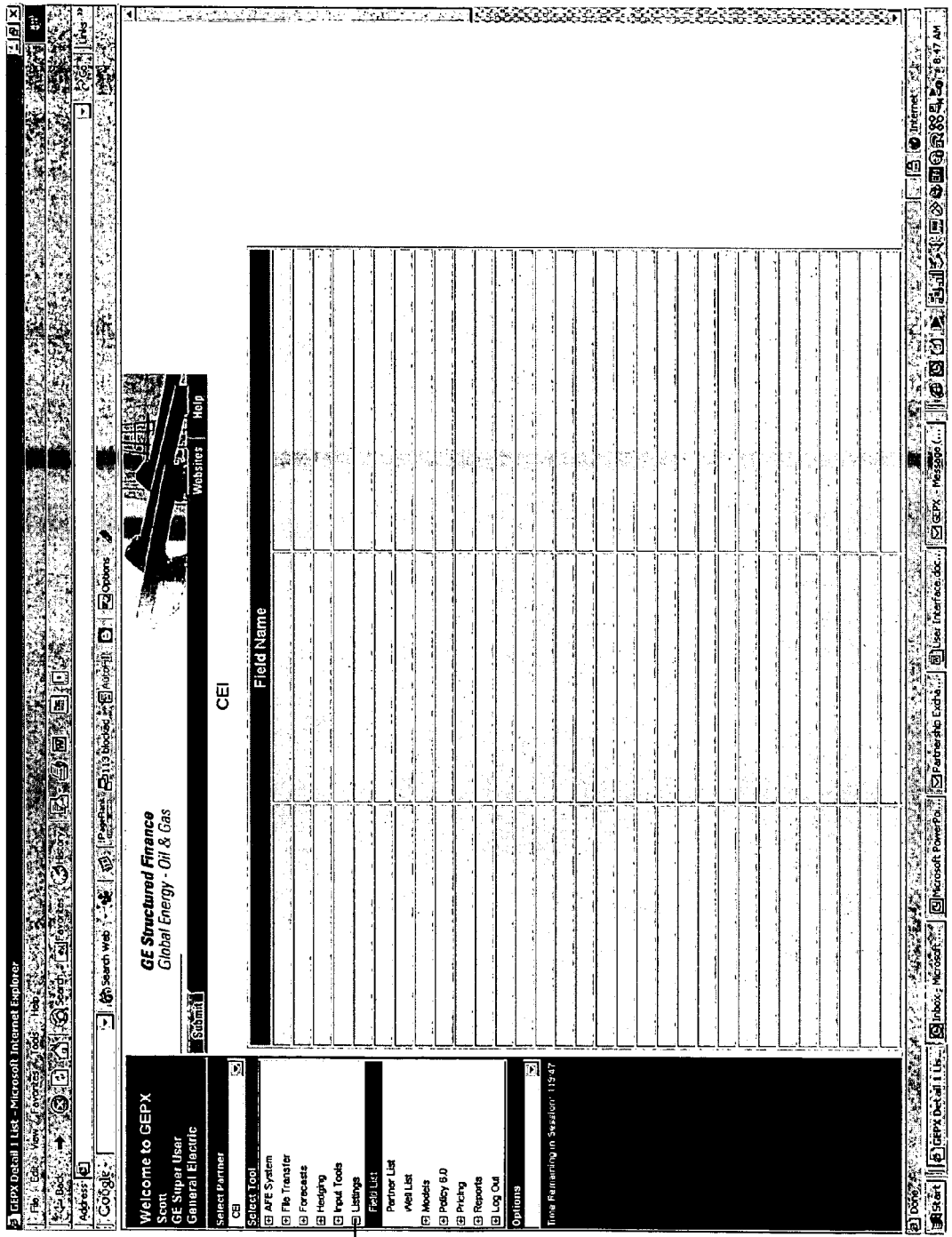
FIG. 31 is an example embodiment of a user interface displaying a field list page within PECS.

FIG. 31 is an example embodiment of a user interface 700 displaying a field list page within PECS 10 (shown in FIG. 1). User interface 700 displays each field that the user's account has access to. In the example embodiment, by clicking on any of the field names, the user can drill-down to the individual lease or well list that belongs to the specified partnership. The roll-up function is used to select or deselect entities on which the user wants to perform composite operations.

Figure 32:
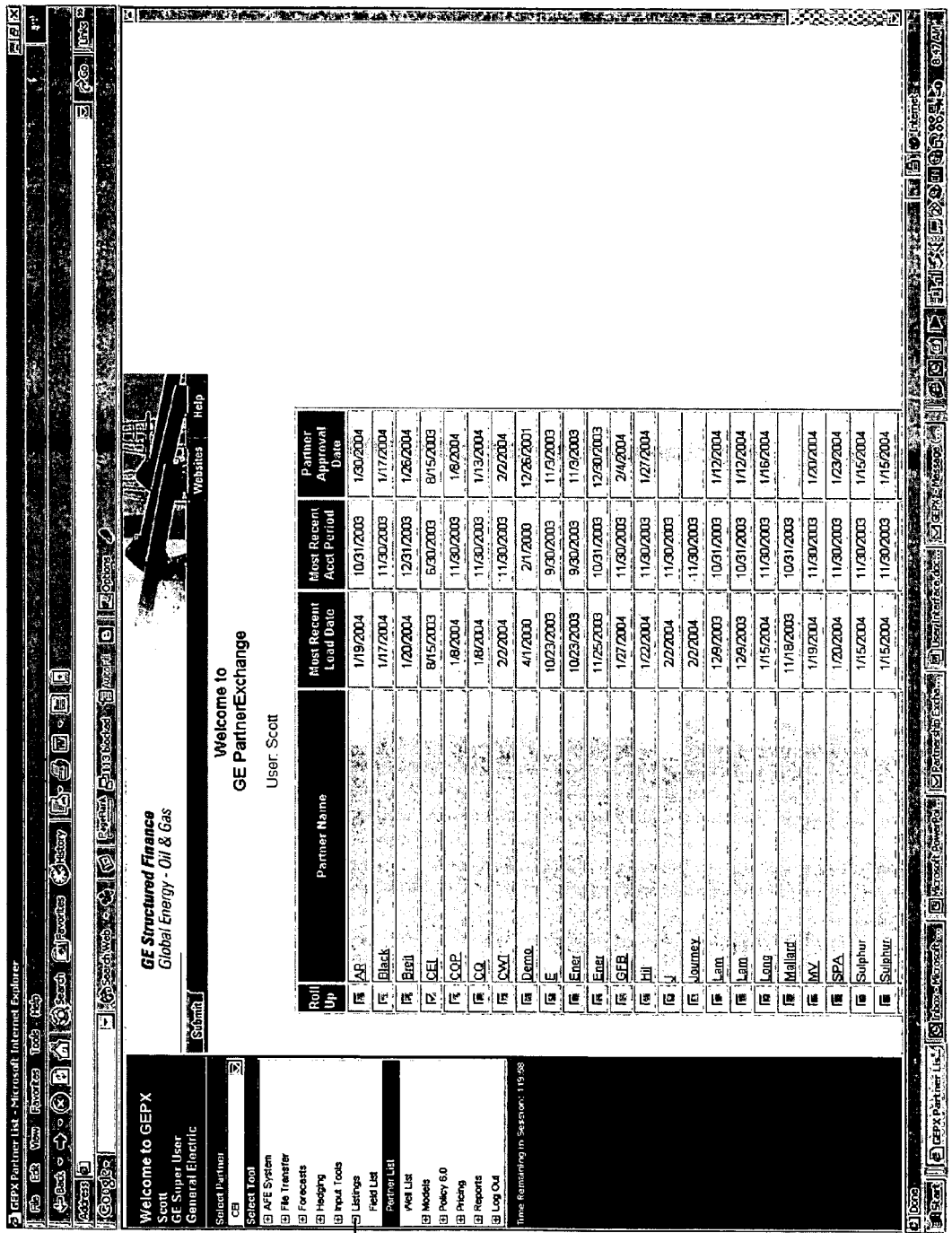
FIG. 32 is an example embodiment of a user interface displaying a partner list page within PECS.

FIG. 32 is an example embodiment of a user interface 720 displaying a partner list page within PECS 10 (shown in FIG. 1). User interface 700 displays each partnership that the user's account has access to. In the example embodiment, by clicking on any of the partner names, the user can drill-down and view the corresponding oil/gas fields that comprise the partners oil/gas field list. By left-clicking on any of the fields or sub-entities displayed in the field list, a user can drill-down to the individual lease or well list that belongs to the specified partnership. The roll-up function is used to select or deselect entities on which the user wants to perform composite operations.

In the example embodiment, the field list is displayed when a user left clicks on a partner name on the partner list page. The field list displays a table listing the oil/gas fields involved with the partner selected. The well list page for a particular partnership can be accessed if that partner has wells (or leases) entered into the system. The well/lease table is used to display the wells or leases applicable to the partner and the field that are parents of this well or lease. The two terms, lease or well, can be used interchangeably within the PECS system. Some partners will evaluate individual wells within a field, and some will use leases that may be only one well or multiple wells.

VII. Model Tools

PECS 10 (shown in FIG. 1) includes forecasting models. The models include a net income forecasting model. The net income forecasting model is utilized within PECS 10 to forecast net income for a specific partnership.

Figure 33:
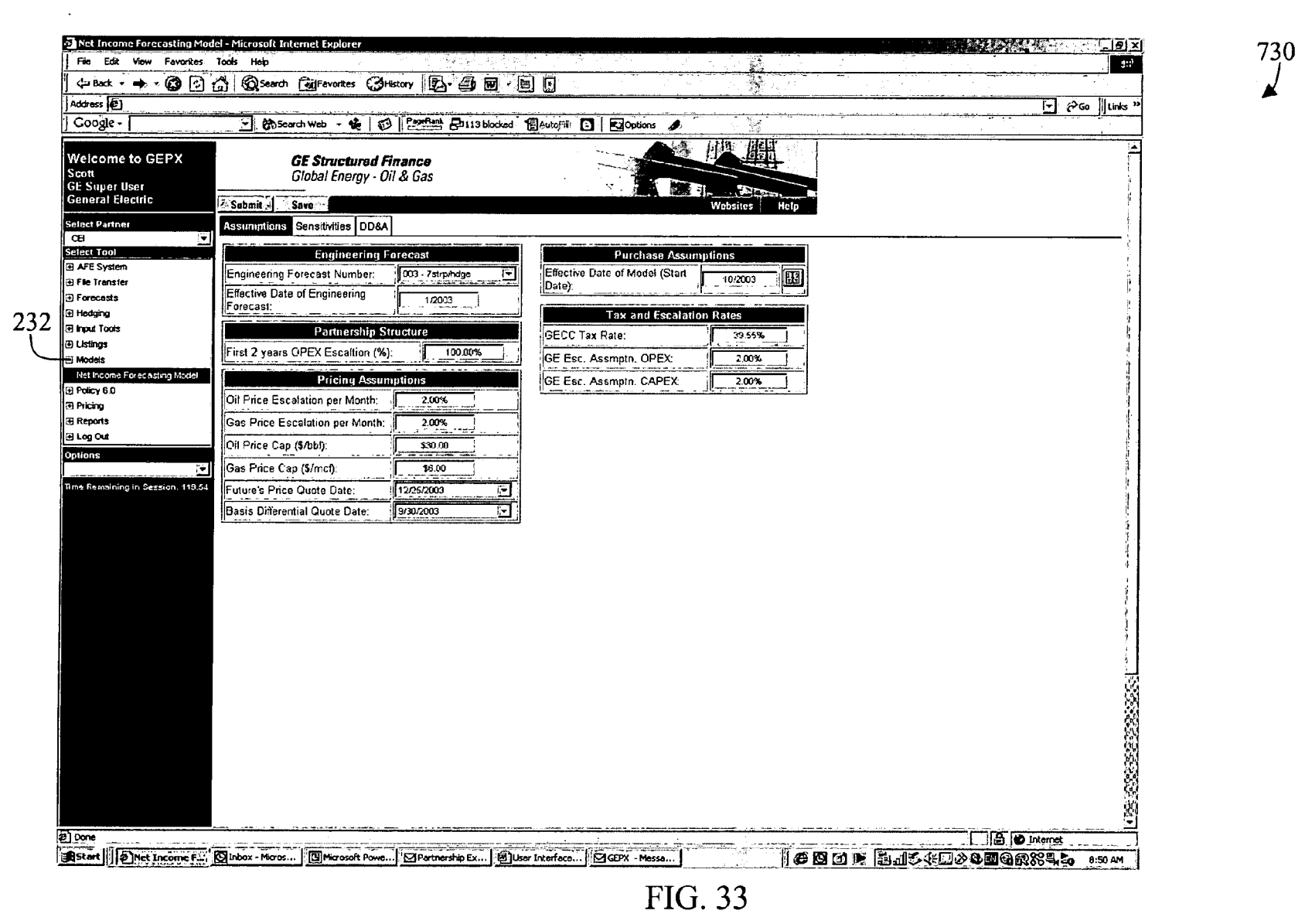

FIG. 33 is an example embodiment of a user interface 730 displaying a net income forecasting model page within PECS 10 (shown in FIG. 1). In the example embodiment, user interface 730 includes an assumptions tab, a sensitivities tab, and a DD&A tab (depreciation, depletion and amortization). When the assumptions tab is active, user interface 730 also displays an engineering forecast section, a partnership structure section, a pricing assumptions section, a purchase assumptions section, and a tax and escalation rates section. User interface 730 enables a user to forecast net income for a specific partnership.

VIII. Policy 6.0 Tools

PECS 10 (shown in FIG. 1) include Policy 6.0 tools. The Policy 6.0 tools include a P6.0 administration tool, a P6.0 dashboard tool, and a P6.0 Non-GEPX (or PECS) tool.

Figure 34:
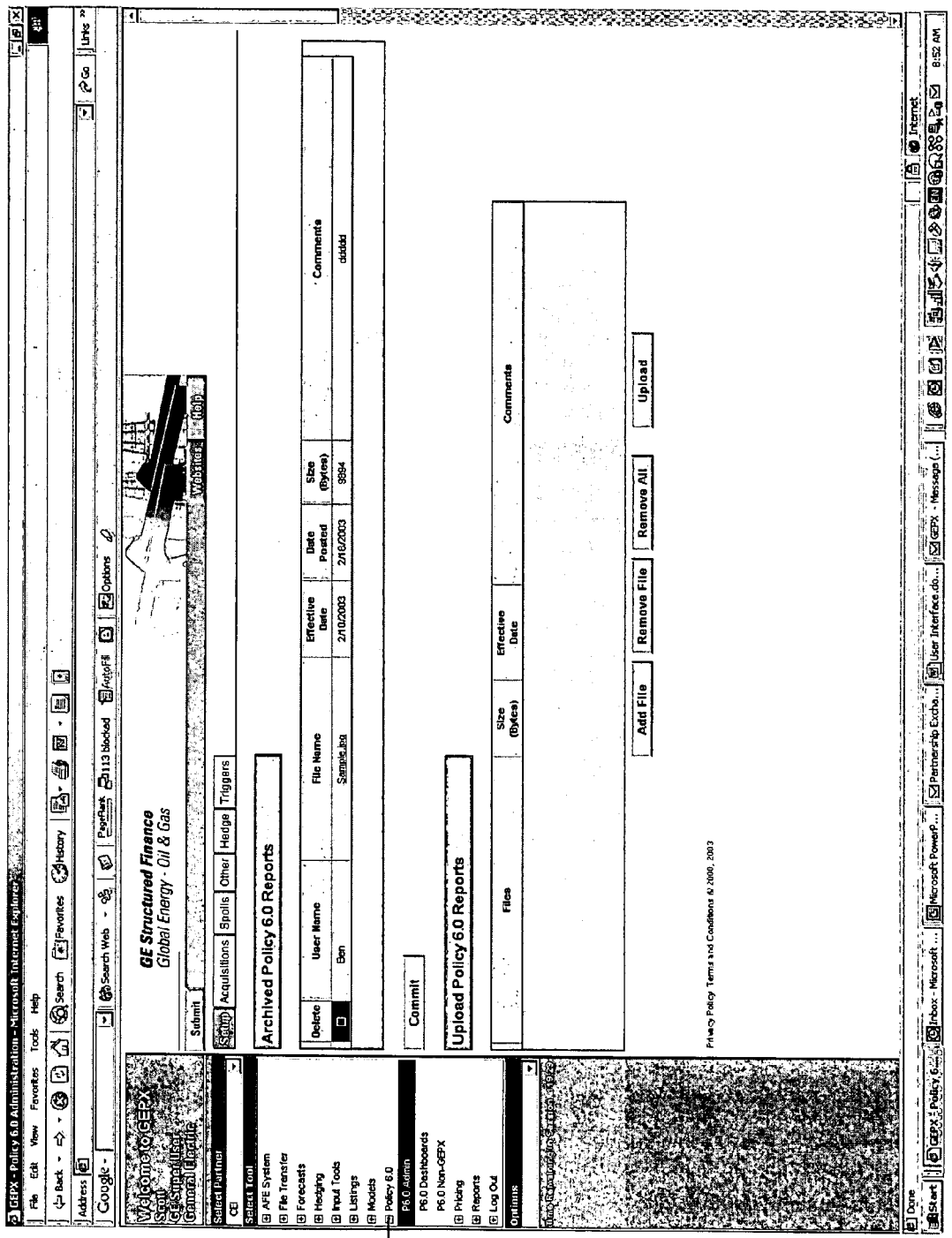
FIG. 34 is an example embodiment of a user interface displaying a P6.0 administration tool page within PECS.

FIG. 34 is an example embodiment of a user interface 740 displaying a P6.0 administration tool page within PECS 10 (shown in FIG. 1). In the example embodiment, user interface 740 includes a setup tab, an acquisitions tab, a spoils tab, an other tab, a hedge tab, and a triggers tab. When the setup tab is activated, user interface 740 displays an Archived Policy 6.0 Reports section, a commit button, an Upload Policy 6.0 Reports section, an add file button, a remove file button, a remove all button, and an upload button.

Figure 35:
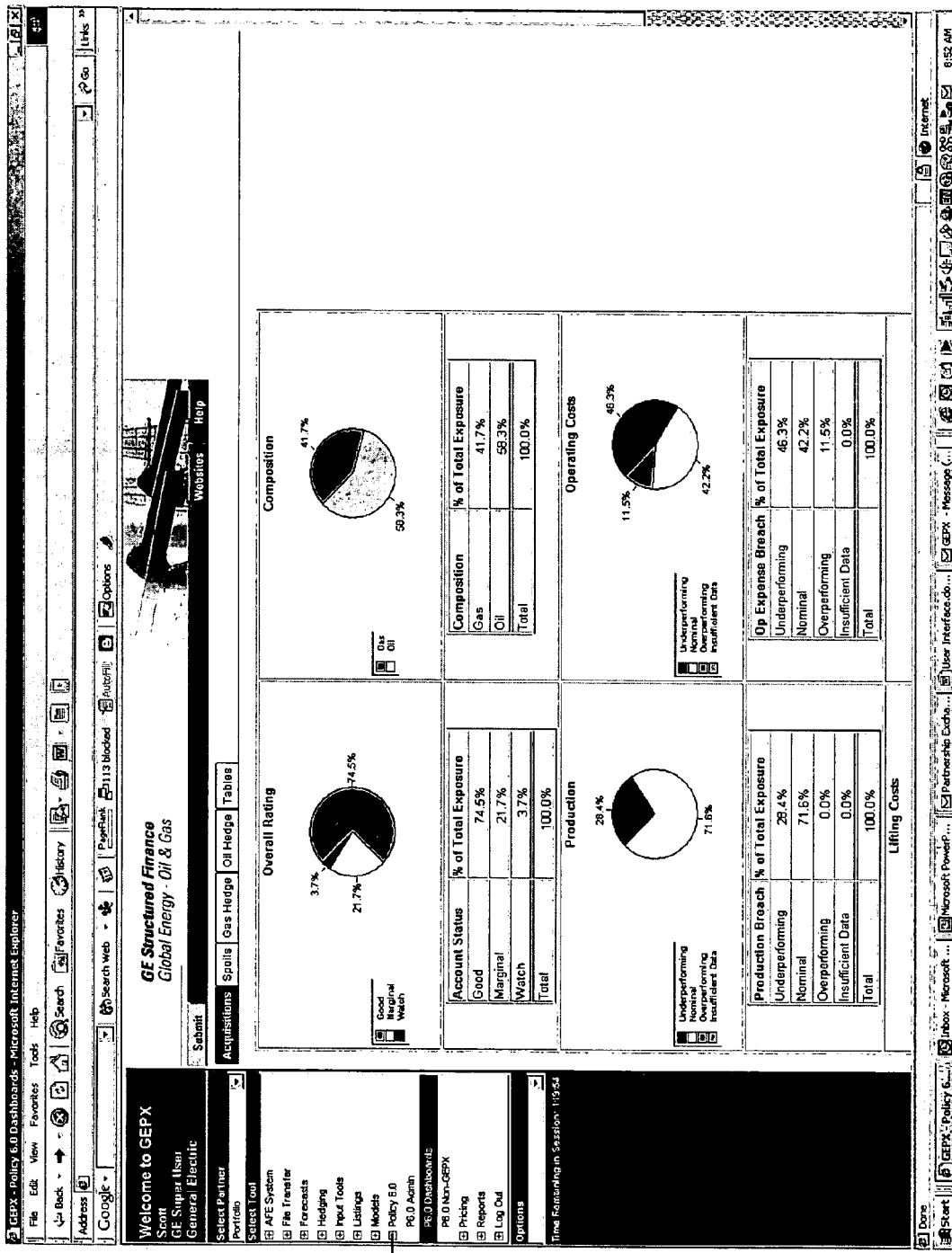
FIG. 35 is an example embodiment of a user interface displaying a P6.0 dashboards tool page within PECS.

FIG. 35 is an example embodiment of a user interface 750 displaying a P6.0 dashboards tool page within PECS 10 (shown in FIG. 1). In the example embodiment, user interface 750 includes an acquisitions tab, a spoils tab, a gas hedge tab, an oil hedge tab, and a tables tab. In the example embodiment, user interface 750 displays an overall rating chart and table, a composition chart and table, a production chart and table, and an operating costs chart and table.

Figure 36:
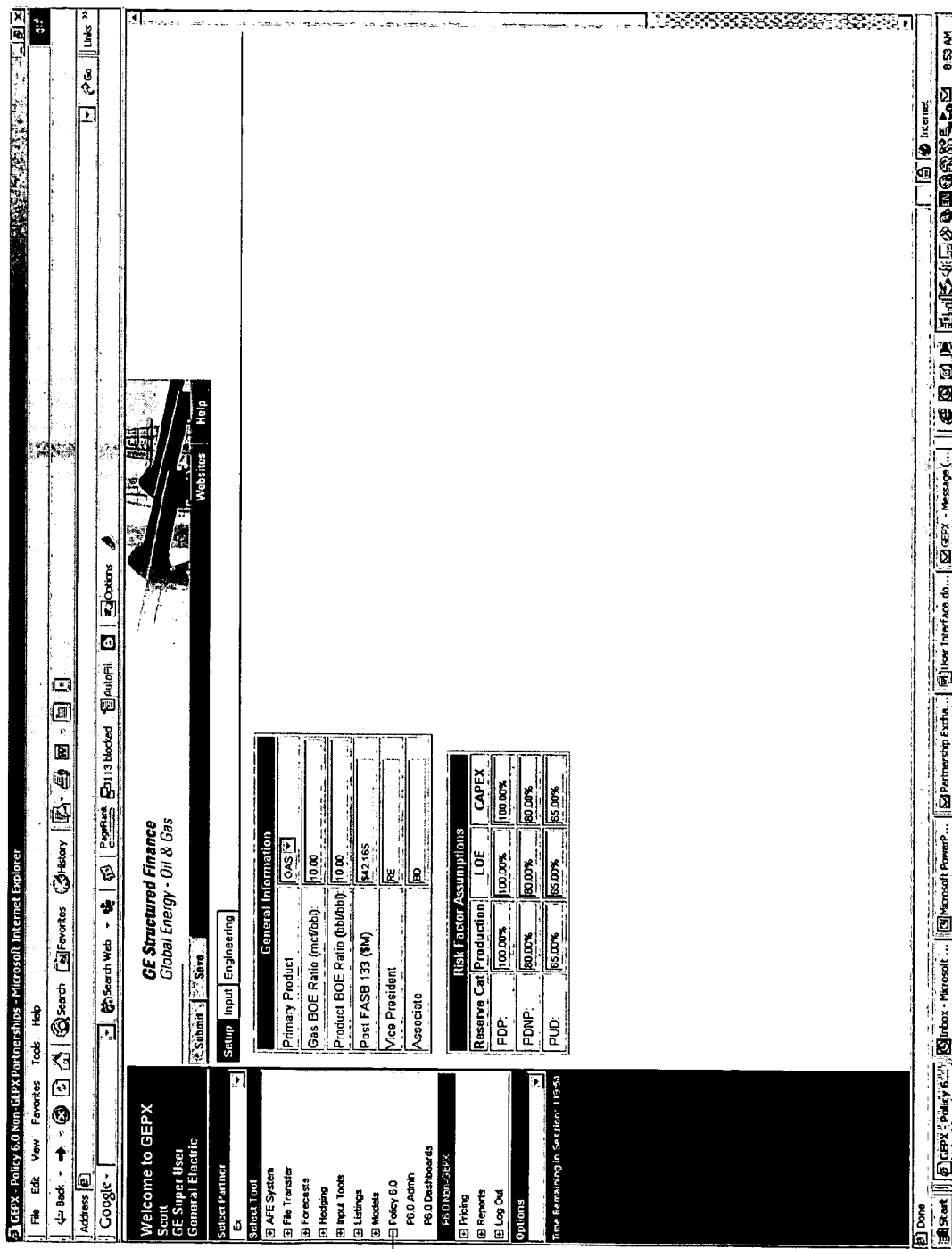
FIG. 36 is an example embodiment of a user interface displaying a P6.0 Non-GEPX tool page within PECS.

FIG. 36 is an example embodiment of a user interface 760 displaying a P6.0 Non-GEPX tool page within PECS 10 (shown in FIG. 1). In the example embodiment, non-GEPX refers to non-PECS matters. User interface 760 includes a setup tab, an input tab, and an engineering tab.

IX. Pricing Tools

PECS 10 (shown in FIG. 1) includes pricing tools. The pricing tools include a basis differential tool, a discount rates tool, an escalation factors tool, a hedging future price tool, and a historical average price tool.

Figure 37:
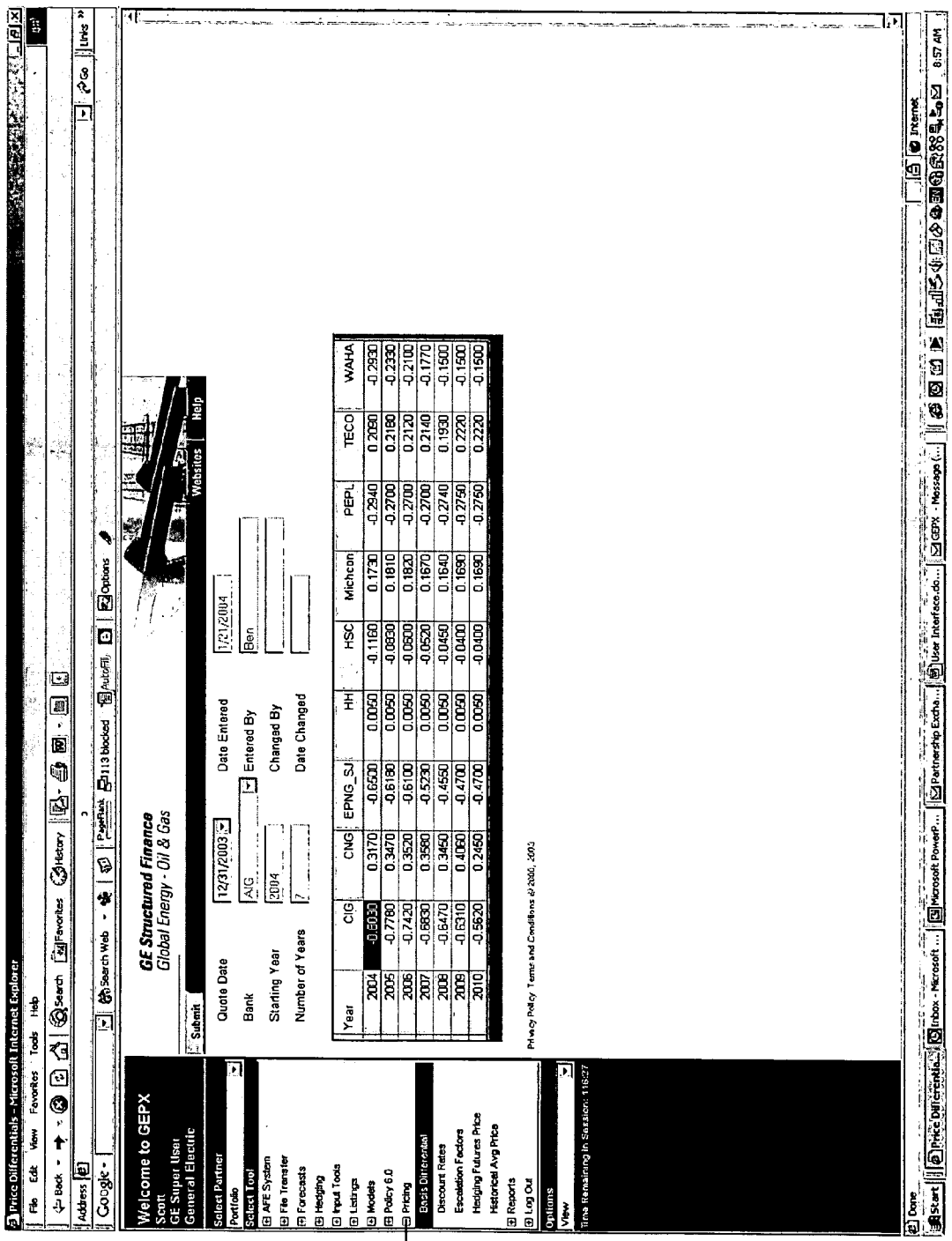
FIG. 37 is an example embodiment of a user interface displaying a basis differential tool page within PECS

FIG. 37 is an example embodiment of a user interface 770 displaying a basis differential tool page within PECS 10 (shown in FIG. 1). In the example embodiment, user interface 770 displays a quote date pull-down field, a bank pull-down field, a starting year data field, a number of years data field, a date entered data field, an entered by data field, a changed by data field, a date changed data field, and a data grid for each hub on a yearly basis. Users can modify the parameters of the data grid by selecting modify in the options list. Users can specify the name of a bank, a starting year, and the number of years to be depicted in the data grid. Users are able to change the values of the grid according to the new parameters. To save the resultant basis differential modification, a user selects a save button. Users can also create a new basis differential by selecting "New" in the options list. This clears out the form and users must then enter the data in the data fields. The date entered and entered by fields are the only fields automatically populated by the system.

The Basis Differential tool stores interest rate curves used for discounting in the market to market contained in the FASB 133 evaluation. The only tool that uses this discount is the FASB 133 evaluation model. Interest rate curves for the basis differential tool should be updated at the end of each fiscal quarter. The basis differential tool is used for finding pricing information based on metrics supplied from several hubs. The hubs include at least one of: Henry Hub ("HH"), Colorado Interstate Gas Hub ("CIG"), Columbia Natural Gas Hub ("CHC"), El Paso Natural Gas-San Juan hub (EPNG-SJ), Houston Ship Channel Hub ("HSC"), Michcon Hub ("MICH"), Panhandle Eastern Pipeline Hub ("PEPL"), Tennessee Hub ("TECO"), and WAHA Hub.

Figure 38:
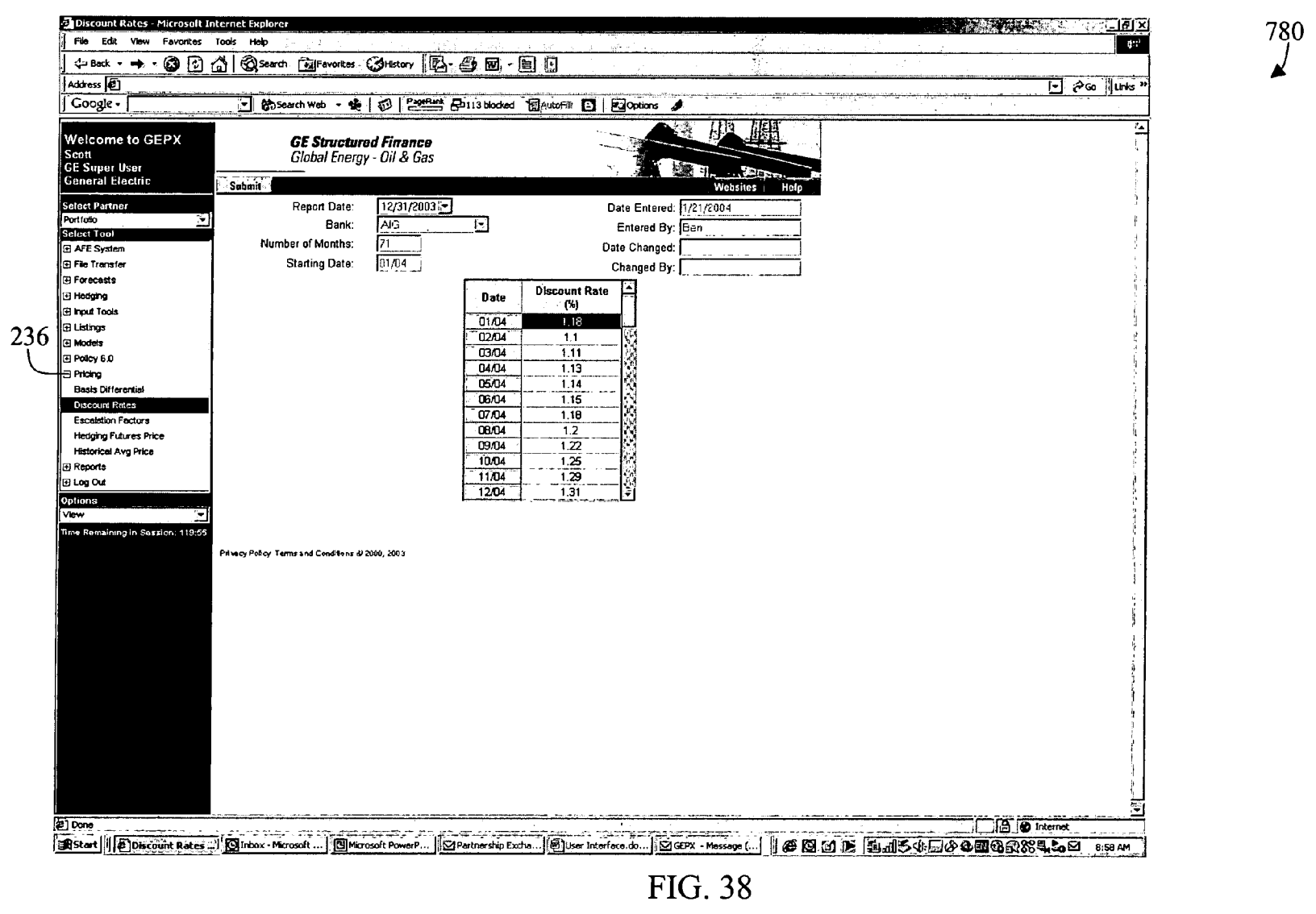

FIG. 38 is an example embodiment of a user interface 780 displaying a discount rates tool page within PECS 10 (shown in FIG. 1). In the example embodiment, user interface 780 displays a report date pull-down field, a bank data field, a number of months data field, a starting date data field, a date entered data field, an entered by data field, a date changed data field, a changed by data field, and a data grid showing a discount rate percentage on a yearly basis. The discount rates page reflects the pricing information for the interest rate curve with the forward pricing curve beginning at the date specified by the user and the report date pull-down list.

In the example embodiment, the discount rates tool stores interest rate curves used for discounting in the market to market contained in the FASB 133 evaluation. The only tool that uses this discount rate is the FASB 133 evaluation model. Interest rate curves relating to the discount rates tool should be updated at the end of each fiscal quarter.

Figure 39:
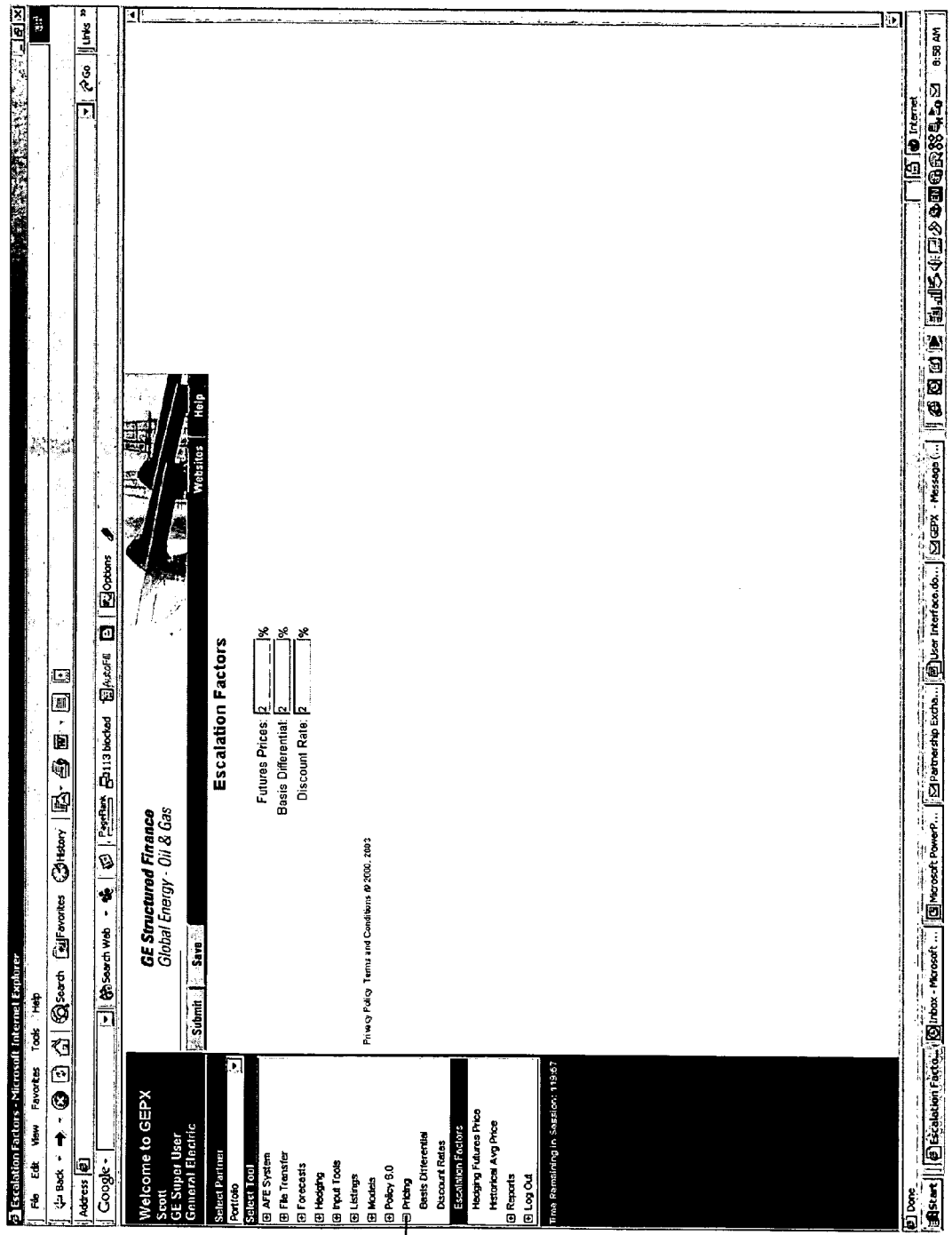
FIG. 39 is an example embodiment of a user interface displaying an escalation factors tool page within PECS.

FIG. 39 is an example embodiment of a user interface 790 displaying an escalation factors tool page within PECS 10 (shown in FIG. 1). In the example embodiment, user interface 790 displays a future prices data field, a basis differential data field, and a discount rate data field. The escalation factors tool enables a user to specify different percentages to extrapolate scenarios. Escalation factors include future prices, basis differential, and discount rate. The escalation factors entered into PECS 10 will affect different tools throughout the system. The current default values are based on current market factors and inflationary conditions. PECS 10 uses these values as a basis for generation of charts, grafts, and other data views.

In the example embodiment, the futures price escalation factor is the annual rate at which futures curves are escalated after the last data point. The basis differential escalation factor is the rate at which basis differential curves are escalated after the last data point. The discount rate is the rate at which the hedging system in the form of glance hedge partnership and glance hedge portfolio discount future hedge settlements back to the time zero.

Figure 40:
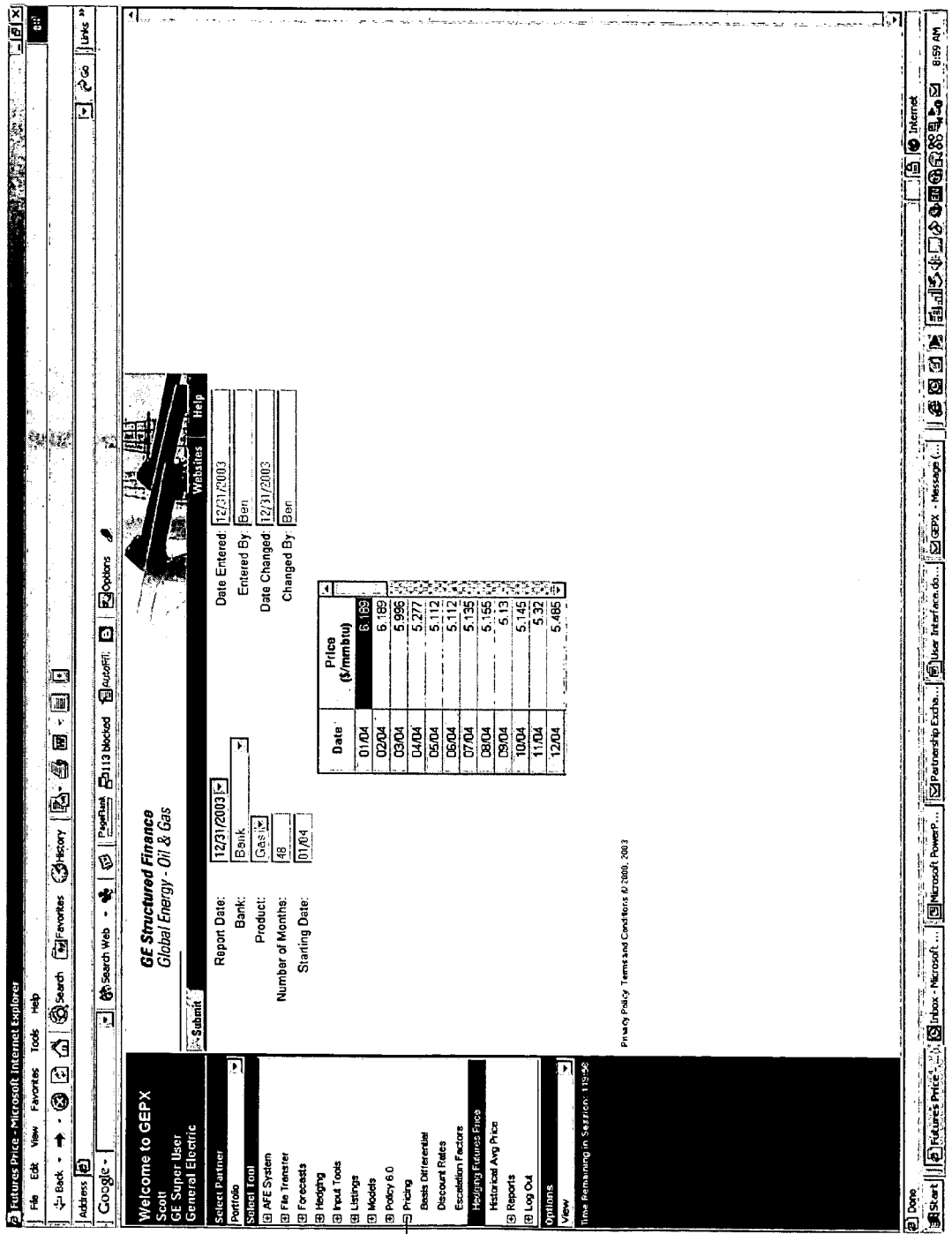
FIG. 40 is an example embodiment of a user interface displaying a hedging future price tool page within PECS.

FIG. 40 is an example embodiment of a user interface 800 displaying a hedging future price tool page within PECS 10 (shown in FIG. 1). In the example embodiment, user interface 800 displays a report date pull-down field, a bank data field, a product pull-down list, a number of months data field, a starting date data field, a date entered data field, an entered by data field, a date changed data field, a changed by data field, and a data grid showing price on a yearly basis. While in the view mode, a user can select a different report date and the system will generate a new data grid on the fly. Similarly, the user can toggle between oil and gas in the product pull-down box to view the data based on the product category. PECS 10 enables a user to modify the hedging futures price, and enables a user to create a new hedging future price.

In the example embodiment, the hedging futures price tool stores daily quotes for oil and gas futures contracts. A quote must be obtained from a creditworthy bank and is usually done so daily by the underwriting team. The daily quotes are located on an underwriting drive. PECS 10 is designed with maximum flexibility. It can accommodate quotes on an annual or monthly basis, however, the data is stores and entered in monthly buckets.

Figure 41:
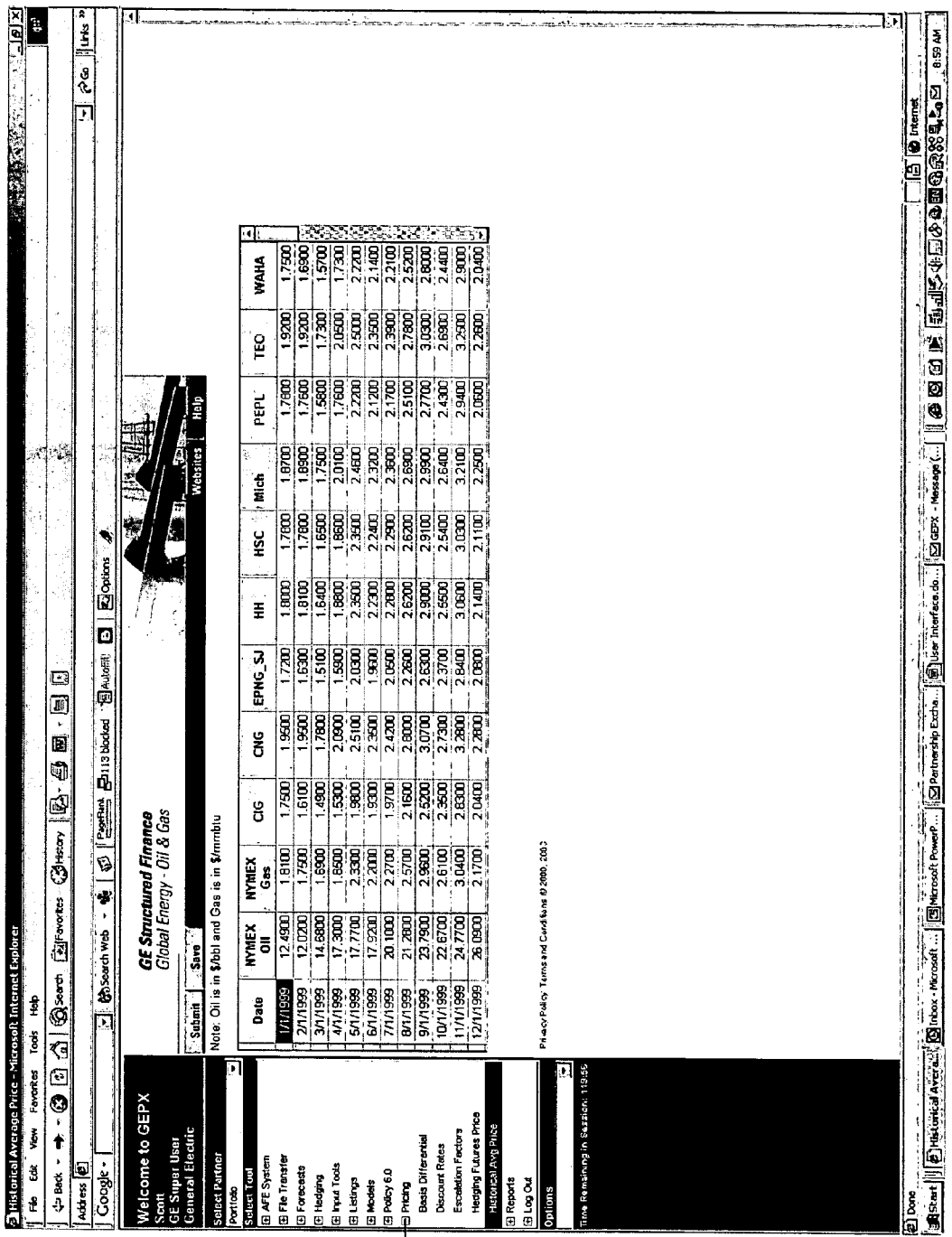
FIG. 41 is an example embodiment of a user interface displaying a historical average price tool page within PECS.

FIG. 41 is an example embodiment of a user interface 810 displaying a historical average price tool page within PECS 10 (shown in FIG. 1). The historical average price tool enables a user to view historical average oil and gas prices from several hubs. In the example embodiment, user interface 810 displays an average oil and gas prices for several hubs by past date. The column headings in the data grid may be clicked on by a user to perform sorting operations on the data. The data grid can also be modified by clicking in a cell and manually typing the modification. Additionally, PECS 10 enables a user to add a new historical average price to the system.

XI. Reports Tool

PECS 10 (shown in FIG. 1) enables a user to generate a plurality of reports. PECS 10 includes at least the following report tools: an actual production export report tool, an engineering report tool, an enhancements report tool, a glance accounting report tool, a glance hedge partnership report tool, a glance hedge portfolio report tool, a glance production report tool, a hedge portfolio set-up report tool, a rate time report tool, a variance report-monthly report tool, and a variance report-quarterly report tool.

Figure 42:
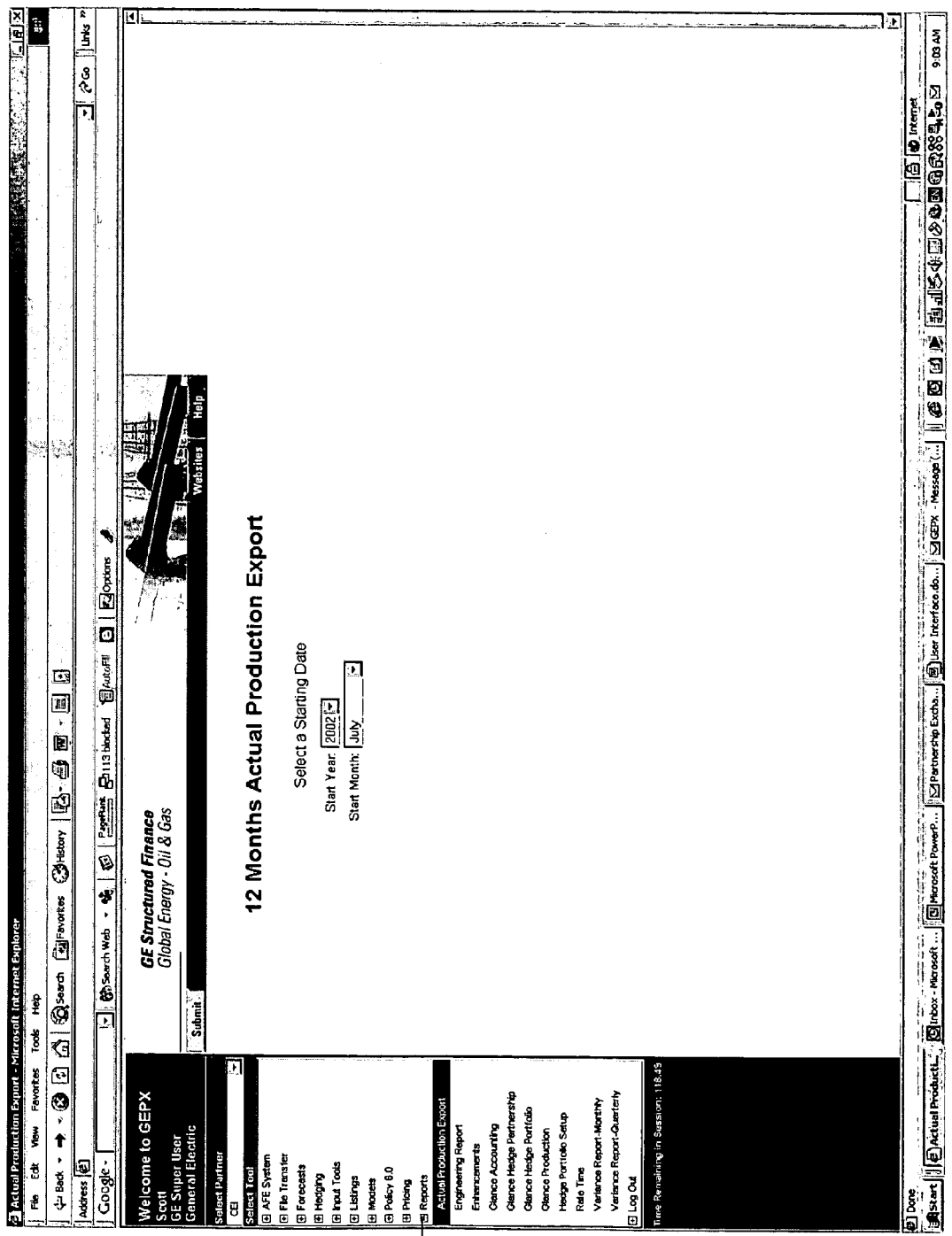
FIG. 42 is an example embodiment of a user interface displaying an actual production report tool page within PECS.

FIG. 42 is an example embodiment of a user interface 820 displaying an actual production report tool page within PECS 10 (shown in FIG. 1).

Figure 43:
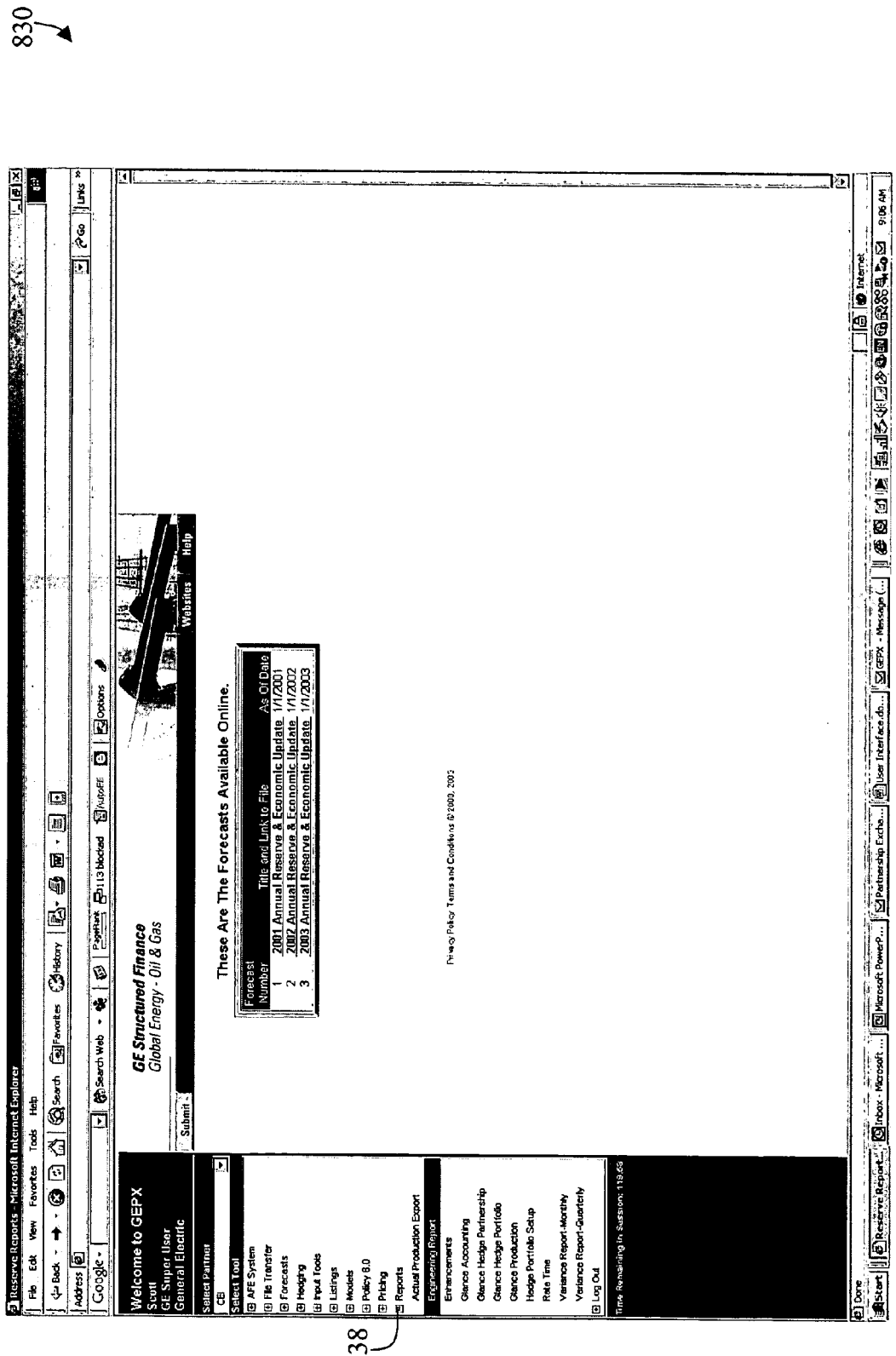
FIG. 43 is an example embodiment of a user interface displaying an engineering report tool page within PECS.

FIG. 43 is an example embodiment of a user interface 830 displaying an engineering report tool page within PECS 10 (shown in FIG. 1). The engineering report tool enables users to download a variety of engineering documents such as annual-audited and closing-partnership engineering reports in PDF format. These documents are presented in a non-editable format. The engineering report tool includes a user interface that displays a hyper-linked list of available forecasts. By clicking on the desired report in the list of available reports, users can open the specified report in a new window. From the new window, users can view, print, or save the report by using the Adobe® Acrobat Reader functions. To view another report from the same partner, click on the desired report so that it can be viewed. To view another report from another partner, a user must change the partner name in the select partner list and select the submit button. A new list of available forecasts is then displayed.

Figure 44:
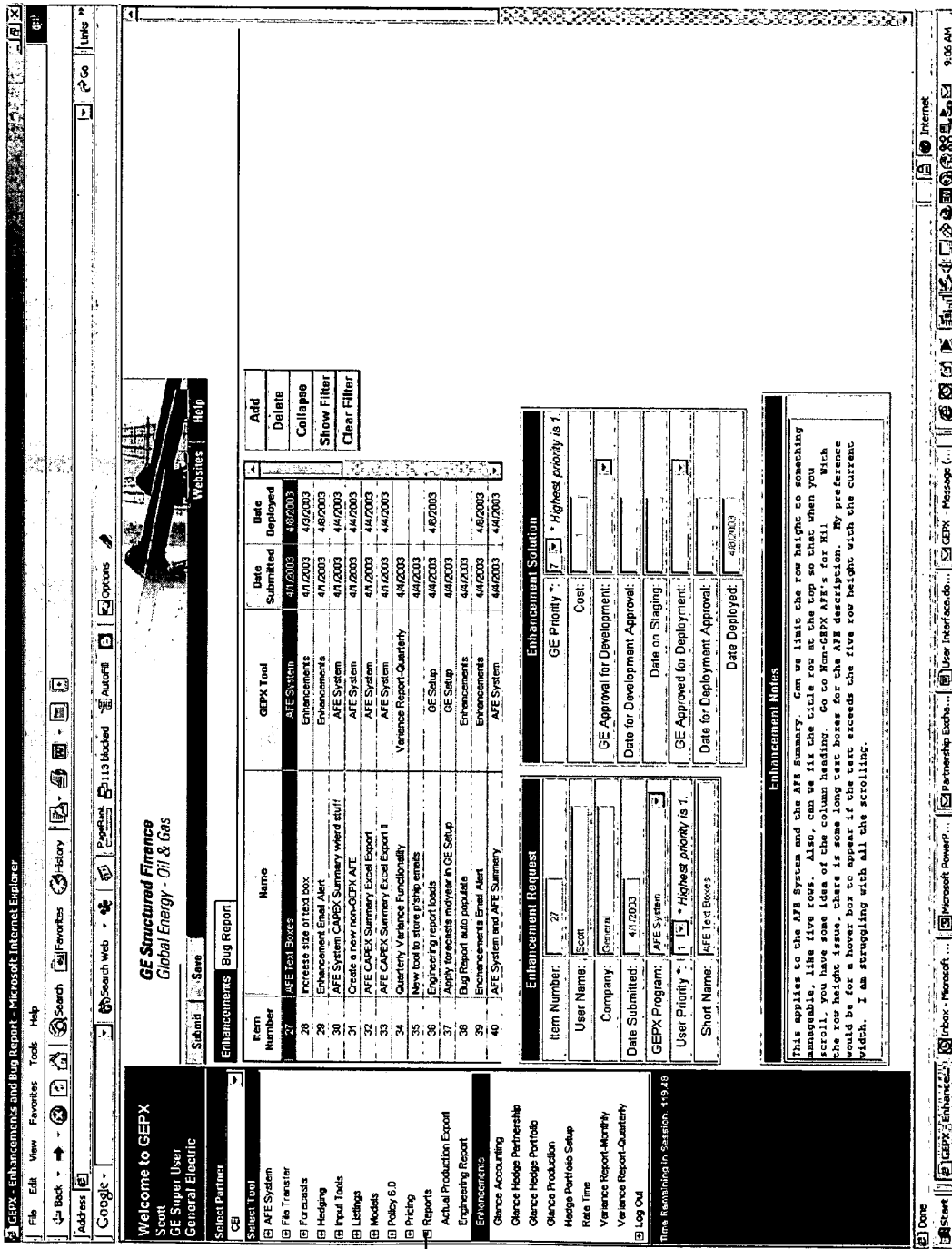
FIG. 44 is an example embodiment of a user interface displaying an enhancements report tool page within PECS.

FIG. 44 is an example embodiment of a user interface 840 displaying an enhancements report tool page within PECS 10 (shown in FIG. 1). The enhancements report tool is available exclusively to personnel within the business entity. This tool gives the business entity the ability to document system enhancements to the PECS 10 development team, and report any bugs that need to be addressed. The enhancements tab allows users to report any suggestions for enhancements to the system. The bug report tab allows users to report any errors/bugs, or other problems to the developers of the system.

Figure 45:
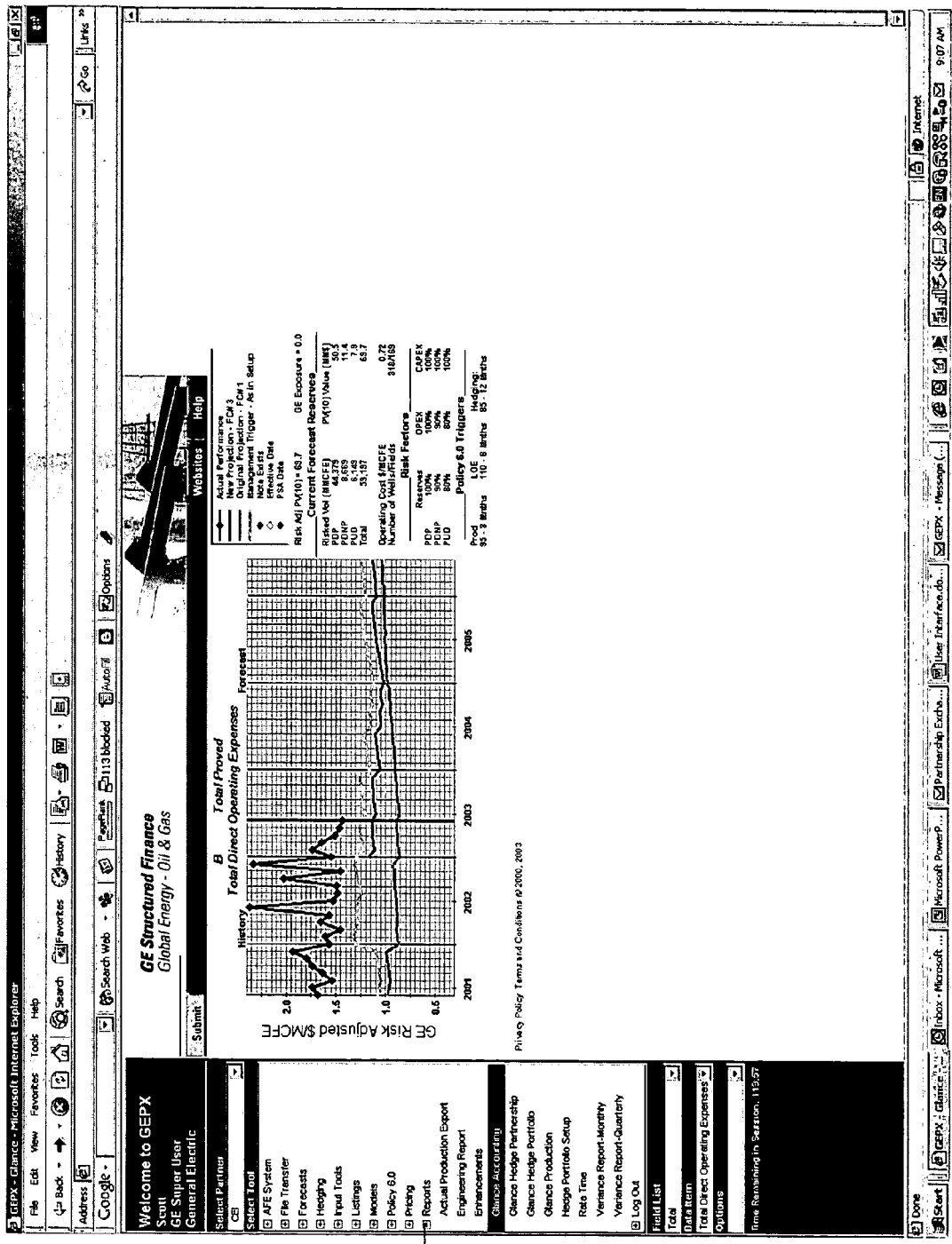
FIG. 45 is an example embodiment of a user interface displaying a glance accounting report tool page within PECS.

FIG. 45 is an example embodiment of a user interface 850 displaying a glance accounting report tool page within PECS 10 (shown in FIG. 1). The glance accounting tool enables a user to generate customer graphs and charts at various levels of partnership monthly cash flow reporting. The level of granular detail that can be manipulated in the glance accounting tool is dependent on the level of detail established when the partnership was initially set up within PECS 10. The glance accounting tool provides a medium and set of tools by which the user can graphically manipulate and display partnership performance information.

The glance accounting tool displays and manipulates data either based on an expense category or entity level. Data can also be sensitized ("on the fly") from the default settings based on underwriting criteria and Policy 6.0. The glance accounting tool enables a user to quickly understand the broad details of partnership performance and enables the user to mine down to specific details to understand variances.

The glance accounting tool enables a user to manipulate data including "Measured as: At the Well Level"; "Measured as: At the Field Level"; and "Measured as: Totals for All Categories". The glance accounting tool also enables a user to manipulate data including: Net Income before Federal Income Taxes; Routine Lease Operating Expenses; Total Property Operating Income; Workover/Plugging Expenses; Total Direct Operating Expenses; General and Administrative Expenses; Depreciation, Depletion and Amortization (DD&A); Gross Operating Profit; Other Expenses (Income); Operating Cash Flow; Distributions; Product Sales; Management Fee; Estimated Section 29 Credits; Hedge Income; Severance Tax; Ad Valorem Tax; Insurance; Gas Sales; Oil Sales; COPAS; and CAPEX.

Figure 46:
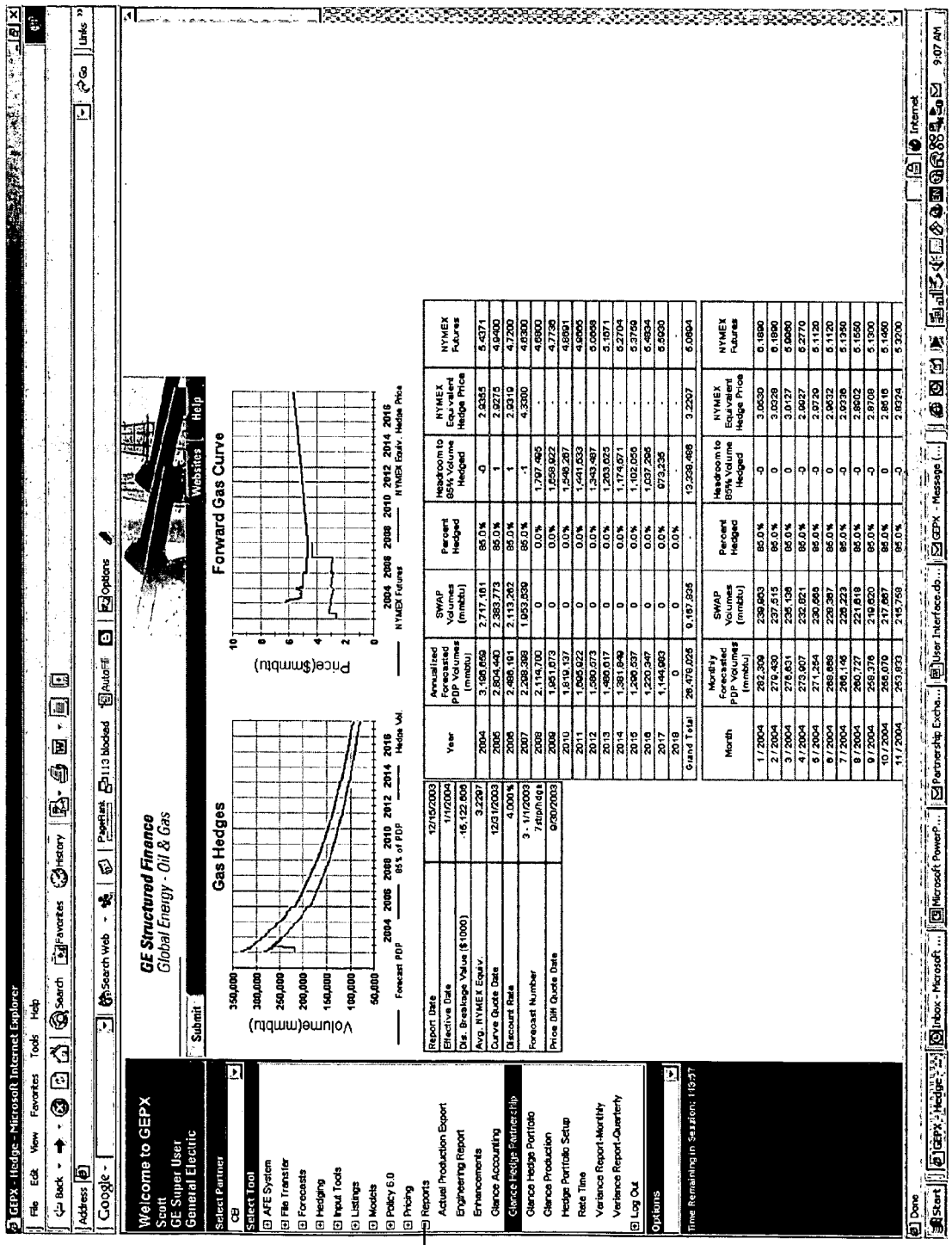
FIG. 46 is an example embodiment of a user interface displaying a glance hedge partnership report tool page within PECS.

FIG. 46 is an example embodiment of a user interface 860 displaying a glance hedge partnership report tool page within PECS 10 (shown in FIG. 1). The glance hedge partnership report tool provides the user with detailed information about a particular partnership's hedge position in one location. This provides the user hedge breakage gains or losses for both oil and gas as well as amount and percentage hedged for the life of the partnership. The glance hedge partnership tool includes a user interface that displays, by default, a gas hedge's chart and a forward gas curve chart. Data grids are also displayed. The data grids can be manipulated by using the tools in the options list.

Options that are available for the glance hedge partnership tool include futures curve date, price differential quote date, report date, discount percent, forecast, generate spreadsheet, and product. The futures curve date option enables a user to adjust the market to market data by selecting a different date from the drop-down list. The date is used in determining the NYMEX price for oil and gas in the future. The price differential quote date enables a user to select a different price differentials quote date from the drop-down list. The date is used to value swaps that are based on non-NYMEX gas. The report date option enables a user to select a report date from the drop-down list. In the example embodiment, the report date should be the same as the futures curve date and the price differential quote date. The discount percent option enables a user to specify a discount percentage value in the data field. This value is used when determining the hedge breakage gain or loss. The forecast option enables a user to select a different engineering forecast from the list of available forecasts to use in valuing and displaying the hedge position.

Figure 47:
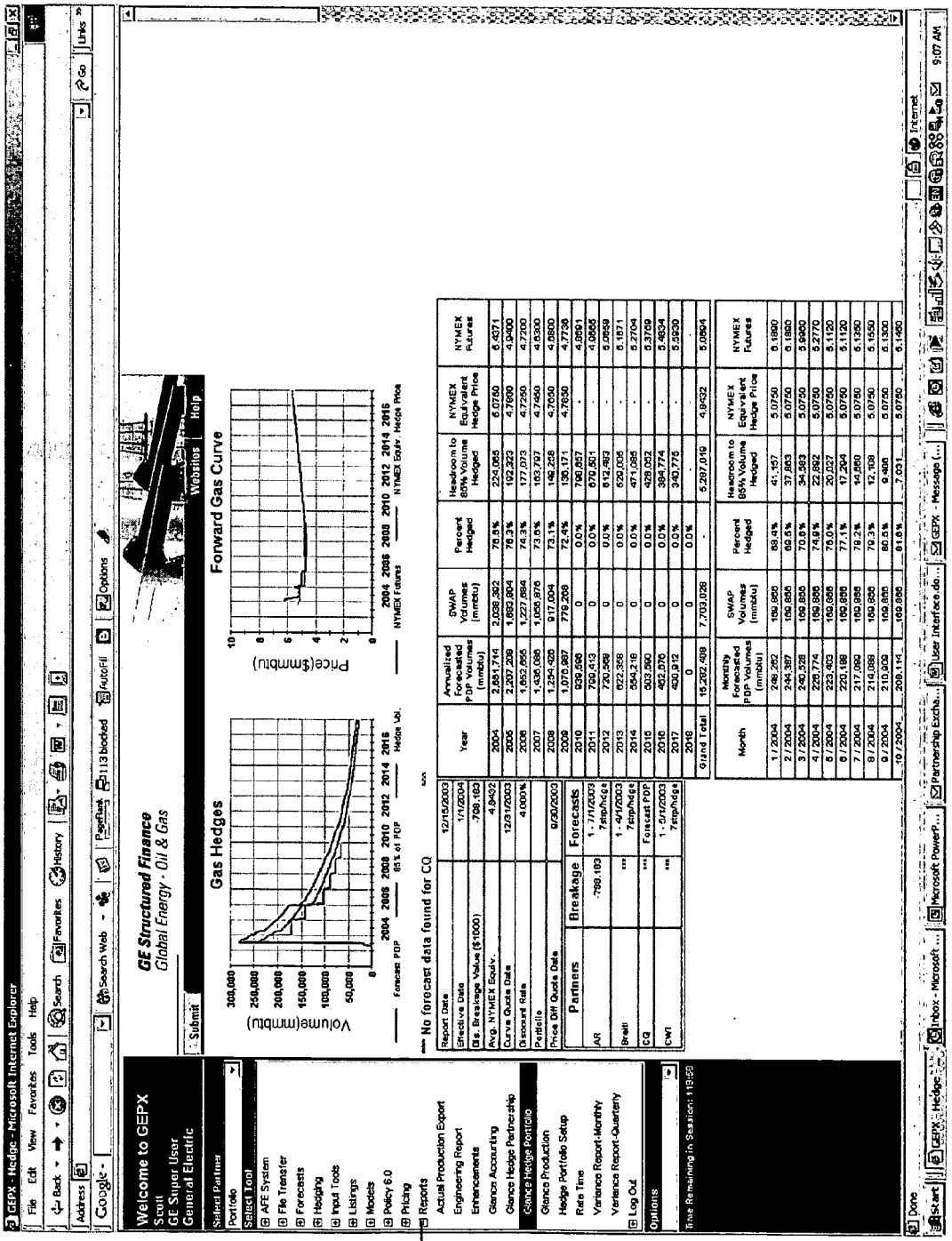
FIG. 47 is an example embodiment of a user interface displaying a glance hedge portfolio report tool page within PECS.

FIG. 47 is an example embodiment of a user interface 870 displaying a glance hedge portfolio report tool page within PECS 10 (shown in FIG. 1). The glance hedge portfolio report tool includes a user interface that offers data similar to that found on the glance hedge partnership user interface. However, the data found on the glance hedge portfolio page is a summation of the aggregate data from all existing partnerships. The glance hedge portfolio page enables users to maintain hedging contracts with immediate on-screen results.

Figure 48:
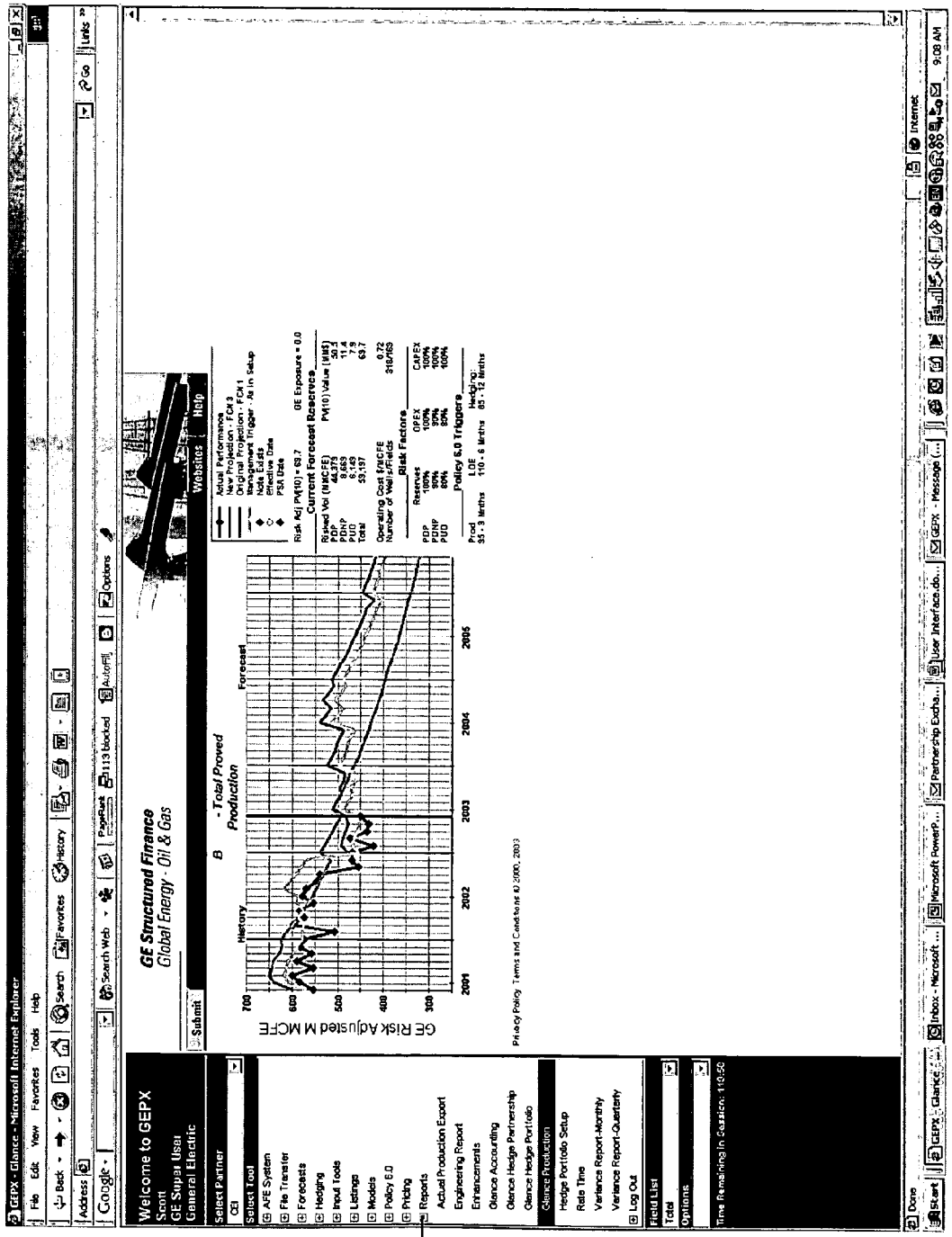
FIG. 48 is an example embodiment of a user interface displaying a glance production tool page within PECS.

FIG. 48 is an example embodiment of a user interface 880 displaying a glance production tool page within PECS 10 (shown in FIG. 1). The glance production tool provides an immediate review of the selected property or group of properties. The plot may be viewed at a partner level and, when available, well level and field level. Along with the glance production plot, PECS 10 provides a legend providing Current Forecast Reserves, Risk Factors, and Management Trigger Information.

The options available to be used with the glance production tool include units, BOE (barrels-of-oil equivalents) ratios, report type, X-axis, Y-scale, forecast, triggers, risk factors, and notes. The units option enables a user to choose between barrels-of-oil equivalents or cubic feet equivalents. The BOE ratios enable a user to enter customized ratio information. The report type option enables a user to view the report based on total PDP reserves or total reserves. The X-axis option enables a user to specify the number of years visible along the X-axis of the graph. In the example embodiment, the user may choose either a 5-year or 10-year range. The Y-scale option enables a user to choose between linear scale or logarithmic scale as the basis of plot generation. The forecast option enables a user to select from several available forecasts and view the chart based on the selected forecast. The triggers option enables a user to enter specific trigger information to generate a custom view based on the values entered by the user. The risk factors option enables a user to set specific risk factors, and to generate the report based on these custom entries. The notes option enables a user to add notes/comments about a particular data item. It provides the ability to make, archive, and search information the user selects to enter. A search button enables a user to search through previously entered notes by creating a search query by using a drop-down box to specify search criteria.

Figure 49:
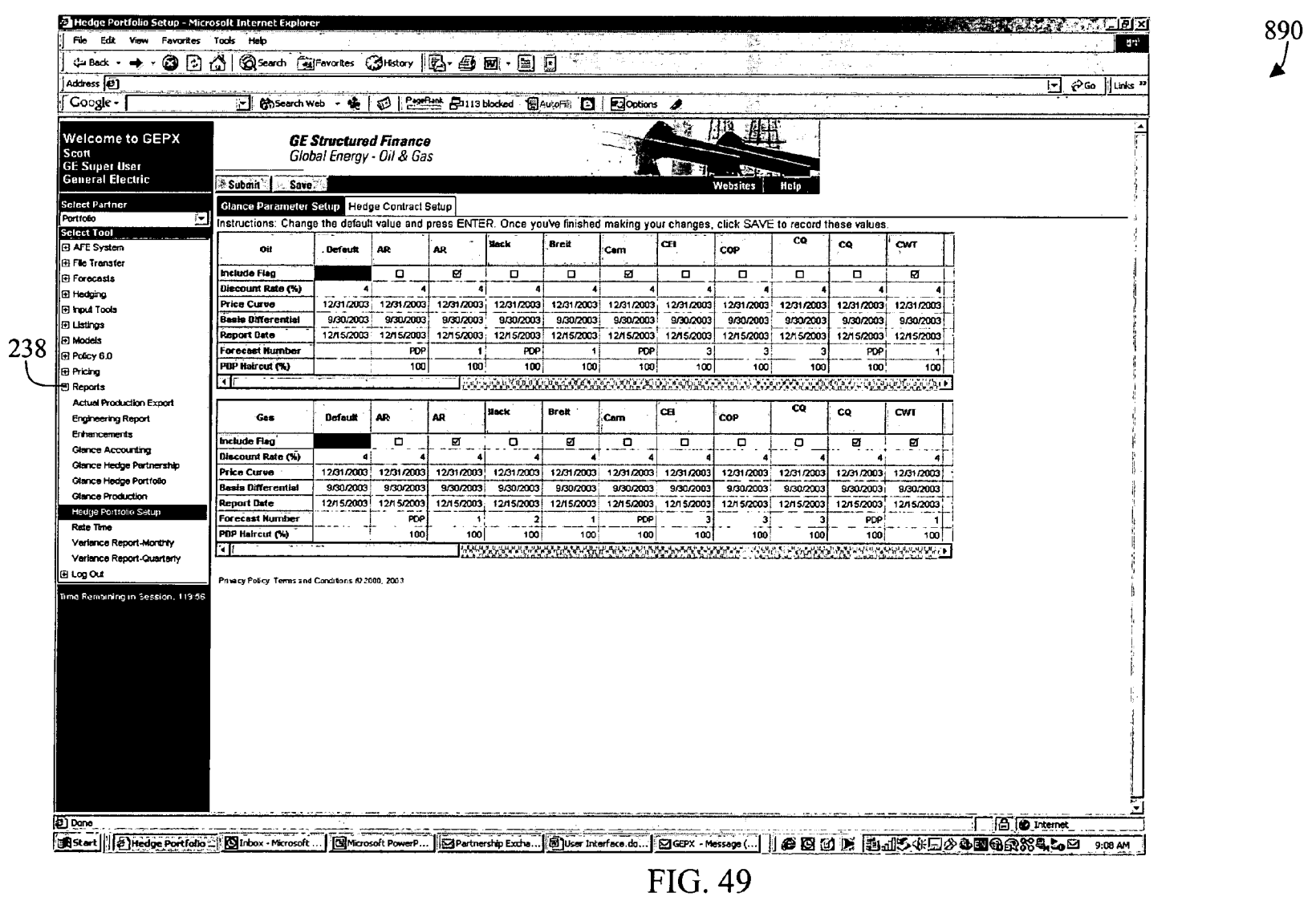

FIG. 49 is an example embodiment of a user interface 890 displaying a hedge portfolio setup tool page within PECS 10

(shown in FIG. 1). The hedge portfolio setup tool enables a user to enter values into a grid, and then select Save to commit the changes to the database. This is where the default values for the hedging calculations are entered.

Figure 50:
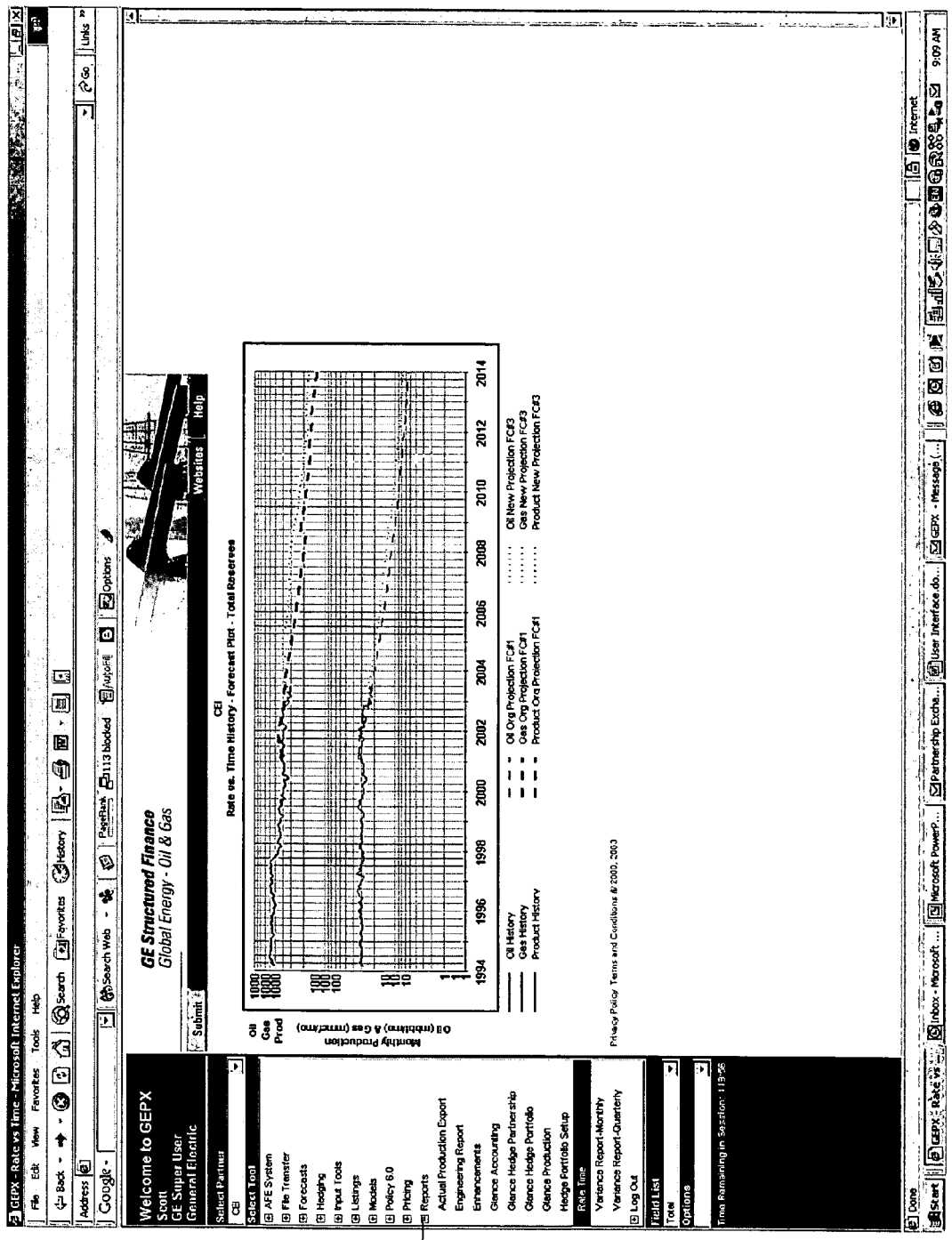
FIG. 50 is an example embodiment of a user interface displaying a rate time tool page within PECS.

FIG. 50 is an example embodiment of a user interface 900 displaying a rate time tool page within PECS 10 (shown in FIG. 1). The rate time tool displays a monthly rate versus time plot. The default view shows the total historical production, current production, and forecasted production values by year for the selected partner. In the example embodiment, the total historical production values along the Y-axis are production values for oil: measured in thousands of barrels per month, and gas: measured in thousands of cubic feet per month. Users can drill down to the oil field level and view a chart based on a specific oil field. If the partner's system has been configured to load well or lease data into the system during the monthly load, then users are presented with the ability to drill down further to the well/lease level.

Figure 51:
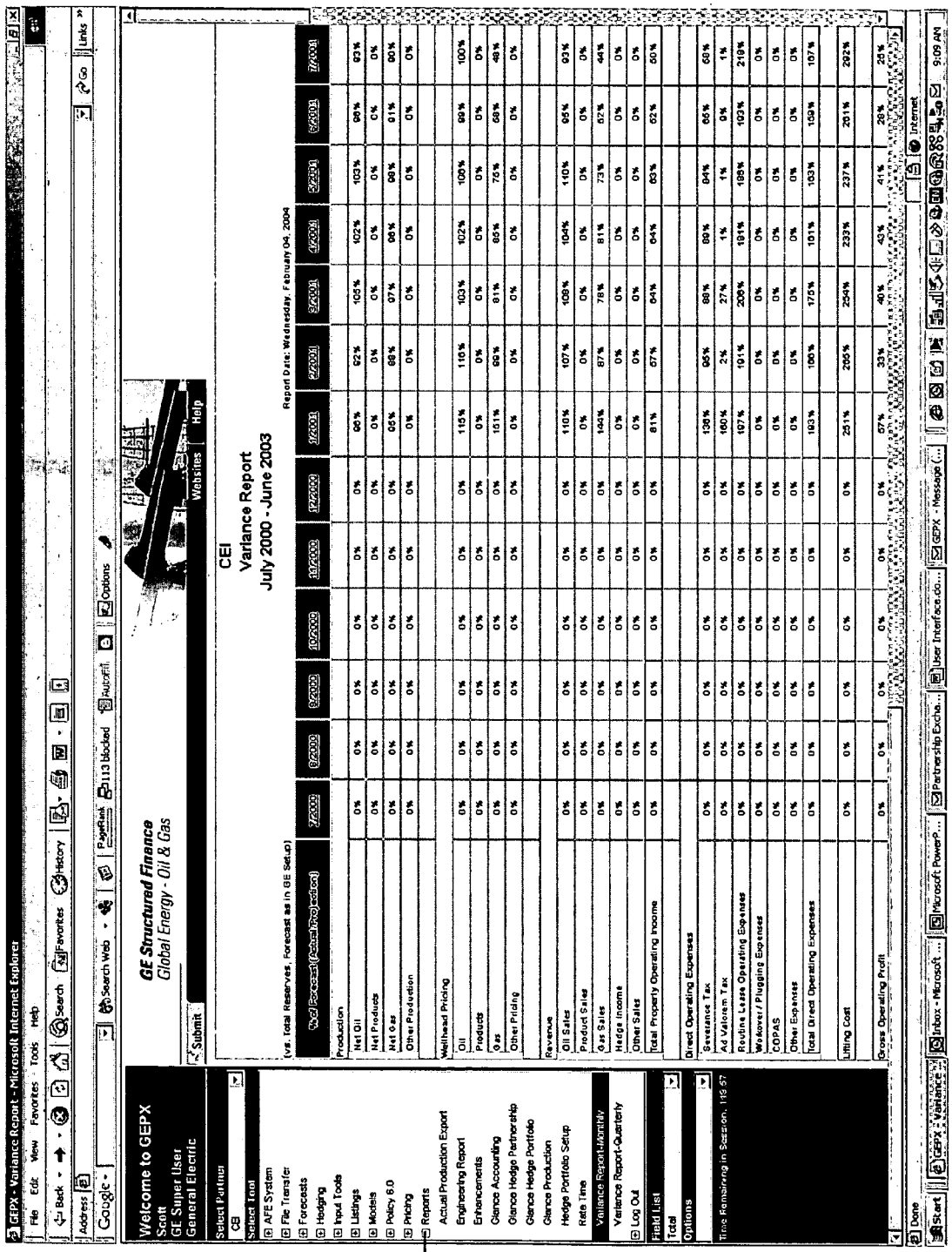
FIG. 51 is an example embodiment of a user interface displaying a variance report-monthly tool page within PECS.
Figure 52:
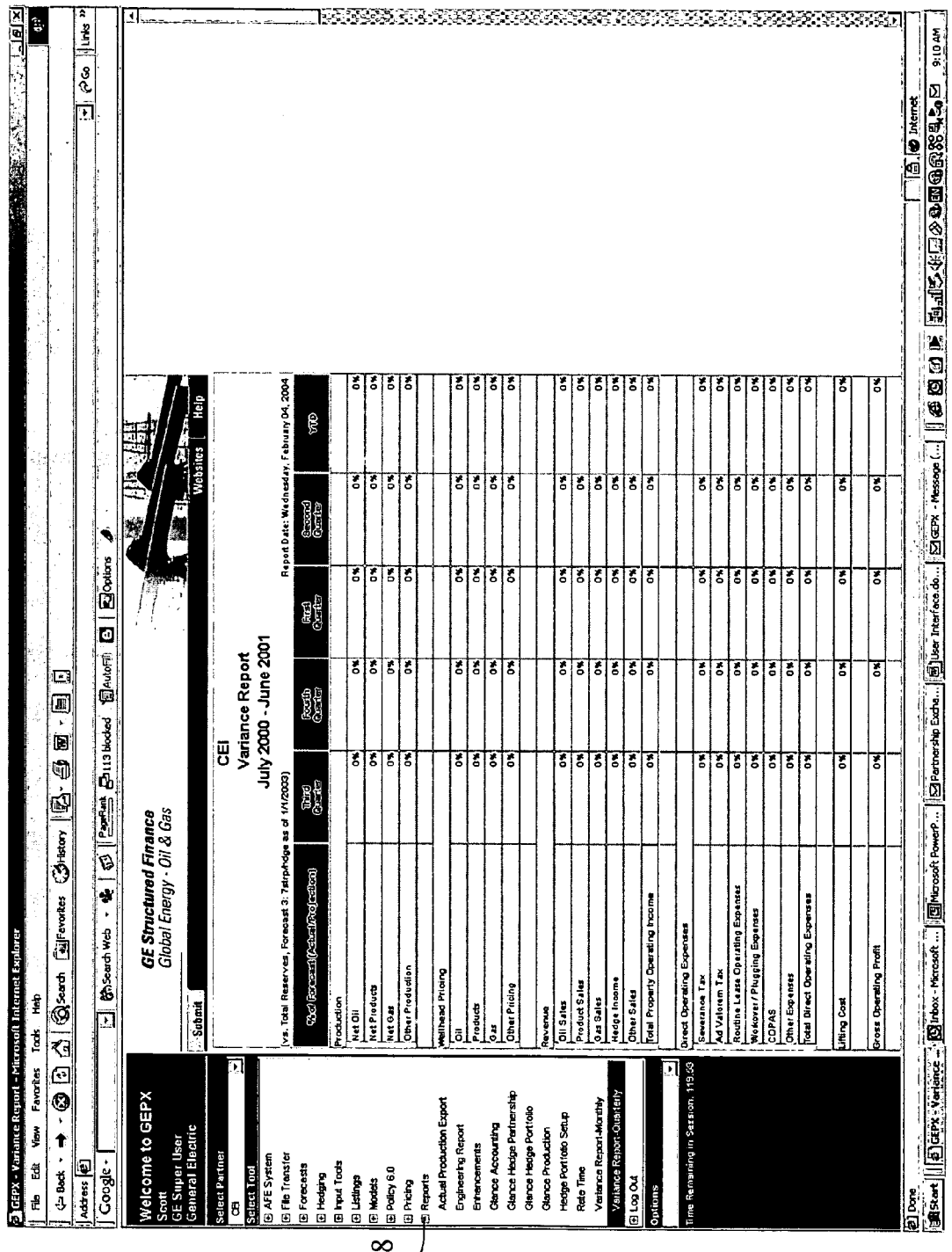
FIG. 52 is an example embodiment of a user interface displaying a variance report-quarterly tool page within PECS.

In the example embodiment, there are two types of variance report tools available in PECS 10: the variance report-monthly tool shown in FIG. 51 and the variance report-quarterly tool shown in FIG. 52. Both versions of the report are similar in nature. The difference is the presentation in a monthly format as opposed to a quarterly format. All reports are exportable into Microsoft® Excel spreadsheet format.

In the example embodiment, the variance report page is divided into three sections: (1) Variance from planned delineated by "percentage of forecast (actual/projection)"; (2) Actual performance—delineated by "actual (production month or year)"; and (3) Estimated reserves—delineated by "engineering report projection reserve".

The variance report includes the variance from planned which is delineated by percentage of forecast (actual/projection). It is an analysis that, on a risk or unrisk basis, compares actual monthly/quarterly partnership performance to that of the forecasts found on the audited engineering reports. A value of 100% indicates that actuals perfectly match projections. Variance data values that are less than 100% indicate that actual performance was less than the projected forecast found on the audited engineering reports. Variance data values that are greater than 100% indicate that actual performance exceeded that of the forecast found on the engineering report.

The variance report also includes actual performance, which is delineated by actual (production month or year). Actual performance reflects the data values that are populated by the automatic monthly load of data from the partnership as well as any manually entered values into the system.

The PECS therefore facilitates integrated network-based electronic reporting and workflow process management. The PECS also facilitates an electronic submission of information using a client system, automating extraction of information, and web-based reporting for internal and external system users. More specifically, the PECS facilitates many of the required processes that are performed by both general and limited partners on a daily, weekly, monthly or quarterly, or annual basis. The PECS allows a user to register within the system, and then collect, manage, store and disseminate partnership information among internal users and selected outside users to facilitate a more accurate and efficient processing of partnership business. Moreover, the PECS facilitates accurate and timely reporting of performance as well as real time analysis of partnership performance. The system is designed with the goals of making compliance with the partnership agreement easier, quicker, and more efficient overall as a function of day to day operations of partnership assets.

The PECS collects data from partnerships and stores the data within one common, access-restricted database. This allows analyses to be performed upon the data, and thus facilitating the management of the partnerships. Users submit data in compliance with partnership agreements. Users can also use the data to compare actual performance against forecasts, to identify unanticipated variance scenarios. The PECS also enables users to: request authorizations electronically by submitting AFEs electronically; upload performance metrics (e.g., upload data on a monthly/weekly/quarterly/annual basis); download/generate charts, reports, graphs, models, and files; create new forecasts, extrapolations, and data views; create quarterly and monthly variance reports; access important data; compare actual and forecast data; download spreadsheet models; access PDF files; and view partners' combined data.

While the invention has been described in terms of various specific embodiments, those skilled in the art will recognize that the invention can be practiced with modification within the spirit and scope of the claims.

What is claimed is:

1. A method for exchanging information within a partnership using a web-based system including a server coupled to a centralized database of business data relating to the partnership and at least one client system, the partnership having an ownership interest in an energy producing asset including at least one of an oil producing asset and a natural gas producing asset, the server including a plurality of analytical tools, said method comprising:

providing forms stored within the server as web pages for the insertion of updated partnership business data and causing the forms to be displayed on a client system;

uploading forms that include updated partnership business data intended for use by other authorized users to the server, wherein the updated partnership business data is stored within the database, the partnership business data including information describing the energy producing asset;

formatting the partnership business data uploaded using web pages stored within the server;

downloading the web pages to authorized users requesting the updated partnership business data;

accessing the plurality of analytical tools including an authorization for expenditure tool and a glance hedge partnership tool, wherein the authorization for expenditure tool processes a request from an authorized user for a proposed expenditure within the partnership and stores within the database, for a capital expenditure, data describing an increase in forecasted output of the energy producing asset resulting from the capital expenditure, and wherein the glance hedge partnership tool determines a hedge position for the partnership with respect to the energy producing asset based on the data stored within the database, wherein the hedge position is based on an annualized forecasted output of the energy producing asset which includes the increase in forecasted output resulting from the capital expenditure; and tracking the proposed expenditure request using the authorization for expenditure tool through an approval process within the partnership.

2. A method according to claim 1 wherein said step of accessing the plurality of analytical tools further comprises the step of accessing the authorization for expenditure (AFE) tool to facilitate at least one of a creation of a request packet by a general partner including a presentation of information to assist a limited partner in making a decision with respect to the proposed expenditure request, an inclusion of text and graphic image files relevant to the proposed expenditure request, a general partner approval process, a submission of the proposed expenditure request to a limited partner, a limited partner review of technical and economic data, an engineering consultant review of technical and economic data, a generation of appropriate internal approval forms, a limited partner approval process, and tracking of technical and economic performance metrics.

3. A method according to claim 1 wherein said step of tracking the proposed expenditure request further comprises the step of using a status map to display on a graphical user interface the proposed expenditure request's current step in an approval process including timestamps indicating an amount of time spent at each step, creating an owner of the request and teams, and an ability to track performance of the request.

4. A method according to claim 1 wherein said step of accessing the plurality of analytical tools further comprises the step of accessing the plurality of analytical tools to record purchases and sales of assets associated with the partnership.

5. A method according to claim 1 wherein said step of tracking the proposed expenditure request further comprises the step of displaying at least one of engineering data and economics data to be reviewed by an authorized user as part of the approval process.

6. A method according to claim 1 wherein said step of accessing the plurality of analytical tools further comprises the step of accessing the plurality of analytical tools including a file transfer tool to perform at least one of download user files from the server to the client system, and upload partnership reports from the client system to the server.

7. A method according to claim 1 wherein said step of accessing the plurality of analytical tools further comprises the step of accessing the plurality of analytical tools including at least one of a forecast builder tool and a hedge production forecast tool.

8. A method according to claim 7 wherein the database stores partnership business data for a plurality of partnerships, and wherein said step of accessing the plurality of analytical tools further comprises the steps of:
   selecting a partnership from the plurality of partnerships stored within the database;
   using the forecast builder tool to display current forecasts for the selected partnership; and
   enabling a user to create new customized forecasts for the selected partnership.

9. A method according to claim 7 wherein said step of accessing the plurality of analytical tools further comprises the step of using the hedge production forecast tool to create customized forecasts for hedging analysis purposes.

10. A method according to claim 1 wherein said step of accessing the plurality of analytical tools further comprises the step of accessing the plurality of analytical tools including at least one of a bank management tool, a display hedge contracts tool, a FASB (Financial Accounting Standards Board) 133 evaluation model, a glance hedge portfolio tool, a hedge analysis tool, a hedge contract settle tool, a hedge contracts tool, a hedge portfolio setup tool, a hedge production forecast tool, a hedging futures price tool, and a hub management tool.

11. A method according to claim 10 wherein said step of accessing the plurality of analytical tools further comprises the step of accessing the display hedge contracts tool to enable a user to view and modify data relating to contracts entered into between banks and the partnership.

12. A method according to claim 10 wherein said step of accessing the plurality of analytical tools further comprises the step of accessing the FASB 133 evaluation model to ensure that derivative instruments are properly recorded in a balance sheet of the partnership.

13. A method according to claim 10 wherein said step of accessing the plurality of analytical tools further comprises the step of accessing the glance hedge partnership tool, the glance hedge partnership tool displays information relating to the partnership's hedge position for the energy producing asset including at least one of a gas hedges data grid, a forward gas curve data grid, an oil hedges data grid, and a forward oil curve data grid, wherein the glance hedge partnership tool further includes a futures curve date list, a discount percent data field, and a forecast list for calculating the hedge position of the partnership at the energy producing asset, wherein the future curve date list is a list of selectable dates used for determining a future price for at least one of oil and gas, the discount percent data field receives a discount percentage value that is used to determine a hedge breakage gain or loss for the energy producing asset, and the forecast list is a list of selectable engineering forecasts used in valuing and displaying the hedge position of the energy producing asset.

14. A method according to claim 10 wherein said step of accessing the plurality of analytical tools further comprises the step of accessing the glance hedge portfolio tool to summarize data from a plurality of partnerships.

15. A method according to claim 10 wherein said step of accessing the plurality of analytical tools further comprises the step of accessing the hedge analysis tool to enable an authorized user to analyze hedge data.

16. A method according to claim 10 wherein said step of accessing the plurality of analytical tools further comprises the step of accessing the hedging futures price tool that stores daily quotes for oil and gas futures contracts.

17. A method according to claim 1 wherein said step of accessing the plurality of analytical tools further comprises the step of accessing the plurality of analytical tools including at least one of an asset play tool, assumptions, a flip payout, a setup tool, a mail tool, a partner setup tool, a user entered data tool, a user information tool, and a user maintenance tool.

18. A method according to claim 1 wherein said step of accessing the plurality of analytical tools further comprises the step of accessing the plurality of analytical tools including at least one of a partner list, a field list, and at least one of a well and lease list.

19. A method according to claim 1 wherein said step of accessing the plurality of analytical tools further comprises the step of accessing the plurality of analytical tools including a net income forecasting model to forecast net income for a specific partnership.

20. A method according to claim 1 wherein said step of accessing the plurality of analytical tools further comprises the step of accessing the plurality of analytical tools including at least one of a basis differential tool, a discount rates tool, an escalation factors tool, a hedging futures price tool, and a historical average price tool.

21. A method according to claim 1 wherein said step of accessing the plurality of analytical tools further comprises the step of accessing the plurality of analytical tools to generate a plurality of reports including at least one of an actual production export report, an engineering report, an enhancements report, a glance accounting report, a glance hedge partnership report, a glance hedge portfolio report, a glance production report, a hedge portfolio set-up report, a rate time report, a variance report-monthly report, and a variance report-quarterly report.

22. A method according to claim 1 further comprising establishing a communication link between the client system and the server, wherein the communication link includes at least one of a wide area network, a local area network, an intranet, and the Internet.

23. A web-based system for exchanging information within a partnership having an ownership interest in an energy producing asset including at least one of an oil producing asset and a natural gas producing asset, said system comprising:
- at least one client system comprising a browser;
- a database for storing business data relating to the partnership; and
- a server comprising a plurality of analytical tools, said server configured to be coupled to said client system and said database, said server further configured to:
  - provide forms stored within said server as input web pages for the insertion of updated partnership business data,
  - display the input web pages on said client system,
  - upload forms including updated partnership business data intended for use by other authorized users to said server wherein the updated partnership business data is stored within said database, the partnership business data including information describing the energy producing asset,
  - format the partnership business data uploaded using output web pages stored within said server,
  - download the output web pages to authorized users requesting the updated partnership business data,
  - display on said client system the output web pages,
  - access the plurality of analytical tools including an authorization for expenditure tool that processes a request from an authorized user for a proposed expenditure within the partnership and stores within the database, for a capital expenditure, data describing an increase in forecasted output of the energy producing asset resulting from the capital expenditure, and a glance hedge partnership tool that determines a hedge position for the partnership with respect to the energy producing asset based on the data stored within the database, wherein the hedge position is based on an annualized forecasted output of the energy producing asset which includes the increase in forecasted output resulting from the capital expenditure, and
  - track the proposed expenditure request using the authorization for expenditure tool through an approval process within the partnership.

24. A system according to claim 23 wherein said server further configured to access the authorization for expenditure (AFE) tool to at least one of create a request packet by a general partner including a presentation of information to assist a limited partner in making a decision with respect to the proposed expenditure request, receive text and graphic image files relevant to the proposed expenditure request, receive a general partner approval process, submit the proposed expenditure request to a limited partner, enable a limited partner review of technical and economic data, enable an engineering consultant review of technical and economic data, generate appropriate internal approval forms, receive a limited partner approval process, and track technical and economic performance metrics.

25. A system according to claim 23 wherein said server further configured to generate a status map to display on a graphical user interface the proposed expenditure request's current step in an approval process including timestamps indicating an amount of time spent at each step, create an owner of the request and teams, and track performance of the request.

26. A system according to claim 23 wherein said server further configured to record purchases and sales of assets associated with the partnership.

27. A system according to claim 23 wherein said server further configured to display at least one of engineering data and economics data to be reviewed by an authorized user as part of the approval process.

28. A system according to claim 23 wherein said server further configured to access the plurality of analytical tools including a file transfer tool to perform at least one of download user files to the client system, and upload partnership reports from the client system.

29. A system according to claim 23 wherein said server further configured to access the plurality of analytical tools including at least one of a forecast builder tool and a hedge production forecast tool.

30. A system according to claim 29 wherein said server further configured to use the forecast builder tool to display current forecasts for a partnership, and enable a user to create new customized forecasts for the partnership.

31. A system according to claim 29 wherein said server further configured to use the hedge production forecast tool to create customized forecasts for hedging analysis purposes.

32. A system according to claim 23 wherein said server further configured to access the plurality of analytical tools including at least one of a bank management tool, a display hedge contracts tool, a FASB (Financial Accounting Standards Board) 133 evaluation model, a glance hedge portfolio tool, a hedge analysis tool, a hedge contract settle tool, a hedge contracts tool, a hedge portfolio setup tool, a hedge production forecast tool, a hedging futures price tool, and a hub management tool.

33. A system according to claim 32 wherein said server further configured to access the display hedge contracts tool to enable a user to view and modify data relating to contracts entered into between banks and the partnership.

34. A system according to claim 32 wherein said server further configured to access the FASB 133 evaluation model to ensure that derivative instruments are properly recorded in a balance sheet of the partnership.

35. A system according to claim 32 wherein said server further configured to access the glance hedge partnership tool, the glance hedge partnership tool displays information relating to the partnership's hedge position for the energy producing asset including at least one of a gas hedges data grid, a forward gas curve data grid, an oil hedges data grid, and a forward oil curve data grid, wherein the glance hedge partnership tool further includes a futures curve date list, a discount percent data field, and a forecast list for calculating the hedge position of the partnership at the energy producing asset, wherein the future curve date list is a list of selectable dates used for determining a future price for at least one of oil and gas, the discount percent data field receives a discount percentage value that is used to determine a hedge breakage gain or loss for the energy producing asset, and the forecast list is a list of selectable engineering forecasts used in valuing and displaying the hedge position of the energy producing asset.

36. A system according to claim 32 wherein said server further configured to access the glance hedge portfolio tool to summarize data from a plurality of partnerships.

37. A system according to claim 32 wherein said server further configured to access the hedge analysis tool to enable an authorized user to analyze hedge data.

38. A system according to claim 32 wherein said server further configured to access the hedging futures price tool for storing daily quotes for oil and gas futures contracts.

39. A system according to claim 23 wherein said server further configured to access the plurality of analytical tools including at least one of an asset play tool, assumptions, a flip payout, a setup tool, a mail tool, a partner setup tool, a user entered data tool, a user information tool, and a user maintenance tool.

40. A system according to claim 23 wherein said server further configured to display a partner list, a field list, and at least one of a well and lease list.

41. A system according to claim 23 wherein said server further configured to access the plurality of analytical tools including a net income forecasting model for forecasting net income for a specific partnership.

42. A system according to claim 23 wherein said server further configured to access the plurality of analytical tools including at least one of a basis differential tool, a discount rates tool, an escalation factors tool, a hedging futures price tool, and a historical average price tool.

43. A system according to claim 23 wherein said server further configured to generate a plurality of reports including at least one of an actual production export report, an engineering report, an enhancements report, a glance accounting report, a glance hedge partnership report, a glance hedge portfolio report, a glance production report, a hedge portfolio set-up report, a rate time report, a variance report-monthly report, and a variance report-quarterly report.

44. A system according to claim 23 wherein said client system and said server are coupled via a network, wherein said network is one of a wide area network, a local area network, an intranet, and the Internet.

45. A system according to claim 23 wherein the updated partnership business data includes oil and gas exploration data, wherein at least one of the forms includes an authorization for expenditure form relating to oil and gas exploration, and wherein said server is further configured to:
  enable an authorized user to access an information page via the at least one client system;
  display on the information page a risk factor table associated with the partnership's oil and gas exploration; and
  prompt an authorized user through the at least one authorization for expenditure web page displayed on the client system to approve or disapprove a proposed expenditure within the partnership based on the risk factor table.

46. A system according to claim 45 wherein the risk factor table charts wells that are proved, developed and producing (PDP); proved, developed, and non-producing (PDNP); and proved and undeveloped (PUD) against at least one of reserves, lease operating expenses and capital expenditures (CAPEX).

47. A method for exchanging information within a partnership involved in oil and gas exploration using a web-based system including a server coupled to a centralized database of business data relating to the partnership and at least one client system, the partnership having an ownership interest in an energy producing asset including at least one of an oil producing asset and a natural gas producing asset, the server including a plurality of analytical tools, said method comprising:
  providing forms stored within the server as web pages for the insertion of updated partnership business data including oil and gas exploration data;
  uploading forms that include updated partnership business data intended for use by other authorized users to the server, wherein the updated partnership business data is stored within the database, the partnership business data including information describing the energy producing asset;
  enabling an authorized user to access an information page via the at least one client system;
  prompting an authorized user from the information page to access at least one of the plurality of analytical tools including an authorization for expenditure tool and a glance hedge partnership tool, wherein the authorization for expenditure tool processes a request from an authorized user for a proposed expenditure within the partnership and stores within the database, for a capital expenditure, data describing an increase in forecasted output of the energy producing asset resulting from the capital expenditure, and wherein the glance hedge partnership tool determines a hedge position for the partnership with respect to the energy producing asset based on the data stored within the database, wherein the hedge position is based on an annualized forecasted output of the energy producing asset which includes the increase in forecasted output resulting from the capital expenditure; and
  tracking the proposed expenditure request using the authorization for expenditure tool through an approval process within the partnership.

48. A method in accordance with claim 47 wherein the proposed expenditure request relates to oil and gas exploration, and wherein the method further comprises displaying on the information page a risk factor table that charts oil and gas wells that are proved, developed and producing (PDP); proved, developed, and non-producing (PDNP); and proved and undeveloped (PUD) against at least one of reserves, lease operating expenses and capital expenditures (CAPEX).

49. A method according to claim 47 wherein said step of prompting an authorized user from the information page to access at least one of the plurality of analytical tools further comprises the step of accessing the authorization for expenditure (AFE) tool to facilitate at least one of a creation of a request packet by a general partner including a presentation of information to assist a limited partner in making a decision with respect to the proposed expenditure request, an inclusion of text and graphic image files relevant to the proposed expenditure request, a general partner approval process, a submission of the proposed expenditure request to a limited partner, a limited partner review of technical and economic data, an engineering consultant review of technical and economic data, a generation of appropriate internal approval forms, a limited partner approval process, and tracking of technical and economic performance metrics.

50. A method according to claim 47 wherein said step of tracking the proposed expenditure request further comprises the step of using a status map to display on a graphical user interface the proposed expenditure request's current step in an approval process including timestamps indicating an amount of time spent at each step, creating an owner of the request and teams, and an ability to track performance of the request.

51. A method according to claim 47 wherein said step of prompting an authorized user from the information page to access at least one of the plurality of analytical tools further comprises the step of accessing the plurality of analytical tools including at least one of the following a file transfer tool, a forecasting tool, a hedging tool, input tools, a listings tool, a models tool, a policy 6.0 tool, a pricing tool, and a reports tool.

52. A computer program embodied on a computer readable medium and executable by a processor for exchanging information within a partnership having an ownership interest in an energy producing asset including at least one of an oil producing asset and a natural gas producing asset, said program comprising at least one code segment that receives business data relating to the partnership and then:
- maintains a database by adding, deleting and updating business data;
- provides forms as web pages for the insertion of updated partnership business data and causing the forms to be displayed on a client system, the partnership business data including information describing the energy producing asset;
- downloads the web pages to authorized users requesting the updated partnership business data;
- accesses the plurality of analytical tools including an authorization for expenditure tool that submits a request from an authorized user for a proposed expenditure within the partnership and stores within the database, for a capital expenditure, data describing an increase in forecasted output of the energy producing asset resulting from the capital expenditure, and a glance hedge partnership tool that determines a hedge position for the partnership with respect to the energy producing asset based on the data stored within the database, wherein the hedge position is based on an annualized forecasted output of the energy producing asset which includes the increase in forecasted output resulting from the capital expenditure; and
- tracks the proposed expenditure request using the authorization for expenditure tool through an approval process within the partnership.

53. A computer program in accordance with claim 52 further comprising at least one code segment that:
- enables a general partner to create a request packet to assist a limited partner in making a decision with respect to the proposed expenditure request;
- enables a user to include text and graphic image files relevant to the proposed expenditure request;
- provides a general partner approval process;
- submits the proposed expenditure request to a limited partner;
- provides a limited partner approval process; and
- enables a user to track the technical and economic performance metrics.

54. A computer program in accordance with claim 52 further comprising at least one code segment that generates a status map to display on a graphical user interface the proposed expenditure request's current step in an approval process including timestamps indicating an amount of time spent at each step.

55. A computer program in accordance with claim 52 further comprising at least one code segment that displays at least one of engineering data and economics data to be reviewed by an authorized user as part of the approval process.

56. A computer program in accordance with claim 52 further comprising at least one code segment that accesses the plurality of analytical tools including a file transfer tool to perform at least one of download user files from the server to the client system, and upload partnership reports from the client system to the server.

57. A computer program in accordance with claim 52 further comprising at least one code segment that accesses the plurality of analytical tools including at least one of a forecast builder tool and a hedge production forecast tool.

58. A computer program in accordance with claim 52 further comprising at least one code segment that accesses the plurality of analytical tools including at least one of a bank management tool, a display hedge contracts tool, a FASB (Financial Accounting Standards Board) 133 evaluation model, a glance hedge portfolio tool, a hedge analysis tool, a hedge contract settle tool, a hedge contracts tool, a hedge portfolio setup tool, a hedge production forecast tool, a hedging futures price tool, and a hub management tool.

59. A computer program in accordance with claim 52 further comprising at least one code segment that accesses the plurality of analytical tools including at least one of a partner list, a field list, and at least one of a well and lease list.

60. A computer program in accordance with claim 52 further comprising at least one code segment that accesses the plurality of analytical tools including a net income forecasting model to forecast net income for a specific partnership.

61. A computer program in accordance with claim 52 further comprising at least one code segment that accesses the plurality of analytical tools including at least one of a basis differential tool, a discount rates tool, an escalation factors tool, a hedging futures price tool, and a historical average price tool.

* * * * *